United States Patent
Whiteford et al.

(10) Patent No.: US 9,745,073 B2
(45) Date of Patent: Aug. 29, 2017

(54) AIRCRAFT ENGINE MOUNTING SYSTEM AND METHOD OF MOUNTING AIRCRAFT ENGINES

(71) Applicant: LORD Corporation, Cary, NC (US)

(72) Inventors: Gerald P. Whiteford, Waterford, PA (US); Daniel Zameroski, McKean, PA (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 15/356,060

(22) Filed: Nov. 18, 2016

(65) Prior Publication Data

US 2017/0137140 A1    May 18, 2017

Related U.S. Application Data

(63) Continuation of application No. 13/146,286, filed as application No. PCT/US2010/000192 on Jan. 26, 2010, now Pat. No. 9,527,598.

(60) Provisional application No. 61/147,327, filed on Jan. 26, 2009.

(51) Int. Cl.
   *B64D 27/26* (2006.01)
   *B64D 27/02* (2006.01)

(52) U.S. Cl.
   CPC ............. *B64D 27/26* (2013.01); *B64D 27/02* (2013.01); *B64D 2027/262* (2013.01)

(58) Field of Classification Search
   CPC ............. B64D 27/26; B64D 2027/262; B64D 2027/266
   See application file for complete search history.

(56) References Cited

U.S. PATENT DOCUMENTS

| | | | |
|---|---|---|---|
| 4,603,822 A | 8/1986 | Chee |
| 4,634,081 A | 1/1987 | Chee |
| 4,805,851 A | 2/1989 | Herbst |
| 5,351,930 A | 10/1994 | Gwinn et al. |
| 5,551,650 A | 9/1996 | Southward |
| 5,687,948 A | 11/1997 | Whiteford et al. |
| 5,730,429 A | 3/1998 | Ivers et al. |
| 5,873,559 A | 2/1999 | von Flotow et al. |
| 6,607,165 B1 | 8/2003 | Manteiga et al. |
| 6,843,449 B1 | 1/2005 | Manteiga et al. |
| 7,267,301 B2 | 9/2007 | Dron |

FOREIGN PATENT DOCUMENTS

| | | |
|---|---|---|
| EP | 0 940 337 | 9/1999 |
| FR | 2900906 | 11/2007 |
| WO | 95/34769 | 12/1995 |

*Primary Examiner* — Brian M O'Hara

(57) ABSTRACT

An aircraft mounting system is provided having a yoke that is interlocked with engine mounts securable to the engine and the yoke is interchangeable with other yokes on other engines. An aft engine mount is also provided.

30 Claims, 45 Drawing Sheets

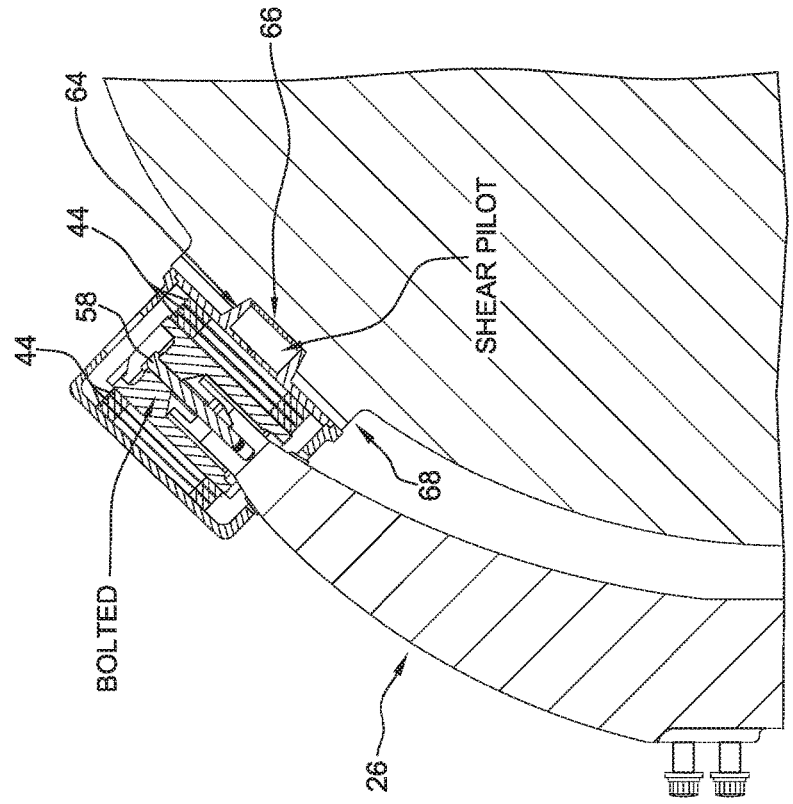
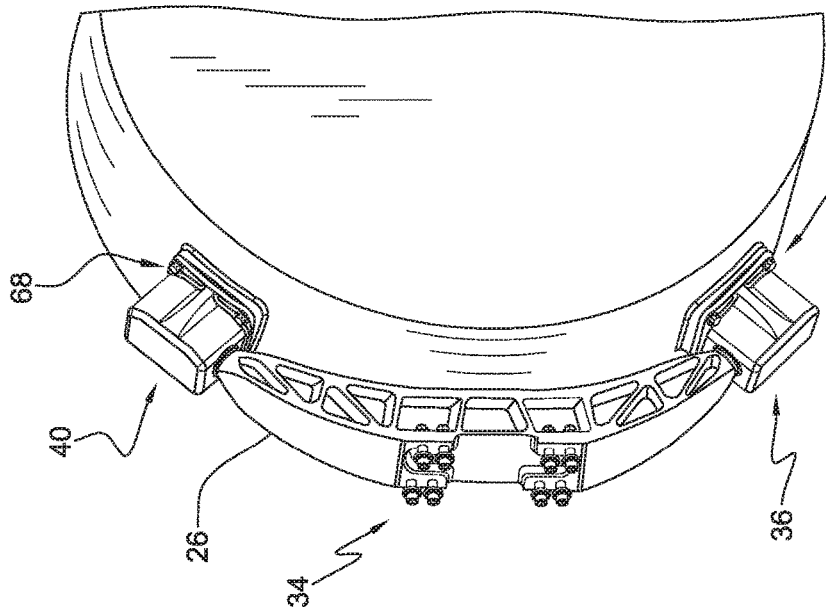
FIG. 17

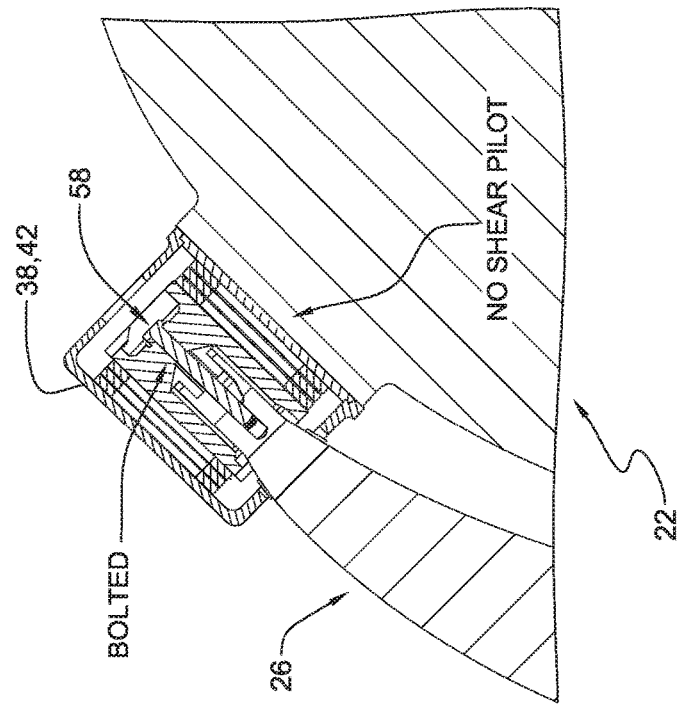
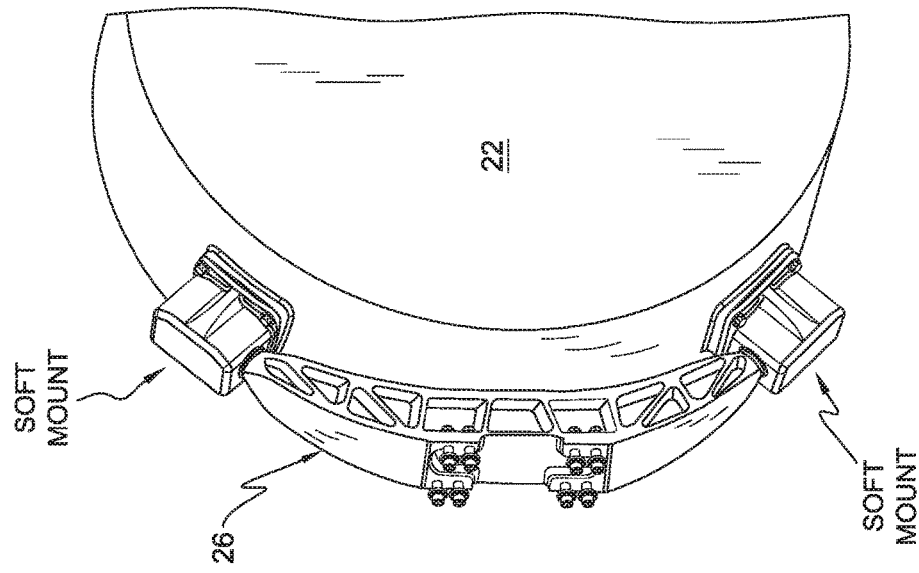
FIG. 20

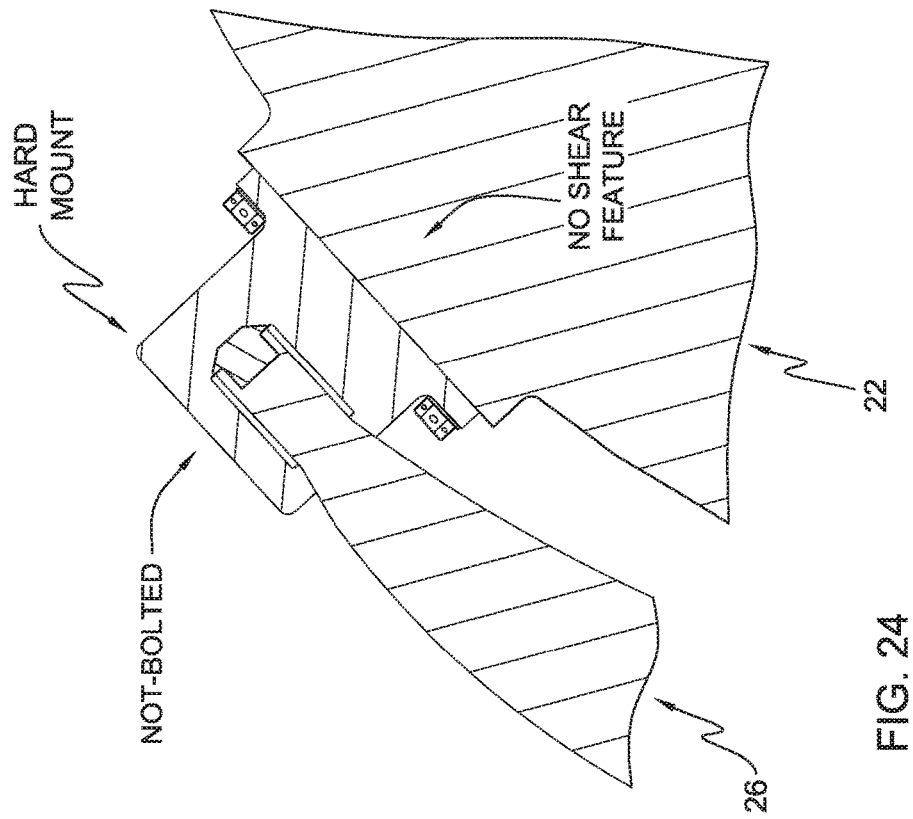
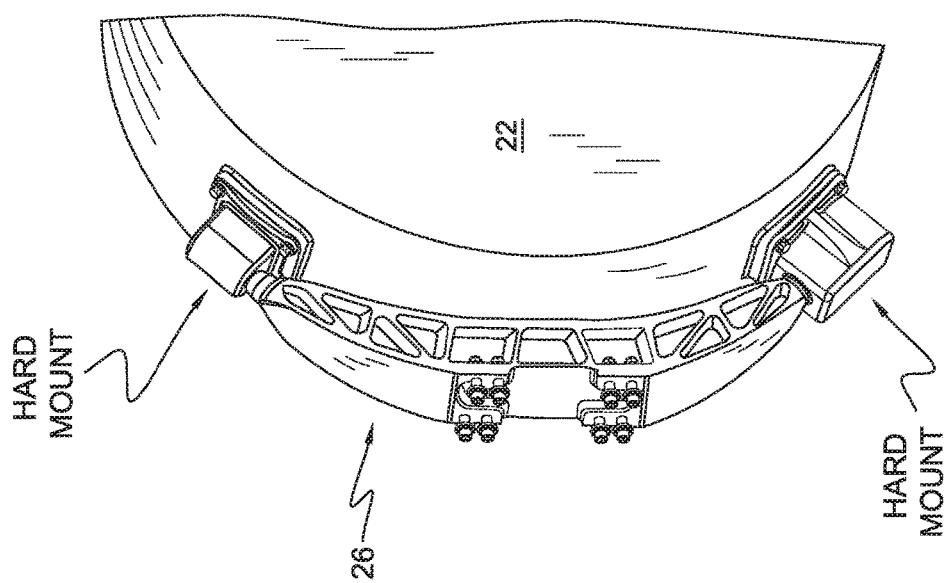
FIG. 24

AFT ENGINE MOUNT AND FORWARD YOKE

FORWARD MOUNT YOKE WITH YOKE ARM BOLTS AND FASTENED ENGINE MOUNTS

AFT ENGINE MOUNT WITH LINK ASSEMBLY WITH TWO
LINK ARMS GROUNDED TO ENGINE RING

AFT HOUSING THIRD AFT ENGINE MOUNT AIRFRAME STRUCTURE HOUSING MEMBER INCLUDES AN ARCHED VOID CRACK STOP BETWEEN THE PRIMARY LOAD PATH WITH THE LINK ASSEMBLY AND SECONDARY LOAD PATH WITH THE LINK ASSEMBLY

LOADS FROM ELASTOMERIC PACKAGE INTO HOUSING WALLS ON EACH SIDE OF HOUSING. DUAL PRIMARY LOAD PATHS

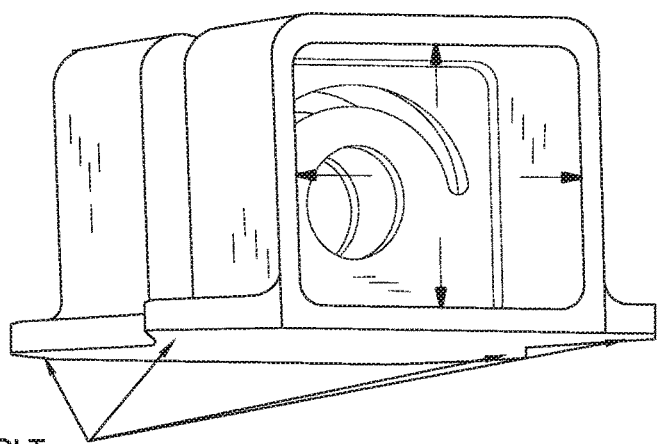

FOUR BOLT ATTACHMENT WITH CAPABILITY TO WITHSTAND LOADING WITH ONE BOLT OUT FOR 3 INSPECTION INTERVALS WITH RESIDUAL STRENGTH

CRACK STOP FEATURE ISOLATING THE PRIMARY AND SECONDARUY LOAD PATH

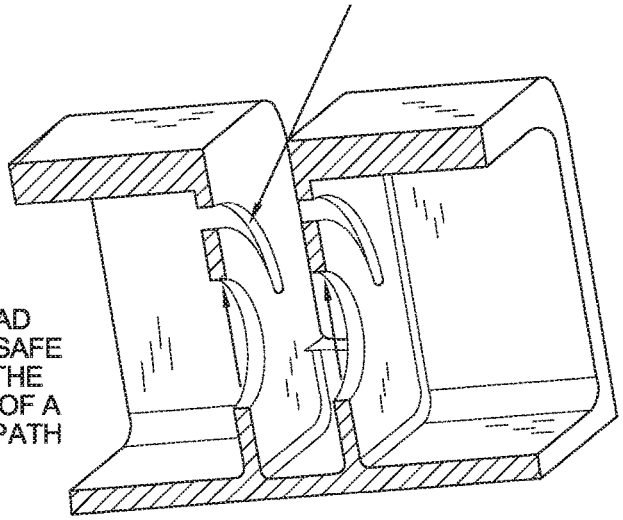

SNUBBING LOAD PATH AND FALL-SAFE LOAD PATH IN THE EVENT OF LOSS OF A PRIMARY LOAD PATH

AFT MOUNT HOUSING LOADING PATHS WITH CRACK STOP

FIG. 36

AFT MOUNT LINK TO ISOLATOR WITH FAILSAFE
BOLT-IN-SLEEVE

AFT MOUNT LINK ASSEMBLY

INTEGRAL FITTING YOKE INTO MOUNT WITH YOKE ARM BOLT RECEIVING YOKE ATTACHMENT BOLT FASTENER

YOKE CROSS - SECTION SHOWING ENGINE END YOKE ARM BOLTS

FORWARD MOUNT INTERNALS WITH YOKE ATTACHMENT BOLT
FASTENER FOR RECEPTION IN THE YOKE ARM BOLT END

INSTALLATION METHOD

AIRCRAFT ENGINE MOUNTING SYSTEM AND METHOD OF MOUNTING AIRCRAFT ENGINES

This Application is a Continuation of U.S. patent application Ser. No. 13/146,286 filed Jul. 26, 2011, which is a 371 international application of International Application No. PCT/US2010/000192, filed on Jan. 26, 2010 which claims the priority of and incorporates by reference U.S. PROVISIONAL PATENT APPLICATION 61/147,327 AIRCRAFT ENGINE MOUNTING SYSTEM AND METHOD OF MOUNTING AIRCRAFT ENGINES filed Jan. 26, 2009, all of which are incorporated by reference herein as if reproduced in their entirety.

SUMMARY OF THE INVENTION

In an embodiment the invention includes an aircraft engine mounting system for mounting an aircraft engine to an aircraft. The aircraft engine mounting system preferably includes an airframe structure member having a first engine end and a distal second engine end, with an aircraft attachment between the first engine end and the distal second engine end, the aircraft attachment for interfacing the airframe structure member with the aircraft, the airframe structure member having an airframe structure member length (YL) from the first engine end to the distal second engine end. The aircraft engine mounting system preferably includes a first engine attachment structure member, the airframe structure member first engine end contained by the first engine attachment structure member, with the first engine attachment structure member having an outer engine mount member grounded to the aircraft engine. The aircraft engine mounting system preferably includes a second engine attachment structure member, the airframe structure member second engine end contained by the second engine attachment structure member, with the second engine attachment structure member having an outer engine mount member grounded to the aircraft engine. The aircraft engine mounting system preferably includes the first engine attachment structure member and the second engine attachment structure member grounded to the aircraft engine with a mounts spacing (MS) between the first engine attachment structure member and the second engine attachment structure member interlocking the airframe structure member length between the first engine attachment structure member and the second engine attachment structure member.

In an embodiment the invention includes an aircraft engine mounting system for mounting an aircraft engine to an aircraft. The aircraft engine mounting system preferably includes an airframe structure member having a first engine end and a distal second engine end, with an aircraft attachment between the first engine end and the distal second engine end, the aircraft attachment for interfacing the airframe structure member with the aircraft, the airframe structure member having an airframe structure member length (YL) from the first engine end to the distal second engine end. The aircraft engine mounting system preferably includes a first engine attachment structure member, the airframe structure member first engine end contained by the first engine attachment structure member, with the first engine attachment structure member having an outer engine mount member grounded to the aircraft engine. The aircraft engine mounting system preferably includes a second engine attachment structure member, the airframe structure member second engine end contained by the second engine attachment structure member, with the second engine attachment structure member having an outer engine mount member grounded to the aircraft engine. The aircraft engine mounting system preferably includes the first engine attachment structure member and the second engine attachment structure member grounded to the aircraft engine with a mounts spacing (MS) between the first engine attachment structure member and the second engine attachment structure member interlocking the airframe structure member length between the first engine attachment structure member and the second engine attachment structure member, and a first end fastener, the first end fastener inhibiting a relative sliding interface between the airframe structure member and the first engine attachment structure member.

In an embodiment the invention includes an aircraft engine mounting system for mounting an aircraft engine to an aircraft. The aircraft engine mounting system preferably includes a forward yoke having a first engine end and a distal second engine end, with an aircraft forward attachment between the first engine end and the distal second engine end, the aircraft attachment for attaching the yoke with the aircraft, the yoke having a yoke length YL from the first engine end to the distal second engine end. The aircraft engine mounting system preferably includes a first forward engine mount, the yoke first engine end contained in the first engine mount, with the first engine mount having an outer engine mount member grounded to the aircraft engine forward in the aircraft. The aircraft engine mounting system preferably includes a second forward engine mount, the yoke second engine end contained in the second engine mount, with the second engine mount having an outer engine mount member grounded to the aircraft engine forward in the aircraft. The aircraft engine mounting system preferably includes the first forward engine mount and the second forward engine mount grounded to the aircraft engine with a mounts spacing MS between the first engine mount and the second engine mount.

In an embodiment the invention includes a method of attaching an aircraft engine to an aircraft. The method preferably includes providing a forward airframe structure member having a first engine end and a distal second engine end, with a forward aircraft attachment between the first engine end and the distal second engine end, the airframe structure member having an airframe structure member length (YL) from the first engine end to the distal second engine end. The method preferably includes providing a first forward engine attachment structure member. The method preferably includes providing a second forward engine attachment structure member. The method preferably includes providing an aircraft engine with a forward and a distal aft end, the aircraft engine having a first engine attachment structure member mounting mate for mating with a mating member of the first engine attachment structure member, the aircraft engine having a second engine attachment structure member mounting mate for mating with a mating member of the second engine attachment structure member, the first engine attachment structure member mounting mate spaced from the second engine attachment structure member mounting mate to provide a mounting mate spacing (MMS). The method preferably includes connecting the forward airframe structure member to the aircraft engine with the first engine attachment structure member and the second engine attachment structure member wherein the first engine attachment structure member mating member mates with the aircraft engine first engine attachment structure member mounting mate and the second engine attachment structure member mating member mates with the aircraft engine second engine attachment structure member mounting mate with the airframe structure member length is captured between the first engine attachment structure member and the second engine attachment structure member.

In an embodiment the invention includes a method of making an aircraft engine mounting system. The method preferably includes providing an airframe structure member yoke having a first engine end and a distal second engine end, with an aircraft attachment between the first engine end and the distal second engine end, the airframe structure member having an airframe structure member length (YL) from the first engine end to the distal second engine end. The method preferably includes providing a first engine attachment structure member with a shear mating member. The method preferably includes providing a second engine attachment structure member with a shear mating member. The method preferably includes providing an aircraft engine, the aircraft engine having a first engine attachment structure member shear mounting mate for mating with the shear mating member of the first engine attachment structure member, the aircraft engine having a second engine attachment structure member shear mounting mate for mating with the shear mating member of the second engine attachment structure member, the first engine attachment structure member mounting mate spaced from the second engine attachment structure member mounting mate to provide a mounting mate spacing (MMS), wherein the first engine attachment structure member shear mating member mates with the aircraft engine first engine attachment structure member shear mounting mate and the second engine attachment structure member shear mating member mates with the aircraft engine second engine attachment structure member shear mounting mate with the airframe structure member length (YL) is captured between the first engine attachment structure member and the second engine attachment structure member.

In an embodiment the invention includes a method of making an aircraft engine mounting system. The method preferably includes providing an airframe structure member having a first engine end and a distal second engine end, with an aircraft attachment between the first engine end and the distal second engine end, the airframe structure member having an airframe structure member length (YL) from the first engine end to the distal second engine end. The method preferably includes providing a first engine attachment structure member. The method preferably includes providing a second engine attachment structure member. The method preferably includes providing an aircraft engine, the aircraft engine having a first engine attachment structure member mounting mate for mating with the first engine attachment structure member, the aircraft engine having a second engine attachment structure member mounting mate for mating with the second engine attachment structure member, the first engine attachment structure member mounting mate spaced from the second engine attachment structure member mounting mate to provide a mounting mate spacing (MMS), wherein the first engine attachment structure member mates with the aircraft engine first engine attachment structure member mounting mate and the second engine attachment structure member mating member mates with the aircraft engine second engine attachment structure member mounting mate with the airframe structure member length (YL) is captured between the first engine attachment structure member and the second engine attachment structure member with an interlocking mount spacing (MS) with MS<YL.

In an embodiment the invention includes a method of making an aircraft engine mounting system. The method preferably includes providing an airframe structure member having a first engine end and a distal second engine end, with an aircraft attachment between the first engine end and the distal second engine end, the aircraft attachment for interfacing the airframe structure member with the aircraft, the airframe structure member having an airframe structure member length (YL) from the first engine end to the distal second engine end. The method preferably includes providing a first engine attachment structure member, the first engine attachment structure member having an interior airframe structure member first engine end receiver for receiving and containing the airframe structure member first engine end. The method preferably includes providing a second engine attachment structure member. The method preferably includes providing an aircraft engine, the aircraft engine having a first engine attachment structure member mounting mate for mating with a mating member of the first engine attachment structure member, the aircraft engine having a second engine attachment structure member mounting mate for mating with a mating member of the second engine attachment structure member, the first engine attachment structure member mounting mate spaced from the second engine attachment structure member mounting mate to provide a mounting mate spacing (MMS). The method preferably includes connecting the airframe structure member to the aircraft engine with the first engine attachment structure member and the second engine attachment structure member wherein the first engine attachment structure member mating member mates with the aircraft engine first engine attachment structure member mounting mate and the second engine attachment structure member mating member mates with the aircraft engine second engine attachment structure member mounting mate with the airframe structure member length (YL) is captured between the first engine attachment structure member and the second engine attachment structure member.

In an embodiment the invention includes an aircraft engine mounting system for mounting an aircraft engine to an aircraft. The aircraft engine mounting system preferably includes a forward yoke having a first engine end and a distal second engine end, with a forward aircraft attachment between the first engine end and the distal second engine end, the forward aircraft attachment for attaching the forward yoke with the aircraft forward in the aircraft, the forward yoke having a yoke length YL from the first engine end to the distal second engine end. The aircraft engine mounting system preferably includes a first forward engine mount, the yoke first engine end contained in the first forward engine mount, with the first engine mount having an outer engine mount member grounded to the aircraft engine. The aircraft engine mounting system preferably includes a second forward engine mount, the yoke second engine end contained in the second forward engine mount, with the second forward engine mount having an outer engine mount member grounded to the aircraft engine. The aircraft engine mounting system preferably includes the first forward engine mount and the second forward engine mount grounded to the aircraft engine with a mounts spacing MS between the first engine mount and the second engine mount. The aircraft engine mounting system preferably includes a third aft engine mount, the third aft engine mount securing the aircraft engine to the aircraft, the third aft engine mount disposed aft of the first forward engine mount, the second forward engine mount, the forward yoke, and the forward aircraft attachment. The aircraft engine mounting system preferably includes the third aft engine mount with a link assembly, the link assembly grounded to the aircraft engine. Preferably the third aft engine mount includes an airframe structure housing member, the airframe structure housing member grounded with the aircraft. Preferably the third aft engine mount airframe structure housing member includes a crack stop between a primary load path with the link assembly and secondary load path with the link assembly. Preferably the yoke includes a first engine end yoke arm bolt, the first engine end yoke arm bolt extending from the first engine end through the airframe structure yoke member towards the airframe structure yoke member aircraft attachment, and a second engine end yoke arm bolt, the second engine end yoke arm bolt extending from the second engine end through the airframe structure yoke member towards the airframe structure yoke member aircraft attachment.

In an embodiment the invention includes an aircraft engine mounting system airframe structure yoke member for mounting a plurality of aircraft engine mounts between an aircraft and an engine, the airframe structure yoke member having a first engine end and a distal second engine end, with an aircraft attachment between the first engine end and the distal second engine end, the aircraft attachment for interfacing the airframe structure member with an aircraft, the airframe structure member having an airframe structure member length (YL) from the first engine end to the distal second engine end, the airframe structure yoke member first engine end for reception in a first engine attachment structure mount member, the airframe structure yoke member second engine end for reception in a second engine attachment structure mount member, with the airframe structure member length (YL) preferably interlocked between the aircraft engine first engine attachment structure mount member and the aircraft engine second engine attachment structure mount member. Preferably the aircraft engine mounting system airframe structure yoke member includes a first engine end yoke arm bolt, the first engine end yoke arm bolt extending from the first engine end through the airframe structure yoke member towards the airframe structure yoke member aircraft attachment. Preferably the aircraft engine mounting system airframe structure yoke member includes a second engine end yoke arm bolt, the second engine end yoke arm bolt extending from the second engine end through the airframe structure yoke member towards the airframe structure yoke member aircraft attachment. Preferably the yoke arm bolts clamp the yoke arm, preferably precompressing the nonelastomeric yoke arm. Preferably the yoke arm bolts preferably provide crack arresting in the yoke arm and inhibit the growth and propagation of cracks through the non-bolt material structure of the arm. Preferably the yoke arm bolts provide a fail safe load path through the yoke arm between the engine attachment structure mount and the airframe structure yoke member aircraft attachment. Preferably the first engine end yoke arm bolt receives an aircraft engine first engine attachment structure mount member fastener for fastening the airframe structure yoke member first engine end with the aircraft engine first engine attachment structure mount member. Preferably the second engine end yoke arm bolt receives an aircraft engine second engine attachment structure mount member fastener for fastening the airframe structure yoke member second engine end with the aircraft engine second engine attachment structure mount member.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 17 illustrates the airframe structure yoke member captured by the engine attachment structure engine mount member using two soft mounts.

FIG. 20 illustrates an alternative of the airframe structure yoke member captured by the engine structure using two soft mounts.

FIG. 24 illustrates an alternative of the airframe structure yoke member captured by the engine structure using one soft mount and one hard mount.

FIG. 36 illustrates a perspective and sectional view of aft mount housing load paths with crack stop.

DETAILED DESCRIPTION OF THE PREFERRED EMBODIMENT

Figure 1:
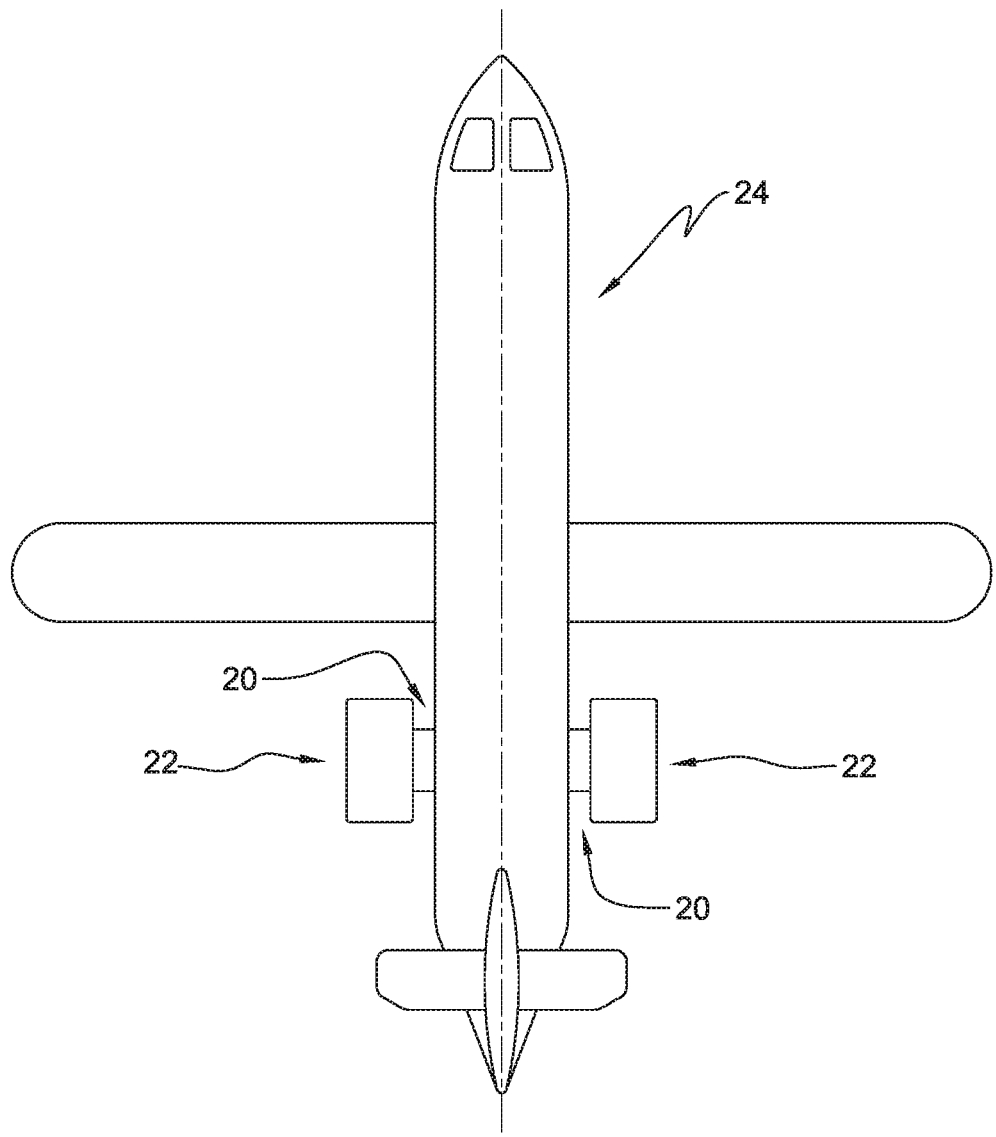
FIGS. 1 and 2 are top views of an aircraft with the inventive engine isolation system.
Figure 2:
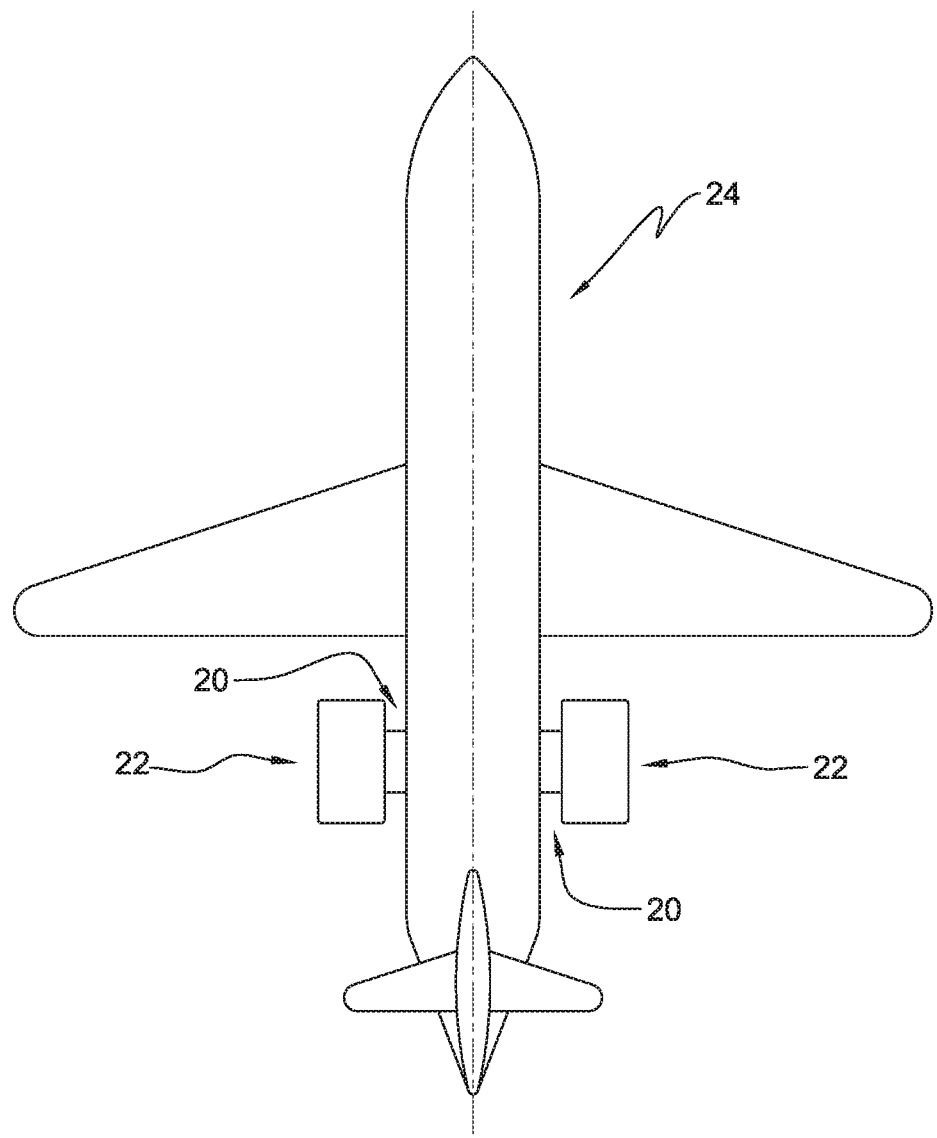
Figure 3:
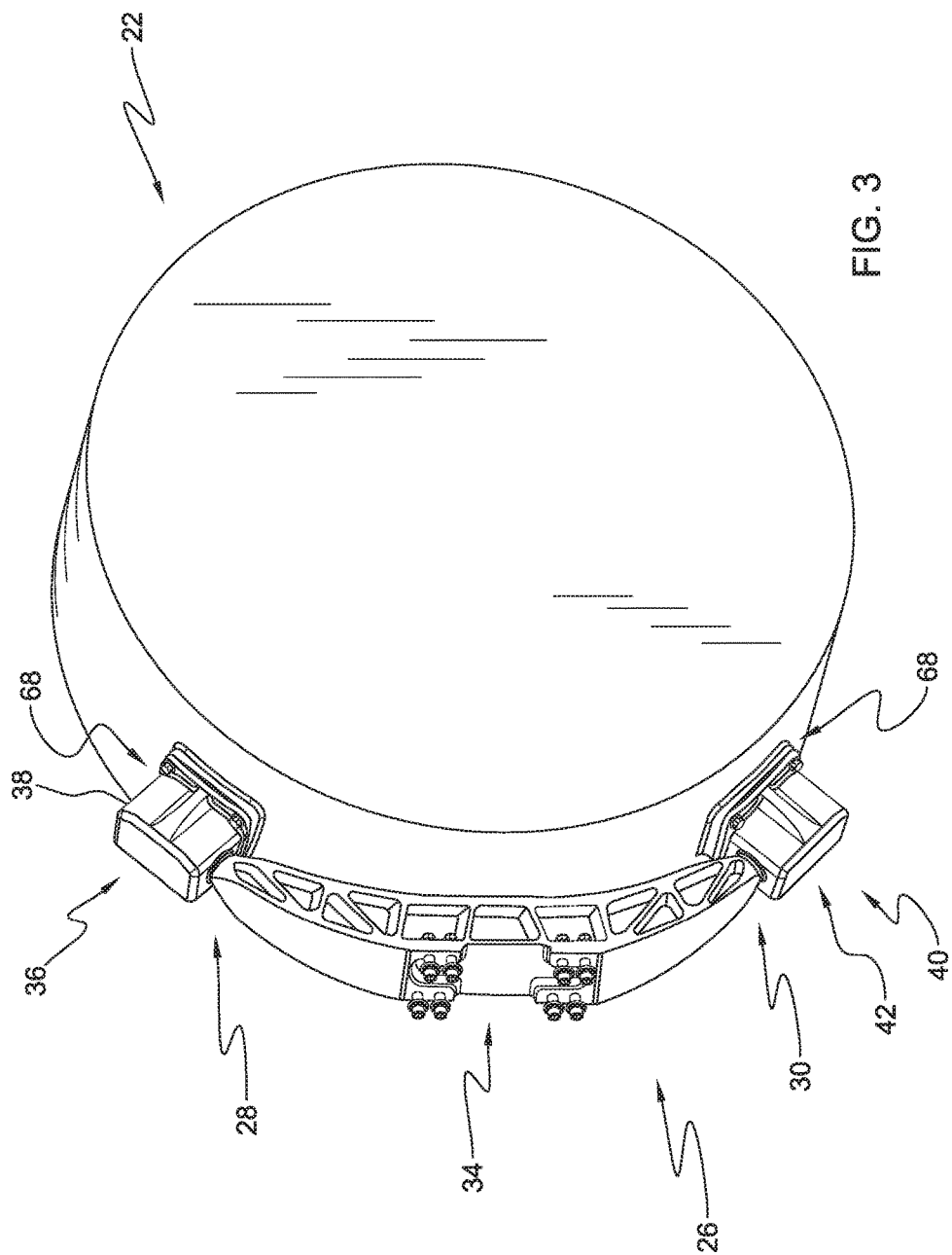
FIGS. 3 and 4 are perspective views of the engine isolation system.
Figure 4:
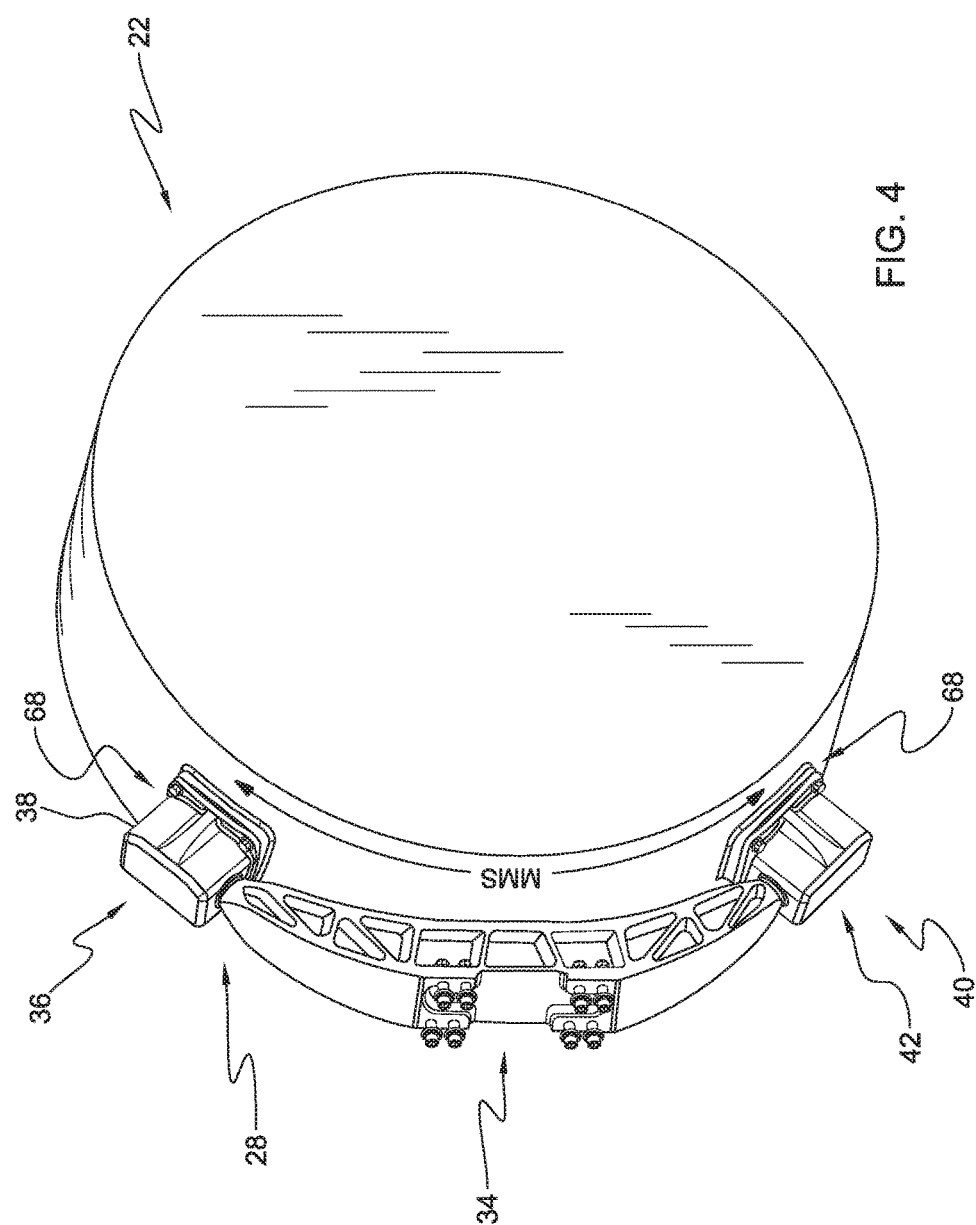
Figure 5:
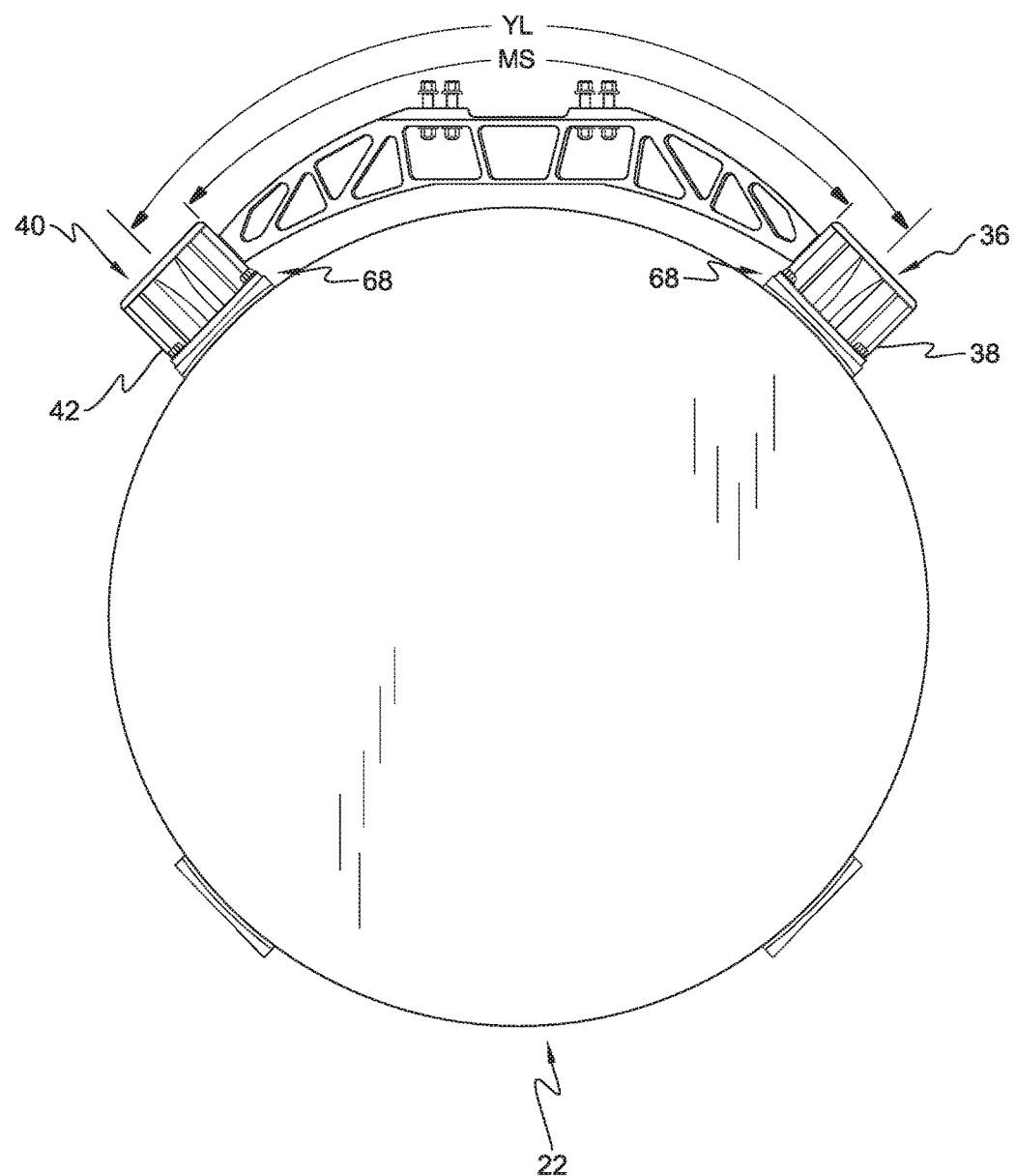
FIGS. 5 and 6 are side views of the engine isolation system.
Figure 6:
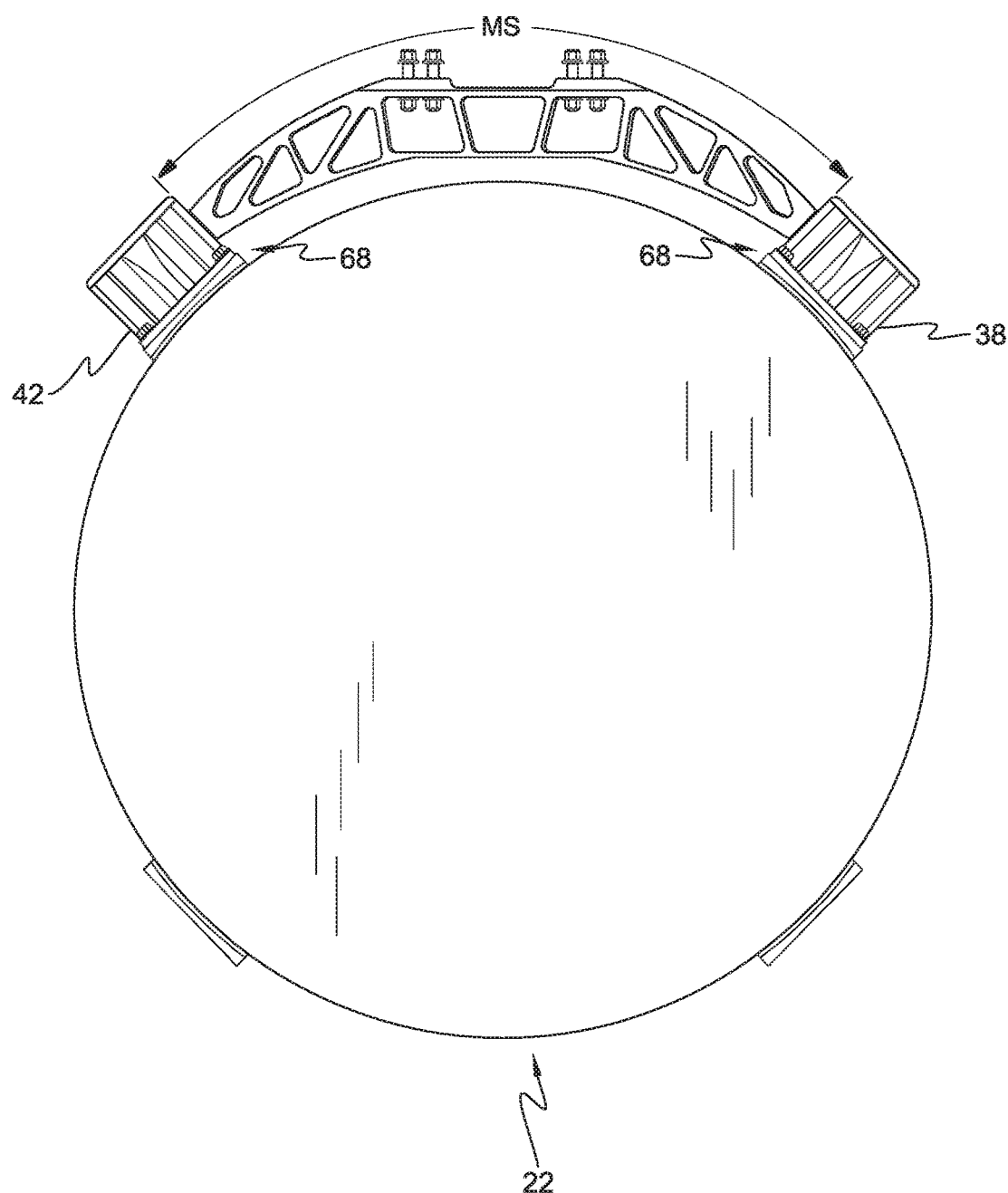
Figure 7:
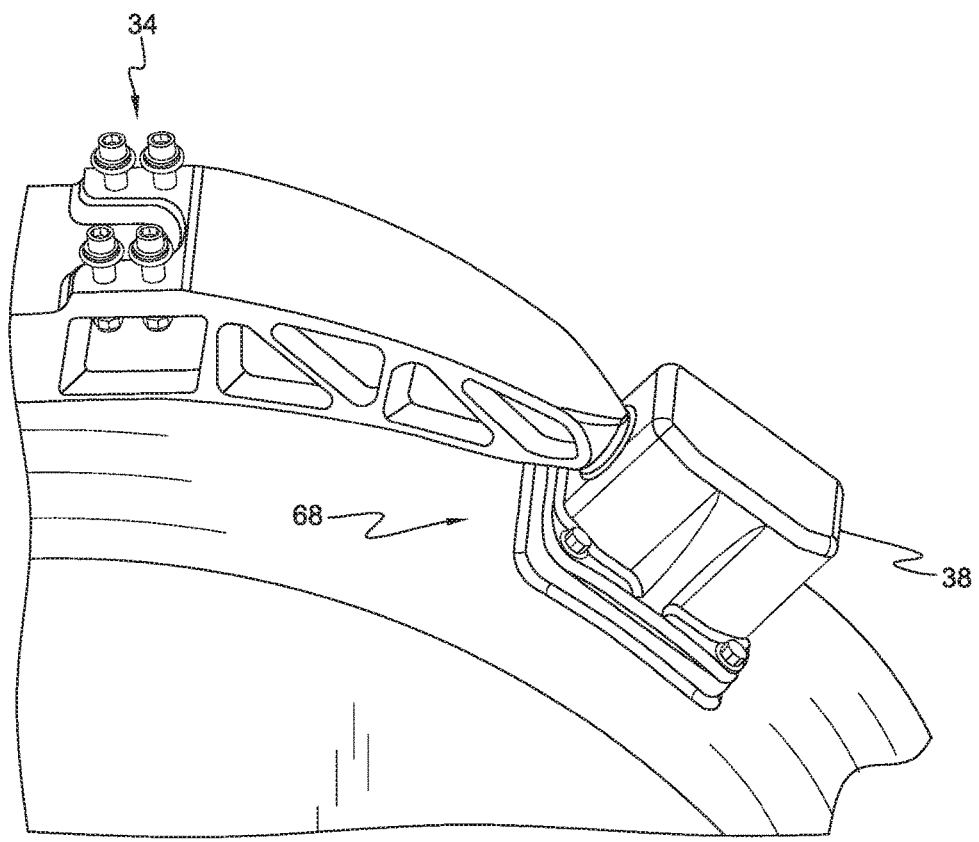
FIG. 7 is a detail view of an outer engine mount member.
Figure 8:
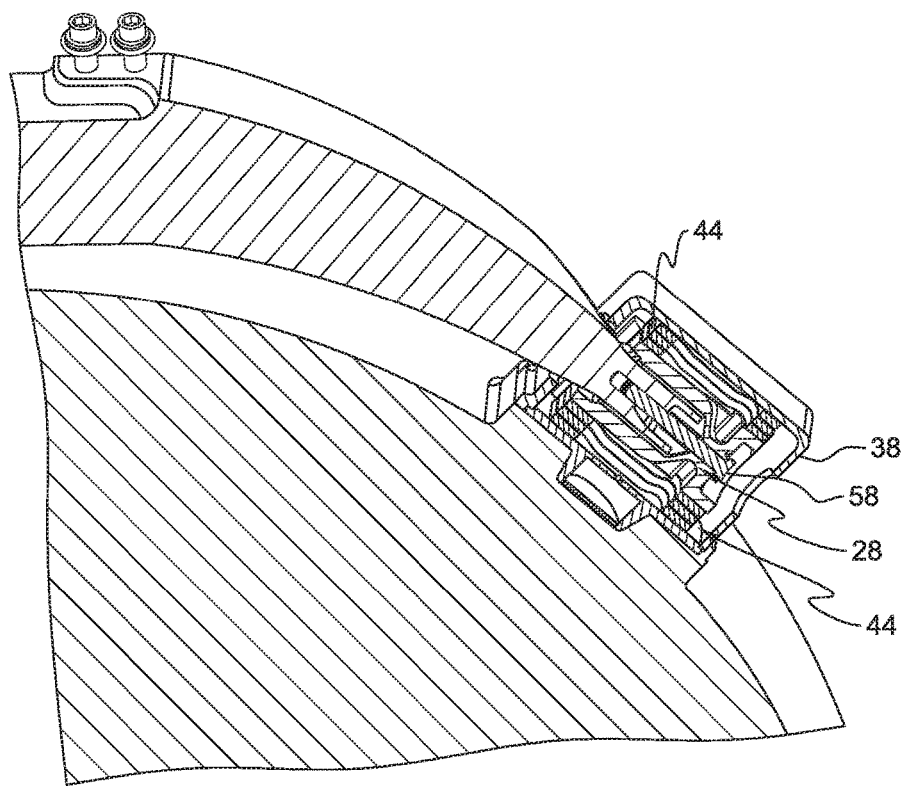
FIGS. 8 and 9 are section views of outer engine mount member.
Figure 9:
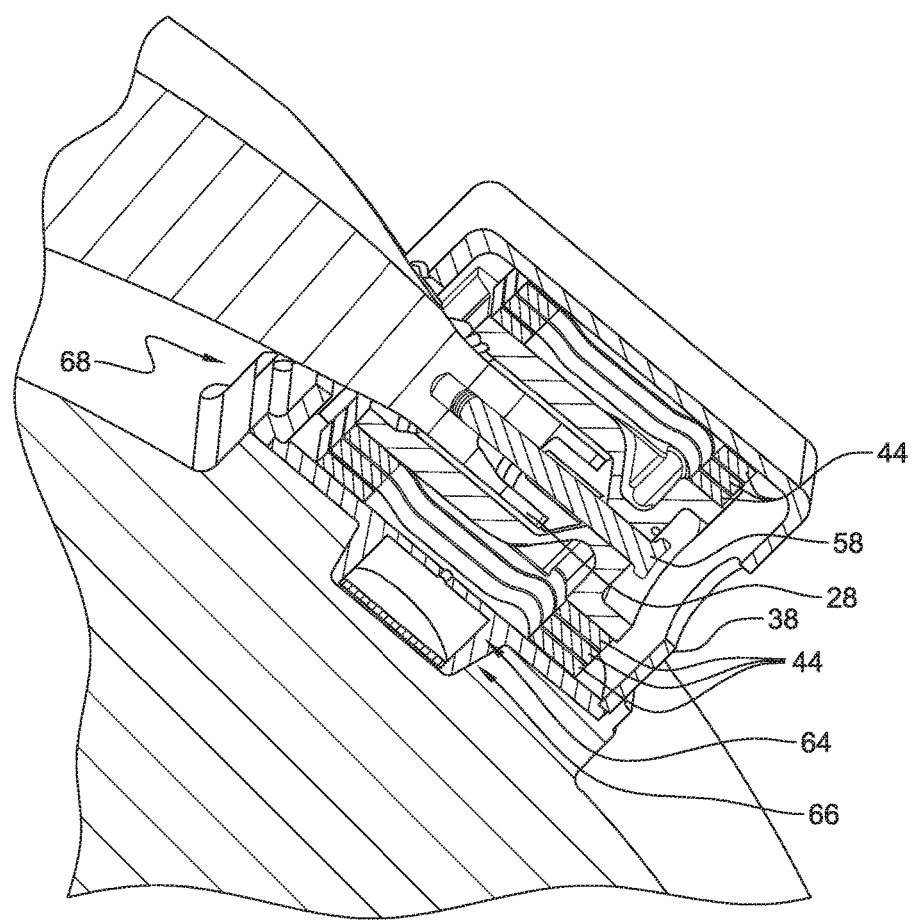
Figure 10:
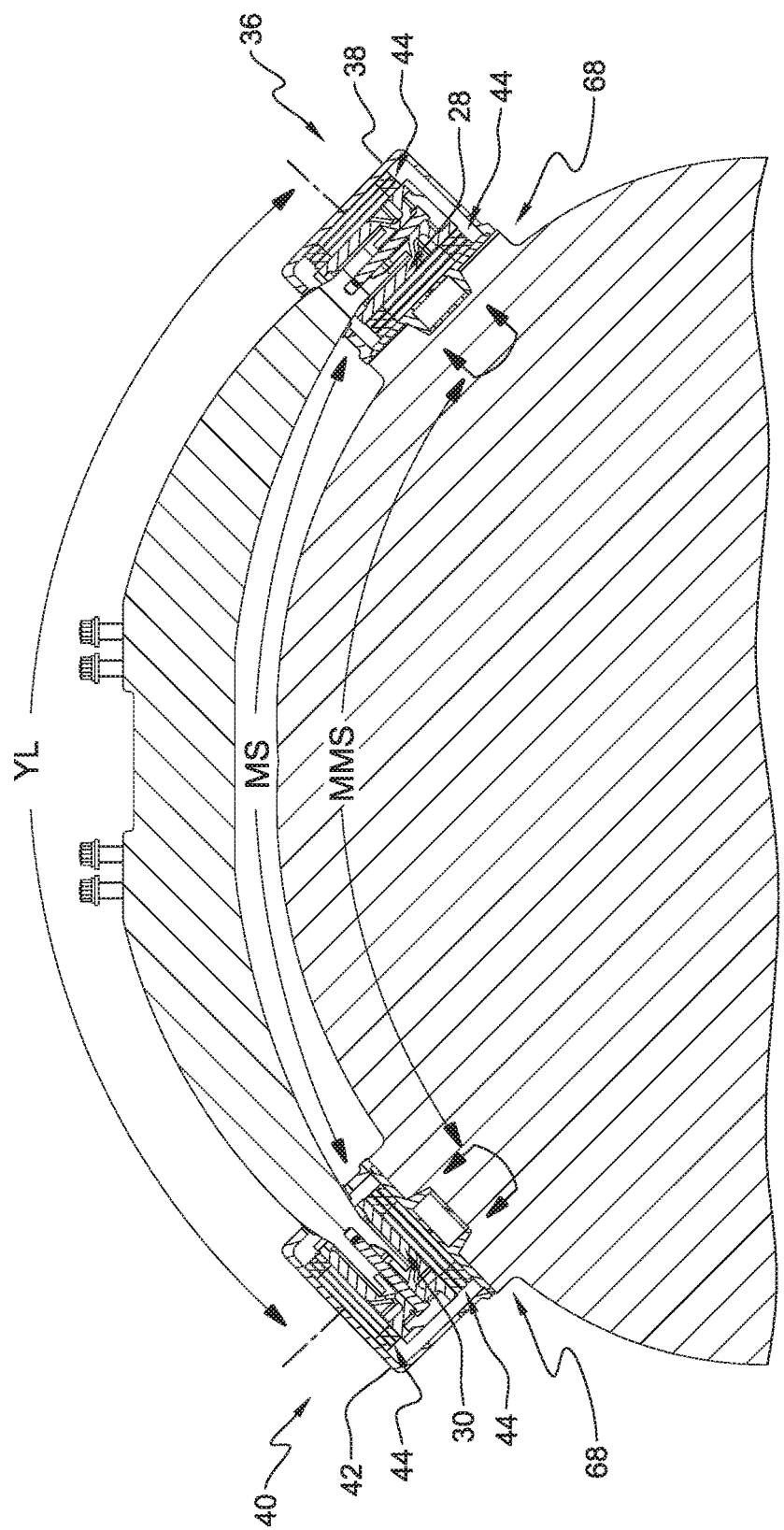
FIG. 10 is a section view of both outer engine mount members.
Figure 11:
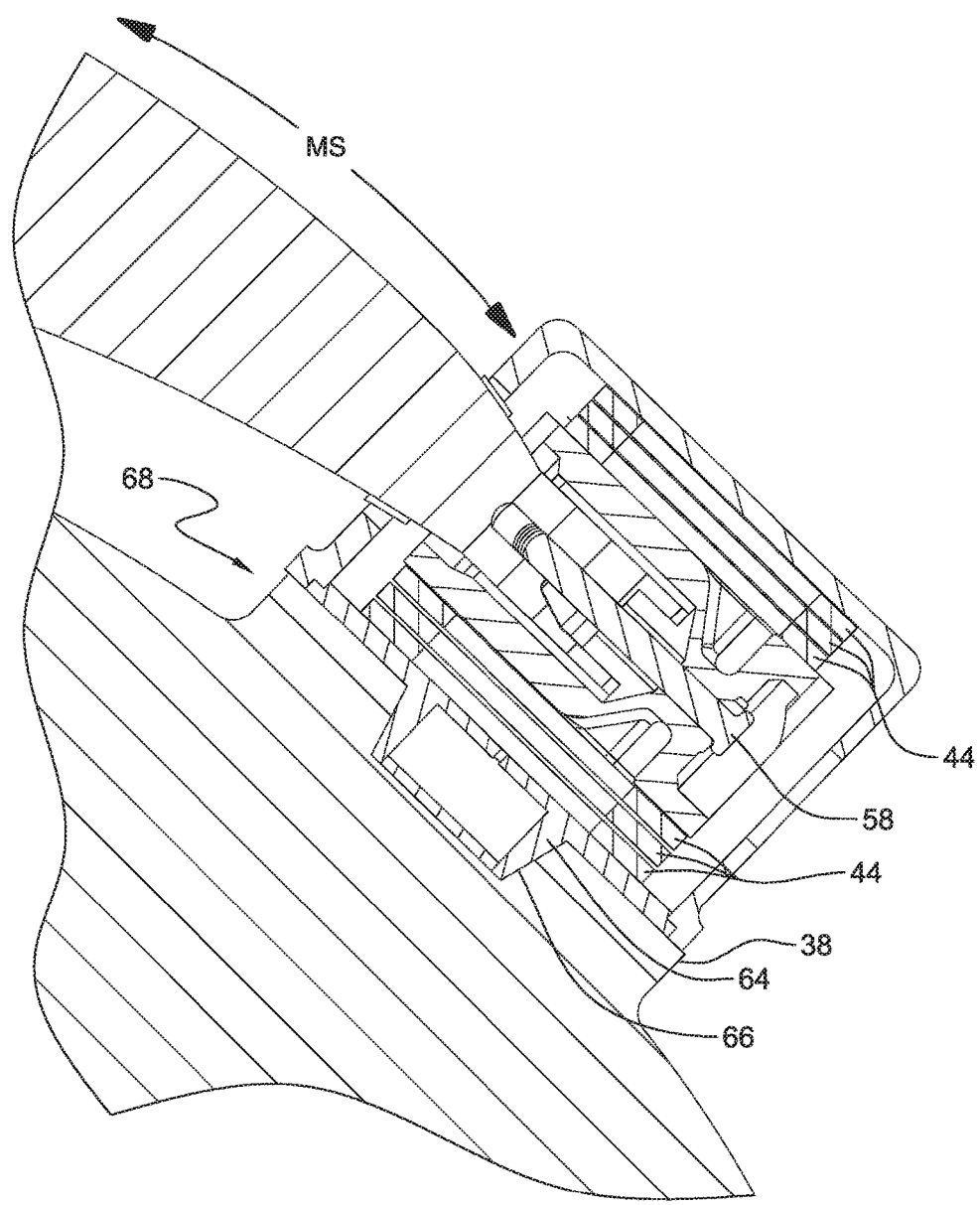
FIG. 11 is a section view of outer engine mounting member with a mounting mate.
Figure 12:
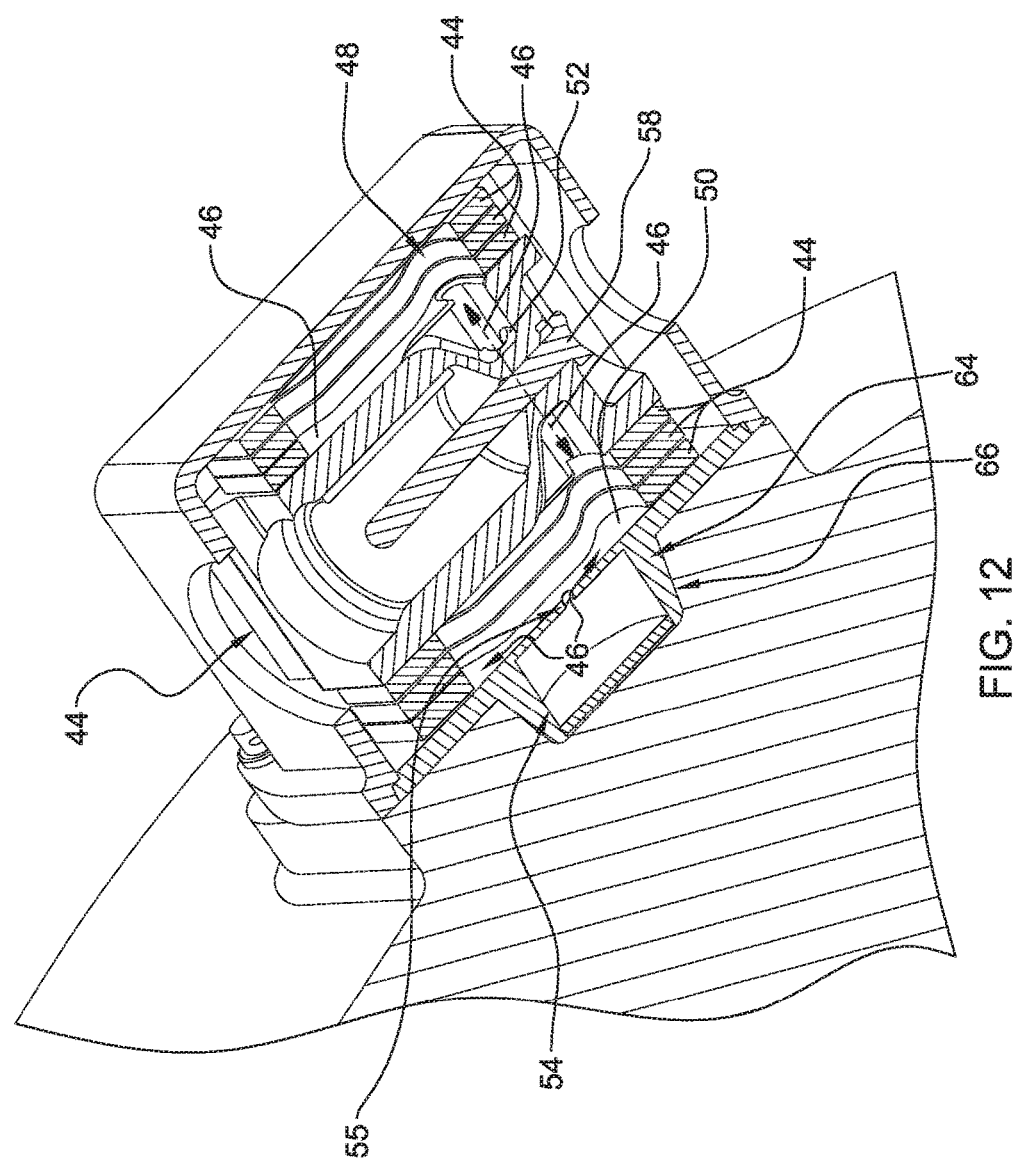
FIG. 12 is a section view of outer engine mounting member with a mounting mate and volume compensator.
Figure 13:
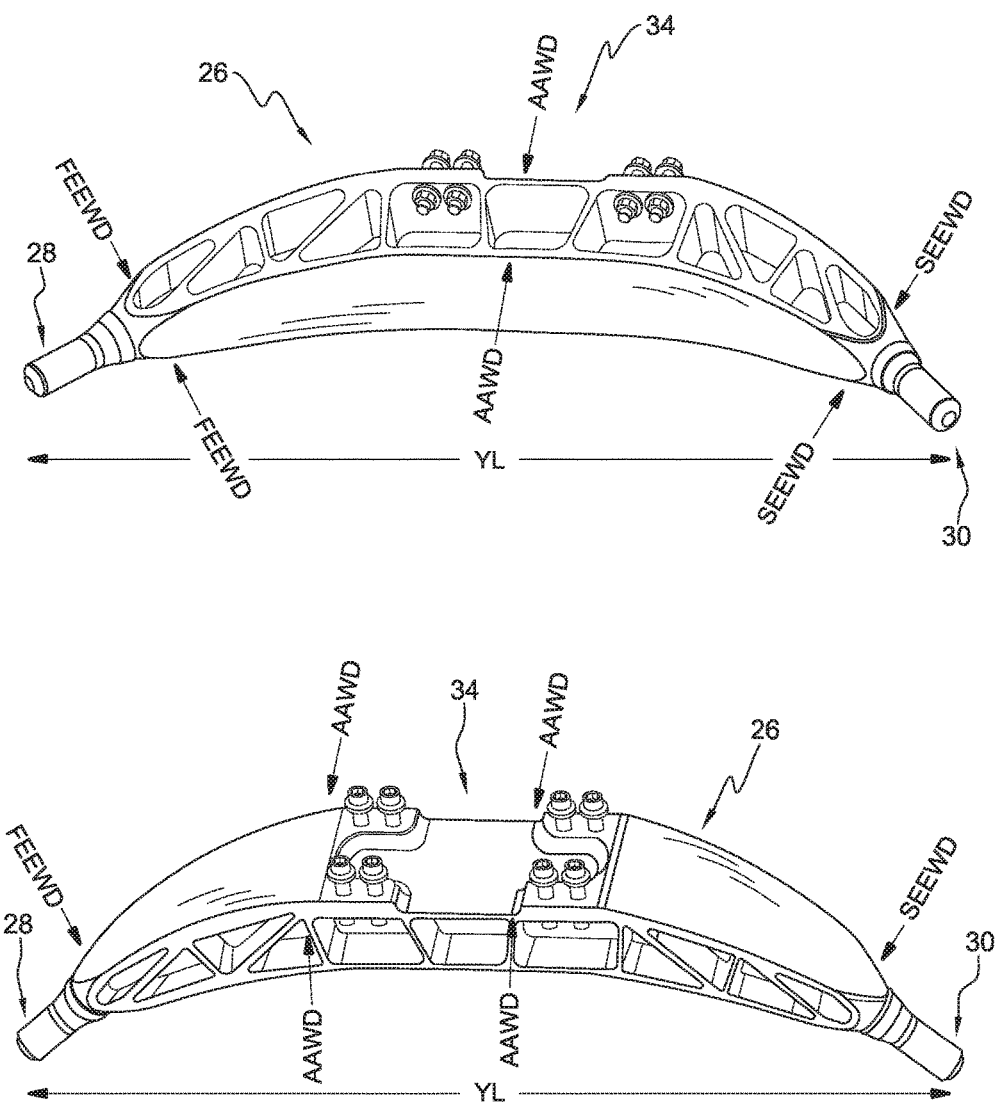
FIG. 13 is top and bottom perspective view of engine attachment structure engine mount member illustrating airframe structure member length (YL).
Figure 14:
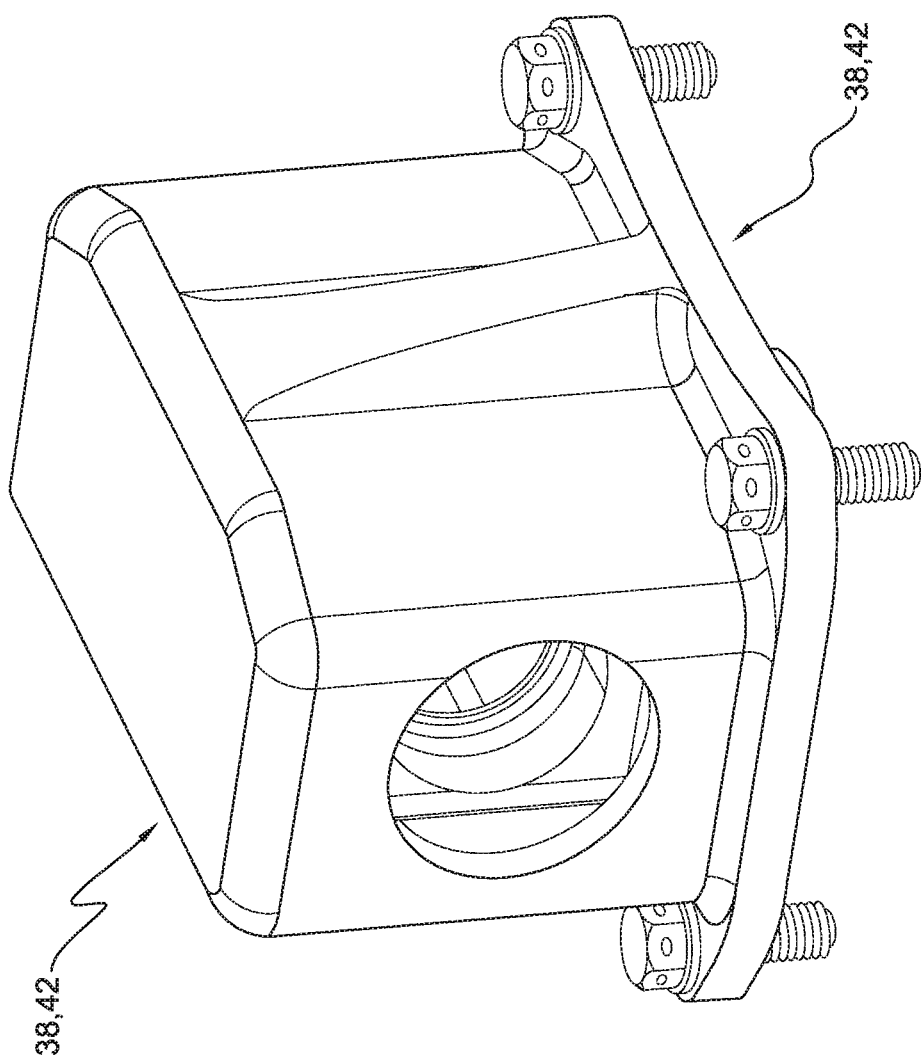
FIG. 14 is a perspective side view of outer engine mount member.
Figure 15:
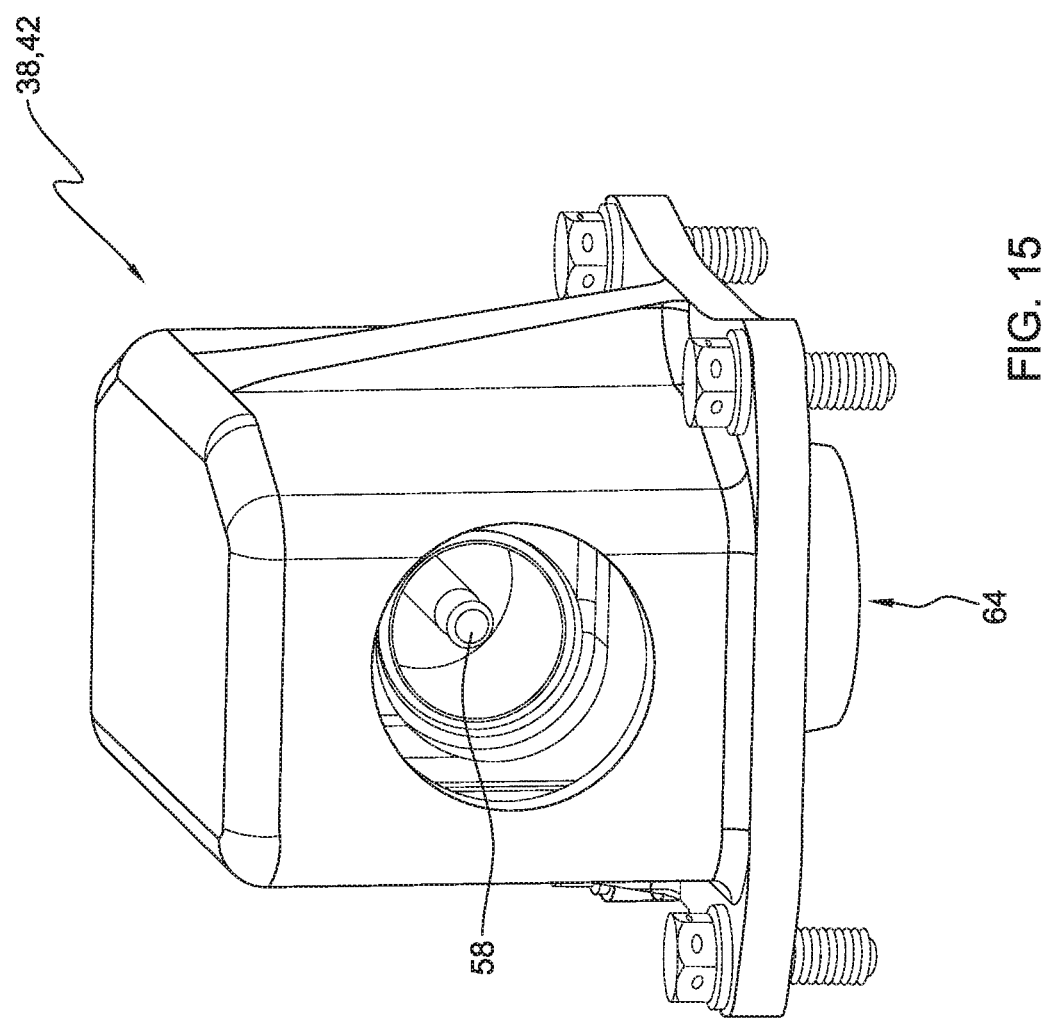
FIG. 15 is perspective end view of outer engine mount member.
Figure 16:
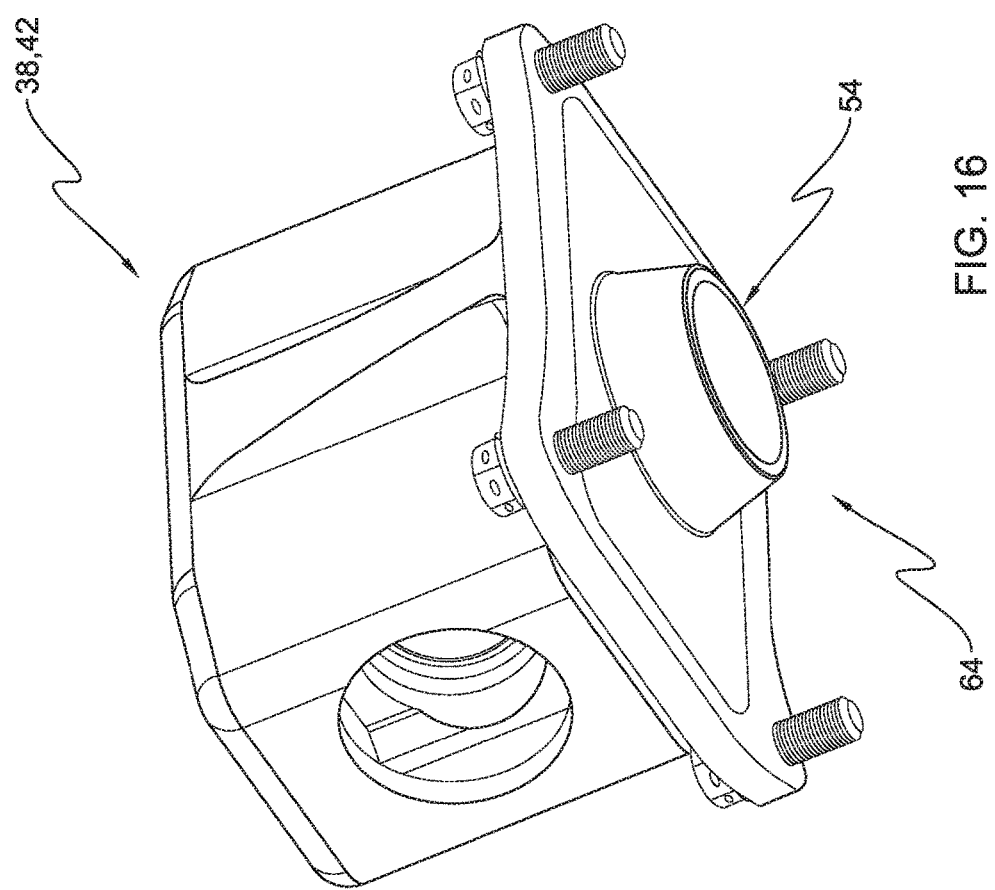
FIG. 16 is a perspective bottom view of outer engine mount member.
Figure 18:
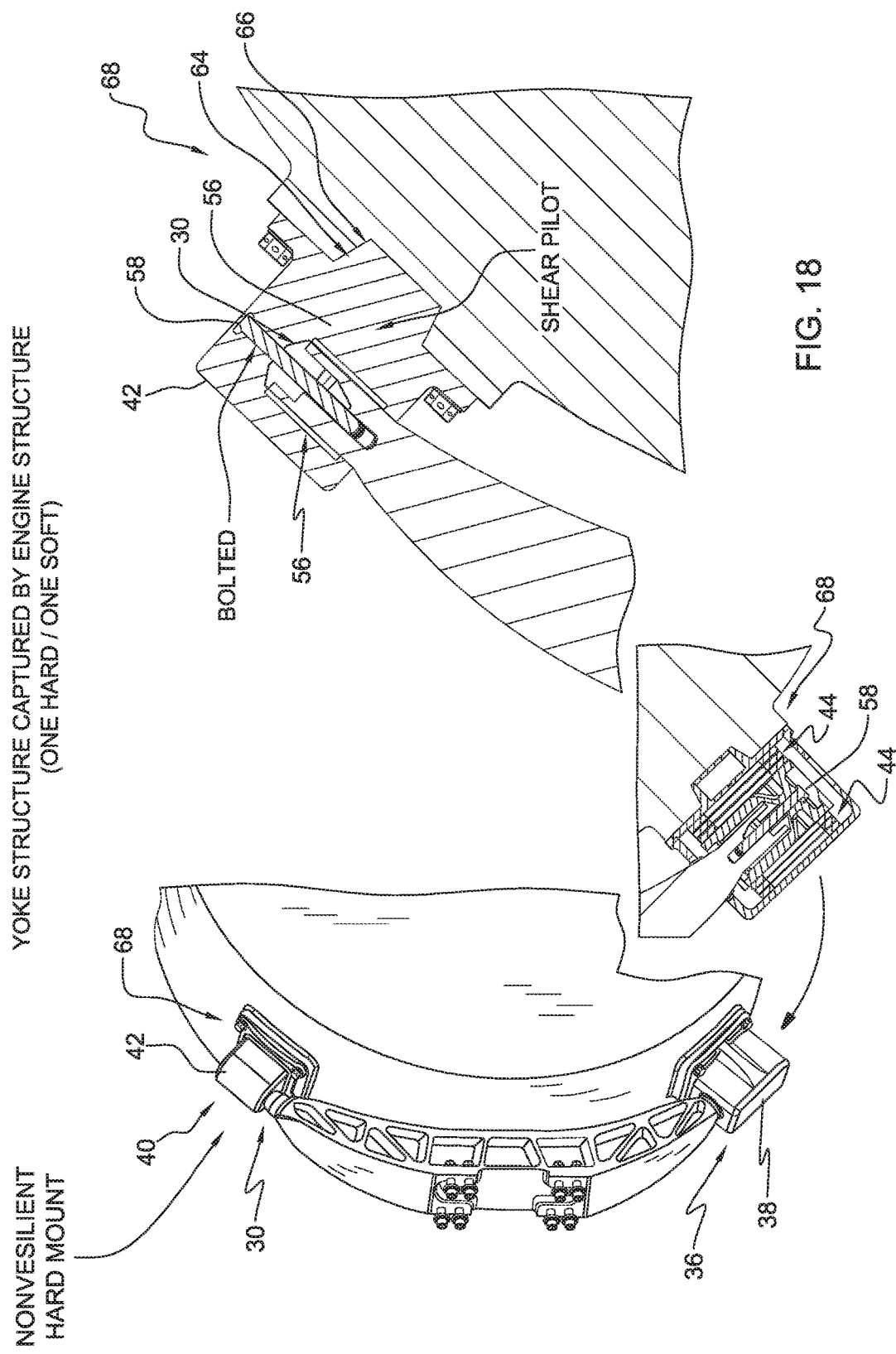
FIG. 18 illustrates the airframe structure yoke member captured by the engine attachment structure engine mount member using one soft mount and one hard mount.
Figure 19:
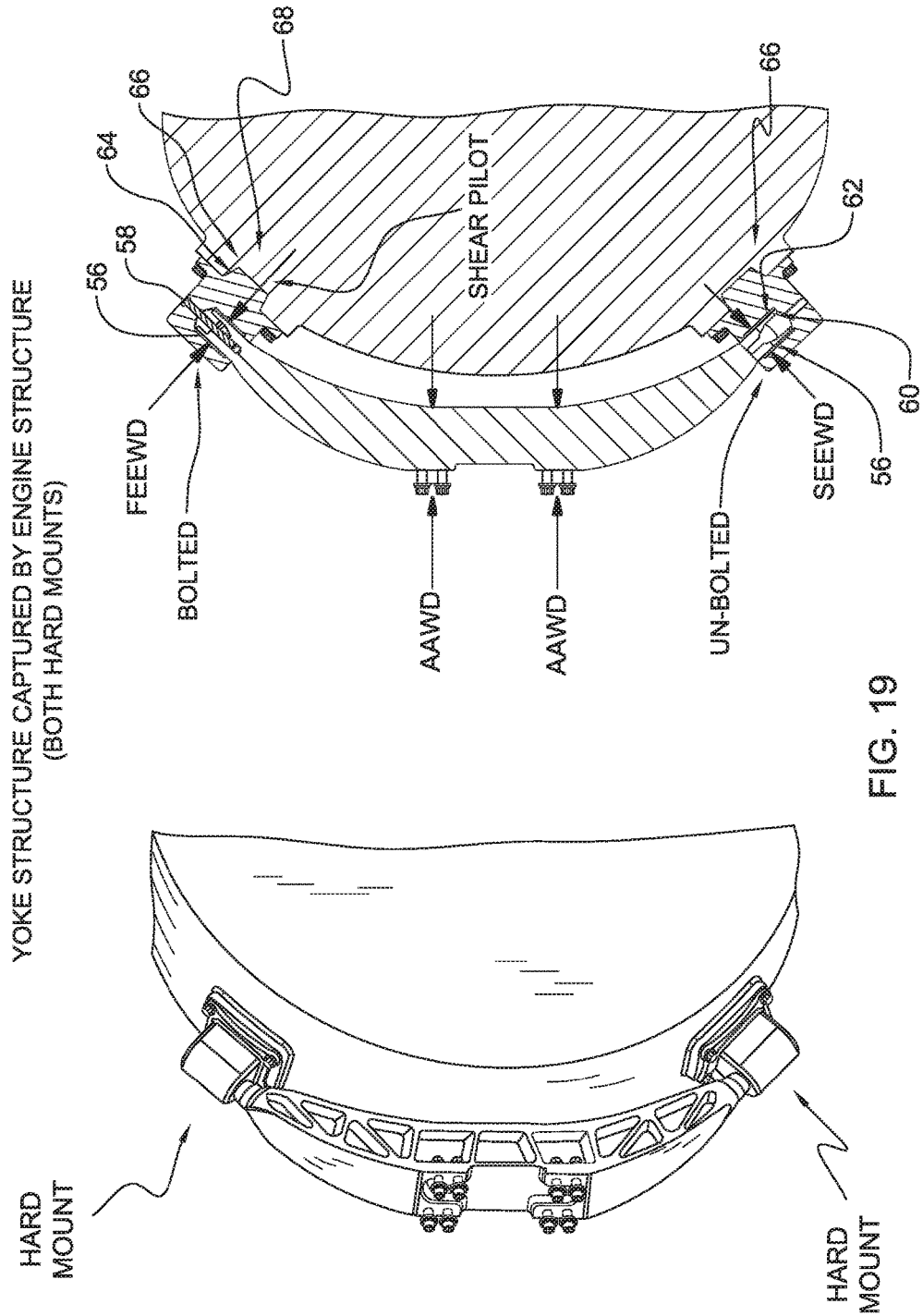
FIG. 19 illustrates the airframe structure yoke member captured by the engine structure using two hard mounts.
Figure 21:
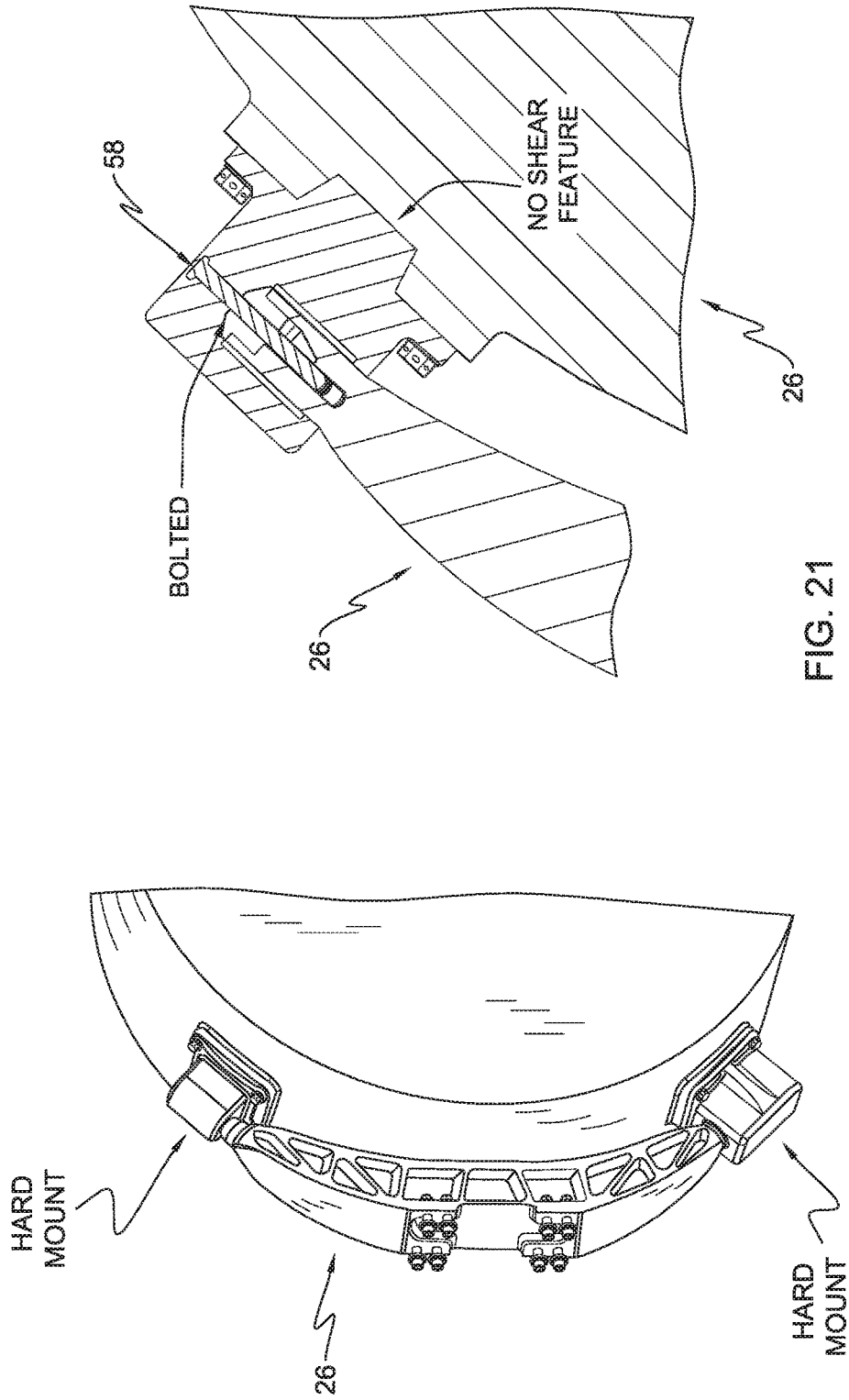
FIG. 21 illustrates an alternative of the airframe structure yoke member captured by the engine structure using one soft mount and one hard mount.
Figure 22:
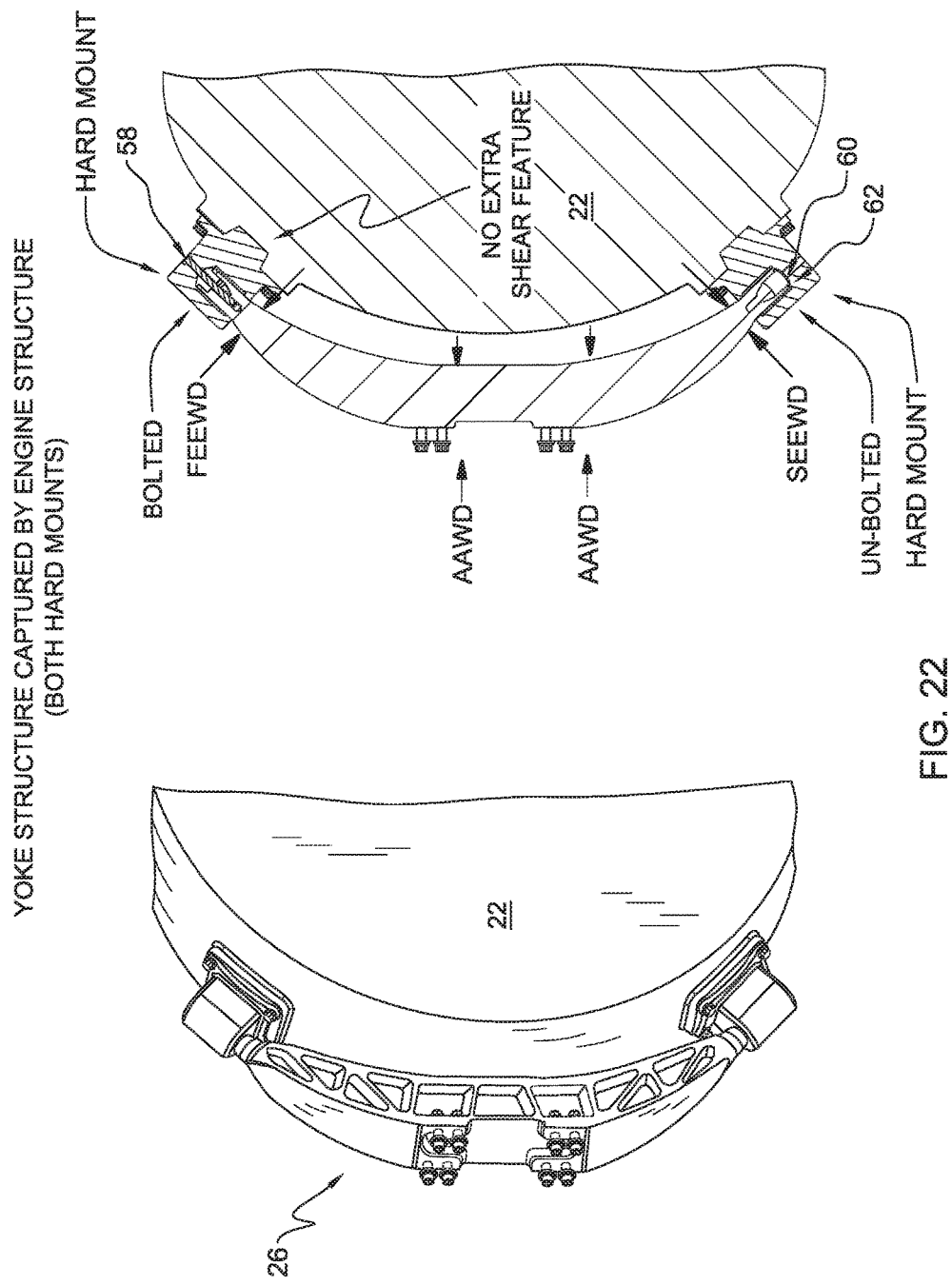
FIG. 22 illustrates an alternative of the airframe structure yoke member captured by the engine structure using two hard mounts.
Figure 23:
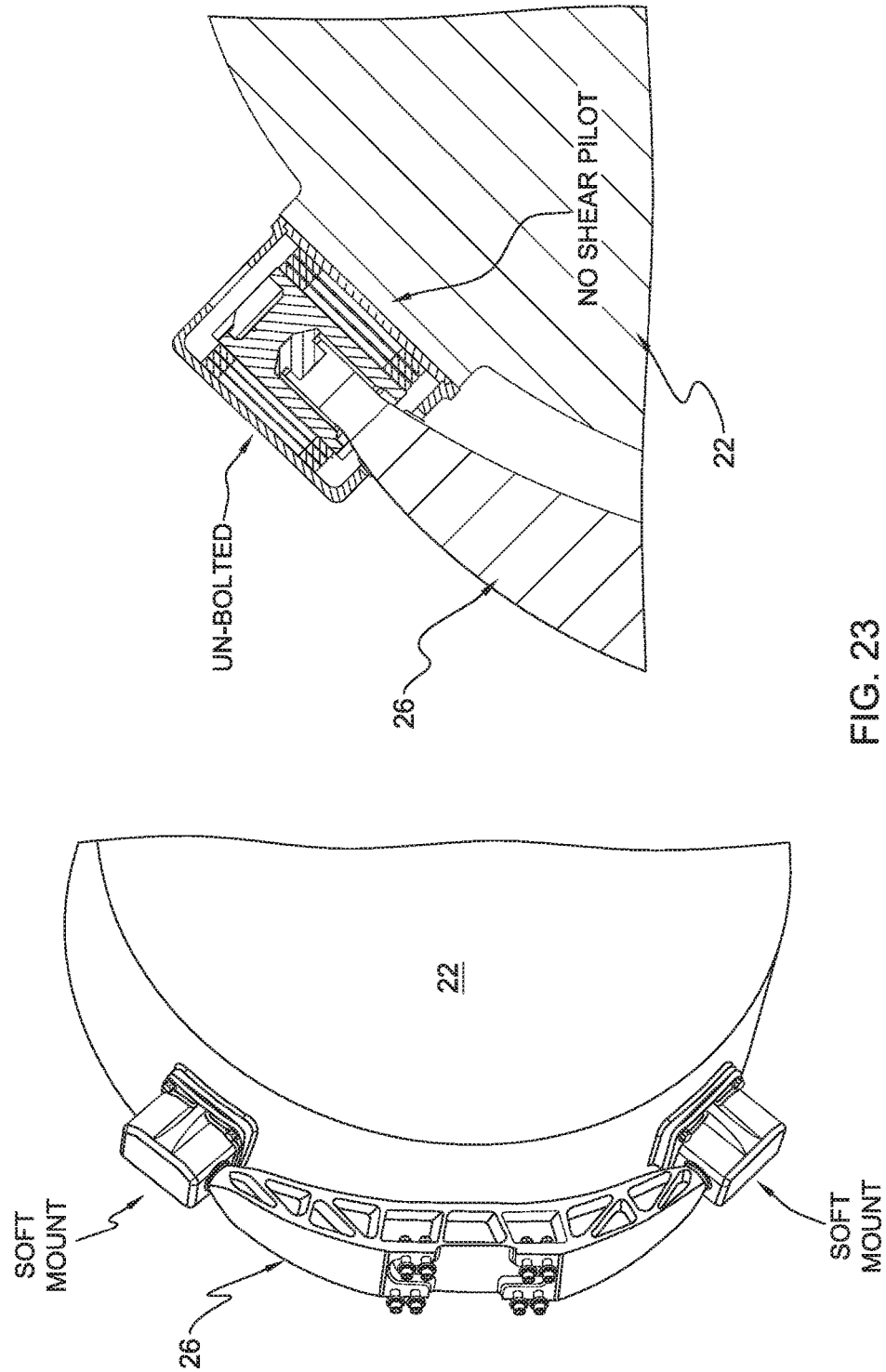
FIG. 23 illustrates an alternative of the airframe structure yoke member captured by the engine structure using two soft mounts.
Figure 25:
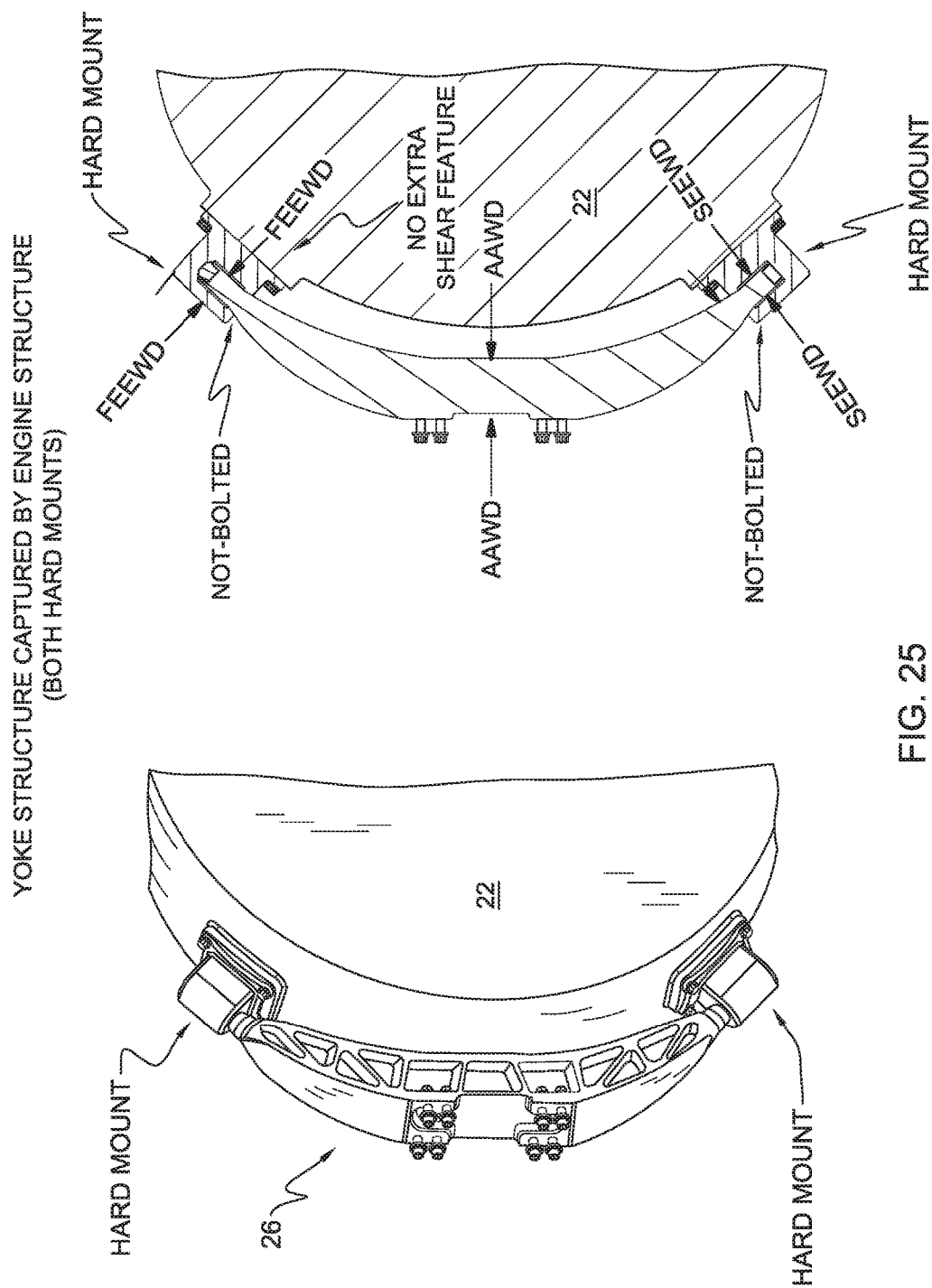
FIG. 25 illustrates an alternative of the airframe structure yoke member captured by the engine structure using two hard mounts.
Figure 26:
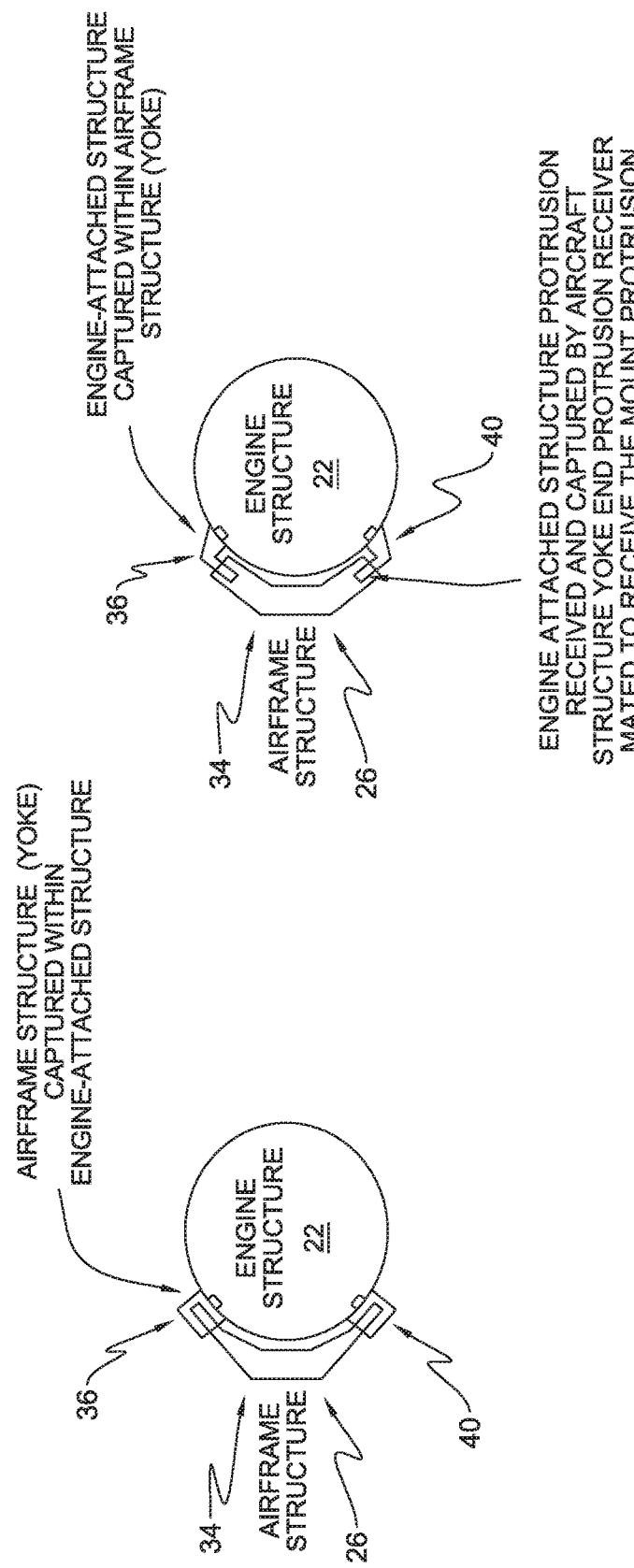
FIG. 26 illustrates the interlocking capture of the airframe structure.
Figure 27:
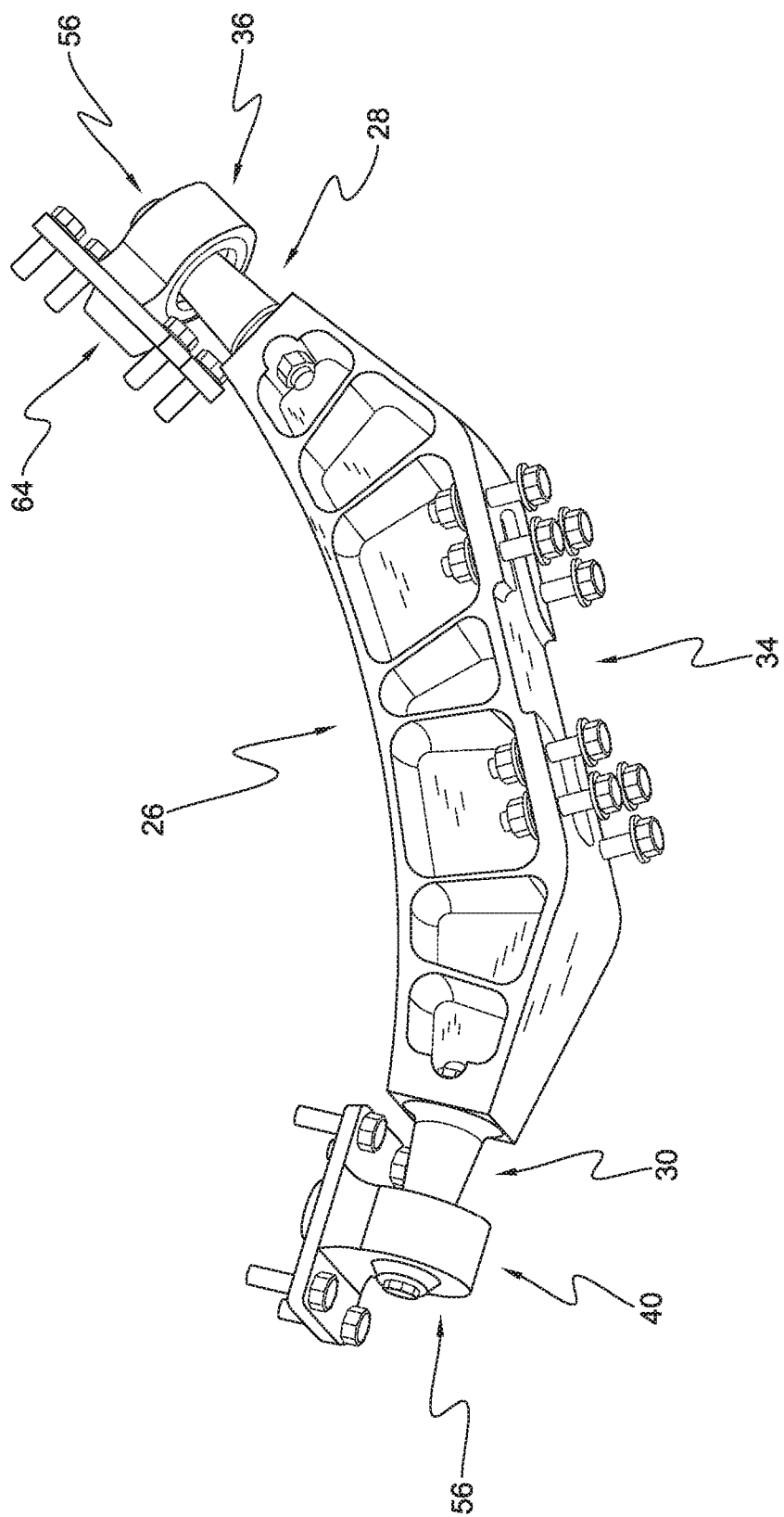
FIG. 27 illustrates an alternative embodiment of the airframe structure yoke member.
Figure 28:
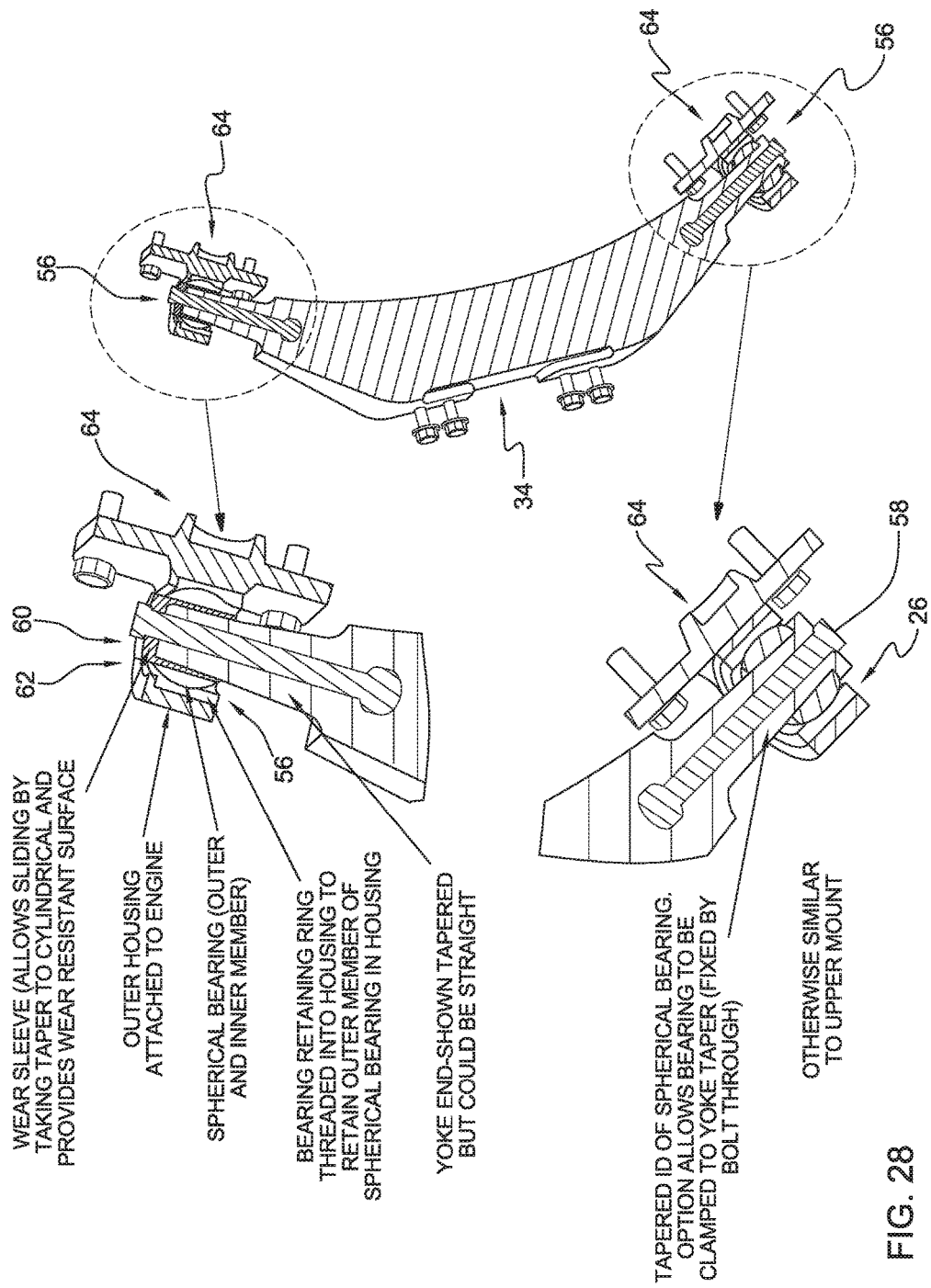
FIG. 28 illustrates a sectional view of the alternative embodiment of FIG. 27.
Figure 29:
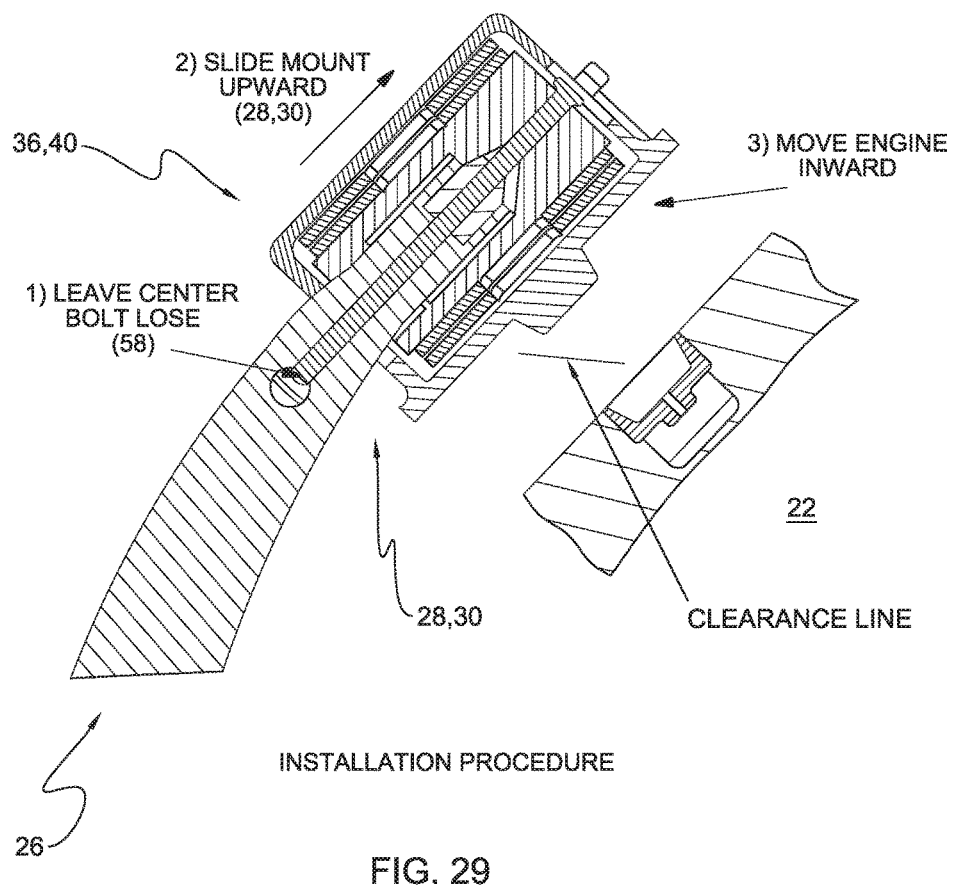
FIG. 29 illustrates an installation procedure.
Figure 30:
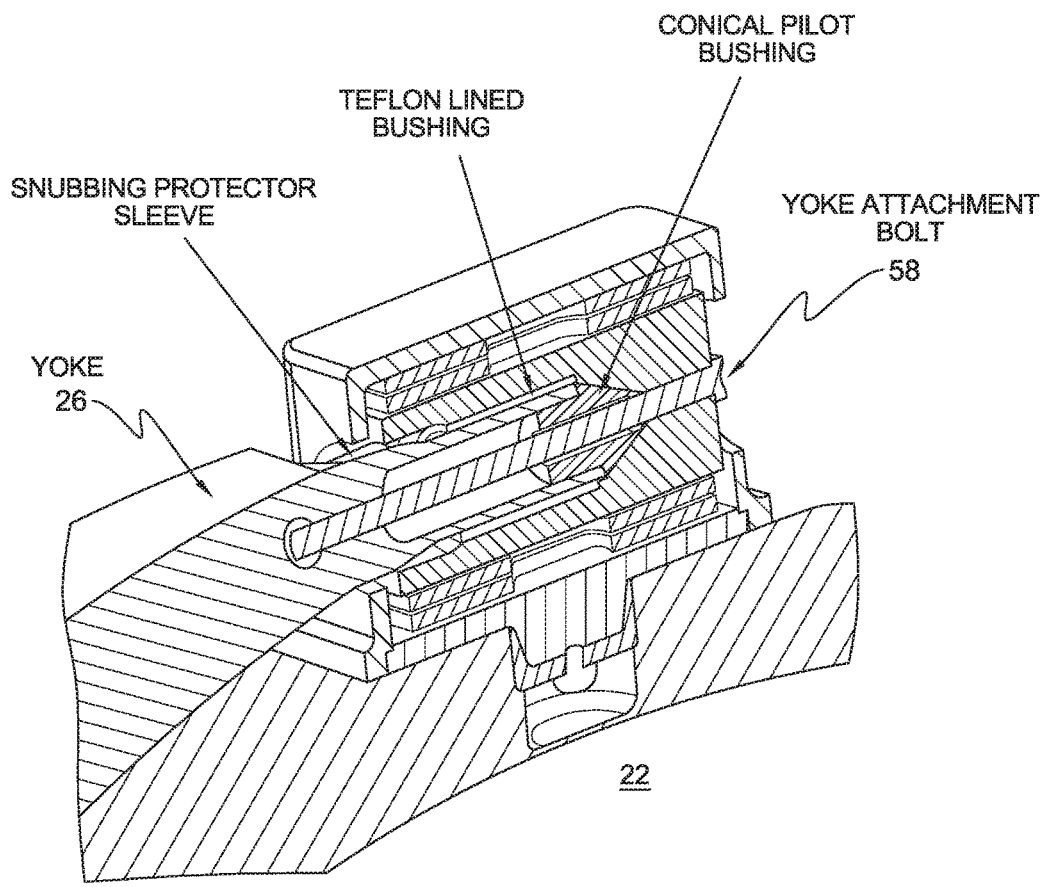
FIG. 30 illustrates fitting the airframe structure yoke member into the mount.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

In an embodiment the invention includes an aircraft engine mounting system for mounting an aircraft engine to an aircraft. The aircraft engine mounting system preferably includes an airframe structure member having a first engine end and a distal second engine end, with an aircraft attachment between the first engine end and the distal second engine end, the aircraft attachment for interfacing the airframe structure member with the aircraft, the airframe structure member having an airframe structure member length (YL) from the first engine end to the distal second engine end. The aircraft engine mounting system preferably includes a first engine attachment structure member, the airframe structure member first engine end contained by the first engine attachment structure member, with the first engine attachment structure member having an outer engine mount member grounded to the aircraft engine. The aircraft engine mounting system preferably includes a second engine attachment structure member, the airframe structure member second engine end contained by the second engine attachment structure member, with the second engine attachment structure member having an outer engine mount member grounded to the aircraft engine. The aircraft engine mounting system preferably includes the first engine attachment structure member and the second engine attachment structure member grounded to the aircraft engine with a mounts spacing (MS) between the first engine attachment structure member and the second engine attachment structure member interlocking the airframe structure member length between the first engine attachment structure member and the second engine attachment structure member.

In an embodiment the invention includes an aircraft engine mounting system 20 for mounting an aircraft engine 22 to an aircraft 24. The aircraft engine mounting system preferably includes an airframe structure yoke member 26 having a first engine end 28 and a distal second engine end 30, with an aircraft attachment 34 between the first engine end 28 and the distal second engine end 30, the aircraft attachment 34 for interfacing the airframe structure yoke member 26 with the aircraft 24, the airframe structure member 26 having an airframe structure member length (YL) from the first engine end 28 to the distal second engine end 30. The aircraft engine mounting system preferably includes a first engine attachment structure engine mount member 36, the airframe structure member first engine end 28 contained by the first engine attachment structure member 36, with the first engine attachment structure member 36 having an outer engine mount member 38 grounded to the aircraft engine 22. Preferably the airframe structure yoke member first engine end 28 is contained in the first engine attachment structure outer engine mount member 38 grounded to the aircraft engine 22. The aircraft engine mounting system preferably includes a second engine attachment structure engine mount member 40, the airframe structure member second engine end 30 contained by the second engine attachment structure member, with the second engine attachment structure member having an outer engine mount member 42 grounded to the aircraft engine 22. Preferably the airframe structure yoke second end 30 is contained in the second engine attachment structure outer engine mount member 42 grounded to the aircraft engine 22. Preferably the first engine attachment structure member 36 and the second engine attachment structure member 40 are grounded to the aircraft engine 22 with a mounts spacing (MS) between the first engine attachment structure member 36 and the second engine attachment structure member 40 interlocking the airframe structure member yoke length (YL) between the first engine attachment structure member 36 and the second engine attachment structure member 40. Preferably MS<YL, preferably MS<0.96YL, preferably MS<0.93YL, preferably MS<0.91YL, preferably MS<0.89YL, preferably MS<0.87YL preferably MS<0.86YL, and most preferably MS≤0.85YL. Preferably the airframe structure member yoke ends 28, 30 are captured within the engine attachment structure member. Preferably the airframe structure member yoke ends 28, 30 are received inside of the engine attachment structure members 36, 40, preferably with the received ends contained and constrained inside of the engine attachment structure members 38, 42. In an alternative embodiment preferably the airframe structure member ends capture, and preferably receive inside the airframe structure, engine attachment structure member protrusions which protrude out from the engine attachment structure members into the airframe structure.

In preferred embodiments the first engine attachment structure member 36 is comprised at least one resilient member 44, the at least one resilient member 44 disposed between the outer engine mount member 38 and the airframe structure member first engine end 28. Preferably the at least one resilient member 44 is a controlled stiffness element, preferably an elastomeric resilient member element. Preferably the at least one resilient member 44 is a flexible isolator element, preferably comprised of an elastomer, preferably a bonded isolating elastomer. Preferably the first engine attachment structure member 36 is further comprised of an isolating fluid 46, with the isolating fluid 46 oscillating between a first fluid chamber 48 and a second fluid chamber 50 through a fluid flow conduit 52, with a volume compensator chamber 54. Preferably the first engine mount 36 captures the yoke first engine end 28, preferably wherein in the event the resilient elastomeric member 44 disintegrates/burns/degrades, the yoke end remains captured in the engine mount.

In preferred embodiments the second engine attachment structure member 40 is comprised at least one resilient member 44, the at least one resilient member 44 disposed between the outer engine mount member 42 and the airframe structure member first engine end 30. Preferably the at least one resilient member 44 is a controlled stiffness element, preferably an elastomeric resilient member element. Preferably the at least one resilient member 44 is a flexible isolator element, preferably comprised of an elastomer, preferably a bonded isolating elastomer. Preferably the second engine attachment structure member 40 is further comprised of an isolating fluid 46, with the isolating fluid 46 oscillating between a first fluid chamber 48 and a second fluid chamber 50 through a fluid flow conduit 52, with a volume compensator chamber 54. Preferably the first engine mount 40 captures the yoke second engine end 30, preferably wherein in the event the resilient elastomeric member 44 disintegrates/burns/degrades, the yoke end remains captured in the engine mount.

In preferred embodiments a first engine attachment structure soft mount member 36 with at least one resilient member 44 is paired with a second engine attachment structure soft mount member 40 with at least one resilient member 44. With such embodiments preferably both ends of the airframe structure yoke member 26 are resiliently isolated with the resilient members 44 of the soft engine attachment structure mount members 36, 40.

In preferred embodiments the second engine attachment structure mount member 40 is comprised at least one nonresilient nonextensible intervening material element 56, preferably at least one nonelastomeric, hard rigid mount element member, the at least member least one nonresilient nonextensible intervening nonelastomeric material member 56 disposed between the outer engine mount member 42 and the airframe structure second engine end 30. Preferably such nonresilient hard engine attachment structure mount member absent of at least one resilient member 44 provide a hard engine attachment structure mount member with the nonresilient nonextensible intervening material 56 between the airframe structure yoke member 26 and the engine 22.

In preferred embodiments a first engine attachment structure soft mount member 36 with at least one resilient member 44 is paired with a second engine attachment structure hard mount member 40 with at least one nonresilient nonextensible intervening material element 56. With such embodiments preferably one end of the airframe structure yoke member 26 is resiliently isolated with the resilient members 44 of the soft engine attachment structure mount member 36 and the distal other end is hard mounted with the second hard mount.

In preferred embodiments the first engine mount 36 is comprised at least one nonresilient nonextensible intervening material nonelastomeric hard rigid mount element member 56, the at least member least one nonresilient nonextensible intervening material nonelastomeric member 56 disposed between the outer engine mount member 38 and the airframe structure first engine end 28.

In preferred embodiments the system includes an airframe structure first engine end fastener 58, the airframe structure first engine end fastener 58 inhibiting a relative sliding interface between the airframe structure member 26 and the first engine attachment structure member 36. In preferred embodiments the system includes an airframe structure second engine end fastener 58, the airframe structure second engine end fastener 58 inhibiting a relative sliding interface between the airframe structure member 26 and the second engine attachment structure member 40. Preferably the attachment locations are bolted together with fastener 58, fastener 58 inhibiting the relative movement between the joining members of the aircraft structure yoke 26 and the engine mounts 36, 40 including sliding. In preferred embodiments the system includes two distal end fasteners 58 with both ends bolted down with the fasteners. In preferred embodiments the system includes only one end fastener 58 with only one end bolted down with the fastener.

In preferred embodiments the system includes an airframe structure second engine end sliding nonresilient interface member 60 and a second engine attachment structure member sliding nonresilient interface member 62, the second engine attachment structure member sliding nonresilient interface member 62 adjacent the airframe structure second engine end sliding nonresilient interface member 60 wherein the rigid airframe structure second engine end sliding interface member 60 is slidable a sliding distance relative to the rigid second engine attachment structure member sliding interface member 62. Preferably the sliding interface comprises a wear-resistant bushing, preferably a bushing comprised of a polymer, preferably a fluoropolymer, preferably a wear resistant bushing comprised of polytetrafluoroethylene.

In preferred embodiments a first engine attachment structure hard mount member 36 with at least one nonresilient nonextensible intervening material element 56 is paired with a second engine attachment structure hard mount member 40 with at least one nonresilient nonextensible intervening material element 56. With such embodiments preferably one end of the airframe structure yoke member 26 is bolted with a fastener 58 while the distal other yoke end is unbolted. Preferably the unbolted yoke end includes the airframe structure engine end sliding nonresilient interface member 60 and the engine attachment structure member sliding nonresilient interface member 62 with the rigid airframe structure engine end sliding interface member slidable a sliding distance relative to the rigid engine attachment structure member sliding interface member 62.

Preferably the airframe structure yoke member 26 has an aircraft attachment width dimension AAWD, a first engine end width dimension FEEWD, and a second engine end width dimension SEEWD, with AAWD>FEEWD and AAWD>SEEWD. Preferably the airframe structure yoke member 26 is a curved arched airframe structure yoke member tapering from the AAWD yoke arch center out to the FEEWD and SEEWD yoke arch ends, preferably with the yoke arch aircraft attachment providing a broad arch center with narrow first engine arch end and narrow second engine arch end, the broad center yoke arch narrowing down to the narrow first and second arch ends.

In preferred embodiments the engine attachment structure members includes a shear feature alignment engine boss interface 64. Preferably the engine attachment structure member alignment engine boss interface shear feature member 64 is a protruding shear member, protruding out from the engine attachment structure member into the aircraft engine 22. Preferably the engine attachment structure member alignment engine boss interface shear feature protruding member 64 is tapered. Preferably both the first and second engine attachment structure members 36, 40 include the protruding tapered engine boss interface shear feature members 64. Preferably the protruding tapered engine boss interface shear feature members 64 are a shear mating member of the engine attachment structure member engine mount and match a reciprocal aircraft engine attachment structure member shear mounting mate 66 in the aircraft engine 22, with the shear mounting mate 66 and the protruding tapered engine boss interface shear feature members 64 mating together. Preferably the matching reciprocal aircraft engine attachment structure member shear mounting mate 66 are located at mount location foundations 68, preferably with the boss receiver mounting mate 66 and bolt holes for bolts. In preferred embodiments the protruding boss member 64 includes the volume compensator 54 with fluid 46, with the fluid 46 preferably communicating through a dynamically isolating fluid conduit 55 with the fluid in the first and second chambers 48,50 outside the compensator 54 and outside the protruding boss member 64. Preferably the aircraft engine 22 has a first engine attachment structure member shear mounting mate 66 at a first mount location foundation 68, preferably as a tapered boss receiver and with surrounding bolt holes for bolts, with the mounting mate 66 mating with the shear mating member 64 of the first engine attachment structure member 36. Preferably the aircraft engine 22 has a second engine attachment structure member shear mounting mate 66 at a second mount location foundation 68, preferably as a tapered boss receiver and with surrounding bolt holes for bolts, with the mounting mate 66 mating with the shear mating member 64 of the second engine attachment structure member 40, preferably with the first engine attachment structure member mounting mate spaced from the second engine attachment structure member mounting mate to provide a mounting mate spacing (MMS).

In an embodiment the invention includes an aircraft engine mounting system 20 for mounting an aircraft engine 22 to an aircraft 24. The aircraft engine mounting system preferably includes an airframe structure yoke member 26 having a first engine end 28 and a distal second engine end 30, with an aircraft attachment 34 between the first engine end and the distal second engine end, the aircraft attachment 34 for interfacing the airframe structure member with the aircraft, the airframe structure yoke member having an airframe structure member length (YL) from the first engine end to the distal second engine end. The aircraft engine mounting system preferably includes a first engine attachment structure engine mount member 36, the airframe structure member first engine end 28 contained by and in the first engine attachment structure member 36, with the first engine attachment structure member having an outer engine mount member 38 grounded to the aircraft engine 22. The aircraft engine mounting system preferably includes a second engine attachment structure engine mount member 40, the airframe structure member second engine end 30 contained by and in the second engine attachment structure member, with the second engine attachment structure member having an outer engine mount member 42 grounded to the aircraft engine 22. Preferably the first engine attachment structure member 36 and the second engine attachment structure member 40 are grounded to the aircraft engine 22 with a mounts spacing (MS) between the first engine attachment structure member and the second engine attachment structure member interlocking the airframe structure member length between the first engine attachment structure member and the second engine attachment structure member and a first end fastener 58 inhibiting a relative sliding interface between the airframe structure member and the first engine attachment structure member. Preferably the mount spacing and airframe structure member length (YL) are provided with MS<YL, preferably MS<0.96YL, preferably MS<0.93YL, preferably MS<0.91YL, preferably MS<0.89YL, preferably MS<0.87YL preferably MS<0.86YL, and most preferably MS≤0.85YL. Preferably the airframe yoke structure member and the first engine attachment structure member attachment locations are bolted together with fasteners 58, with a fastener 58 inhibiting relative movement, preferably inhibiting sliding. In preferred embodiments fasteners 58 fasten both ends of the airframe yoke structure member 26 to the engine attachment structure members, with the both ends bolted down with fasteners 58. In preferred embodiments fastener 58 fastens only one end of the airframe yoke structure member 26 to the engine attachment structure members. In preferred embodiments the airframe structure end fastener 58 inhibits a relative sliding interface between the airframe structure member and the adjacent engine attachment structure member, such as first engine attachment structure member 36. In preferred embodiments the system includes an airframe structure second engine end fastener 58, the airframe structure second engine end fastener 58 inhibiting a relative sliding interface between the airframe structure member 26 and the second engine attachment structure member 40. Preferably the attachment locations are bolted together with fastener 58, fastener 58 inhibiting the relative movement between the joining members of the aircraft structure yoke 26 and the engine mounts 36, 40, including sliding. In preferred embodiments the system includes two distal end fasteners 58 with both ends bolted down with the fasteners. In preferred embodiments the system includes only one end fastener 58 with only one end bolted down with the fastener. Preferably the airframe structure member ends 28, 30 are captured within the engine attachment structure members 36, 40 or alternatively preferred the airframe structure member ends capture and receive inside them engine attachment structure member protrusions protruding out from the engine attachment structure members 36, 40. In preferred embodiments the system includes the second end fastener 58, the second end fastener 58 inhibiting a relative sliding interface between the airframe structure member and the second engine attachment structure member.

In preferred embodiments the system includes an airframe structure second engine end sliding interface member 60 and a second engine attachment structure member sliding interface member 62, the second engine attachment structure member sliding interface member 62 adjacent the airframe structure second engine end sliding interface member 60 wherein the airframe structure second engine end sliding interface member 60 is slidable a sliding distance relative to the second engine attachment structure member sliding interface member 62. Preferably the sliding interface system includes a wear-resistant bushing, preferably a bushing comprised of a polymer, preferably a fluoropolymer, preferably a wear resistant bushing comprised of polytetrafluoroethylene.

In preferred embodiments the first engine attachment structure member is a soft mount and is comprised of at least one resilient isolator member 44. Preferably the soft mount at least one resilient isolator member 44 is disposed between the outer engine mount member 38 and the airframe structure member first engine end 28. Preferably the soft mount at least one resilient isolator member 44 is a controlled stiffness element, preferably an elastomeric flexible isolating mount member. Preferably a first end fastener 58 fastens the airframe structure member to the first engine attachment structure member nonresilient isolator member, with the resilient isolator elastomeric member between the first engine attachment structure member nonresilient isolator member and the outer engine mount member, preferably with the elastomer bonded there between. Preferably the first engine mount captures the first engine end, preferably wherein the resilient elastomeric member disintegrates/burns/degrades, the end remains captured.

In preferred embodiments with fasteners 58 at both ends of the airframe structure member, the second engine attachment structure member is a soft mount comprised of at least one resilient isolator 44, preferably an elastomeric, flexible, isolating, controlled stiffness element member. The at least one resilient isolator elastomeric member 44 disposed between the outer engine mount member and the airframe structure member second engine end. Preferably the second end fastener 58 fastening the airframe structure member to the second engine attachment structure member nonresilient isolator member, with the resilient isolator elastomeric member between the second engine attachment structure member nonresilient isolator member and the outer engine mount member.

In an alternative preferred embodiments with fasteners 58 at both ends of the airframe structure member, engine attachment structure members are hard mounts with intervening nonresilient members 56 and preferably free of resilient isolator members 44. In a preferred embodiment the hard mounts include a nonresilient bearing, preferably a moment minimizing bearing, preferably a spherical bearing at the engine attachment point. Preferably the moment minimizing nonresilient bearing eliminates the moment load input at the interface between the ends of the yoke and the engine attachment. Preferably the mount bearing minimizes the moment loading at the yoke ends. Preferably the system includes a sliding upper interface 60 and a bolted lower interface with a fastener 58. This preferably incorporates spherical bearings at the engine brackets to remove moments. A conical end taper of the yoke is preferably used to allow for locking using a tapered ID spherical bearing at the lower position. The sliding interface at the top is achieved by incorporating a bushing with a tapered ID and cylindrical OD on the yoke and having a spherical with a cylindrical ID slide on this bushing, this preferably providing a wear surface. Preferably with such configurations with the yoke ends and interfaces allow for an interchangeable mount system that is interchangeable and easily converted from a hard mount system to an isolated soft mount system by replacing the fittings at the engine and using the same aircraft structure yoke member 26 design. No changes to the interchangeable aircraft structure yoke members 26 are preferably required to change from a first soft mount system to a second hard mount system. With the hard mount spherical bearings at the end of the interchangeable aircraft structure yoke members 26 and the same attachment features for both soft mount elastomeric engine attachment structures and hard mount engine attachment structures fittings, the changes can be done simply and the load redistribution is minimal. In this way, the loads distributed to the airframe remain similar with either hard or soft mount systems. Preferably with this approach to a hard mount, it is not statically determinant for loading, with 7 constraints for the 6 degree of freedom engine that makes load determination dependant upon the yoke stiffness, primarily in the axial direction or engine thrust direction. The yoke stiffness is controlled for the hard mount system to be able to determine loads accurately and this also permits the same load calculations for soft mounts. In preferred embodiments an interchangeable aircraft structure yoke members 26 is provided for use with a variety of engine attachment structure mounts, including both hard mounts and soft mounts, with the interchangeable yoke member providing for the choose between different mount types chosen from the engine attachment structure member group comprised of different mount types including soft resilient mount engine attachment structure members and hard nonresilient mount engine attachment structure members. Preferably the two different types of engine mounts include systems comprised of hard mounts and isolating soft mounts.

In embodiments the first engine attachment structure member is a nonresilient engine mount with the first engine attachment structure member substantially free of a resilient material between the airframe structure member and the aircraft engine, preferably a hard mount with rigid nonresilient nonextensible first engine attachment structure members between the airframe structure member and the aircraft engine.

In preferred embodiments the first engine attachment structure member includes a protruding alignment engine boss interface 64. Preferably the protruding alignment engine boss interface 64 is tapered, preferably with a circular cross section and base. Preferably the second engine mount includes a protruding alignment engine boss.

In an embodiment the invention includes an aircraft engine mounting system 20 for mounting an aircraft engine 22 to an aircraft. The aircraft engine mounting system includes a airframe structure member yoke 26 having a first engine end and a distal second engine end, with an aircraft attachment between the first engine end and the distal second engine end, the aircraft attachment for attaching the airframe structure member yoke with the aircraft, the airframe structure member yoke having a airframe structure member yoke length YL from the first engine end to the distal second engine end. The aircraft engine mounting system includes a first engine attachment structure member engine mount 36, the airframe structure member yoke first engine end contained in the first engine attachment structure member engine mount, with the first engine attachment structure member engine mount having an outer engine attachment structure member engine mount member 38 grounded to the aircraft engine 22. The aircraft engine mounting system includes a second engine attachment structure member engine mount 40, the airframe structure member yoke second engine end contained in the second engine attachment structure member engine mount, with the second engine attachment structure member engine mount having an outer engine attachment structure member engine mount member 42 grounded to the aircraft engine 22. The first engine attachment structure member engine mount and the second engine attachment structure member engine mount are grounded to the aircraft engine with a mounts spacing MS between the first engine attachment structure member engine mount and the second engine attachment structure member engine mount. Preferably $MS<YL$, preferably $MS<0.96YL$, preferably $MS<0.93YL$, preferably $MS<0.91YL$, preferably $MS<0.89YL$, preferably $MS<0.87YL$ preferably $MS<0.86YL$, and most preferably $MS\leq0.85YL$.

Preferably the yoke is a homogeneous structural material)

In preferred embodiments the first engine mount is comprised at least one resilient elastomeric member 44, the at least one resilient elastomeric member 44 disposed between the outer engine mount member and the yoke first engine end.

In preferred embodiments the second engine mount is comprised at least one resilient extensible intervening material elastomeric member 44, the at least one resilient elastomeric member disposed between the outer engine mount member and the yoke second engine end.

In preferred embodiments the second engine mount is comprised at least one nonresilient nonextensible intervening material nonelastomeric member 56, the at least member least one nonresilient nonextensible intervening material nonelastomeric member disposed between the outer engine mount member and the yoke second engine end.

In preferred embodiments the first engine mount is comprised at least one nonresilient nonextensible intervening material nonelastomeric member 56, the at least member least one nonresilient nonextensible intervening material nonelastomeric member 56 disposed between the outer engine mount member and the yoke first engine end.

In preferred embodiments the airframe structure member yoke has an aircraft attachment width dimension AAWD, a first engine end width dimension FEEWD, and a second engine end width dimension SEEWD, with AAWD>FEEWD and AAWD>SEEWD.

Preferably with the yoke tapering from the AAWD to the FEEWD and SEEWD, preferably with the yoke aircraft attachment providing a broad center with narrow first engine end and narrow second engine end, with the broad center narrowing down to the narrow first and second ends.

In preferred embodiments the first engine attachment structure member engine mount includes a protruding alignment engine boss 64, preferably a tapered boss 64. Preferably the second engine mount includes a protruding alignment engine boss 64.

In an embodiment the invention includes a method of attaching an aircraft external propulsion thrust reaction engine 22 to an aircraft 24, preferably to a side of an aircraft fuselage. The method preferably includes providing an airframe structure member yoke 26 having a first engine end and a distal second engine end, with an aircraft attachment between the first engine end and the distal second engine end, the aircraft attachment for interfacing the airframe structure member yoke with the aircraft, the airframe structure member yoke having an airframe structure member length (YL) from the first engine end to the distal second engine end. The method preferably includes providing a first engine attachment structure member engine mount 36. The method preferably includes providing a second engine attachment structure member engine mount 40. The method preferably includes providing an aircraft engine 22, the aircraft engine having a first engine attachment structure member shear mounting mate 66 at a mount location foundation for mating with a shear mating member of the first engine attachment structure member engine mount. The first engine attachment structure member shear mounting mate 66 at the mount location foundation preferably includes a boss receiver with the mount location foundation including surrounding bolt holes for bolts. The aircraft engine having a second engine attachment structure member shear mounting mate 66 at a mount location foundation for mating with a shear mating member of the second engine attachment structure member engine mount, the first engine attachment structure member mounting mate spaced from the second engine attachment structure member mounting mate to provide a mounting mate spacing (MMS). The method preferably includes connecting the airframe structure member yoke to the aircraft engine with the first engine attachment structure member engine mount and the second engine attachment structure member engine mount wherein the first engine attachment structure member shear mating member mates with the aircraft engine first engine attachment structure member shear mounting mate and the second engine attachment structure member shear mating member mates with the aircraft engine second engine attachment structure member shear mounting mate with the airframe structure member length is captured between the first engine attachment structure member engine mount and the second engine attachment structure member engine mount.

Preferably the invention includes side mounting the propulsion reaction engine 22 to the fuselage side of an aircraft, wherein normal relative horizontal flight or horizontal rest on the ground one engine attachment structure mount is above the other mount with the aircraft structure yoke therebetween relatively vertically oriented.

In preferred embodiments connecting the airframe structure member yoke 26 to the aircraft engine with the first engine attachment structure member engine mount and the second engine attachment structure member engine mount includes, movably attaching the first engine attachment structure member with the airframe structure member yoke first engine end and movably attaching the second engine attachment structure member with the airframe structure member yoke second engine end. Preferably the first engine attachment structure member shear mating member is mated with the aircraft engine first engine attachment structure member shear mounting mate and the second engine attachment structure member shear mating member is mated with the aircraft engine second engine attachment structure member shear mounting mate after movably attaching the first engine attachment structure member with the airframe structure member yoke first engine end and movably attaching the second engine attachment structure member with the airframe structure member yoke second engine end. Preferably this includes fastening the movably attached first engine attachment structure member with the airframe structure member yoke first engine end after the first engine attachment structure member shear mating member is mated with the aircraft engine first engine attachment structure member shear mounting mate and the second engine attachment structure member shear mating member is mated with the aircraft engine second engine attachment structure member shear mounting mate. Preferably fastening includes tightening the movably attached loose center bolt fastener 58, with tightening of the bolt removing slide/movability of the movably attached mount that allowed attachment and receipt of the engine attachment structure member shear mating members mated with the aircraft engine attachment structure member shear mounting mates. Preferably fastening the movably attached first engine attachment structure member with the airframe structure member yoke first engine end and fastening the movably attached the second engine attachment structure member with the airframe structure member yoke second engine end after the first engine attachment structure member shear mating member is mated with the aircraft engine first engine attachment structure member shear mounting mate and the second engine attachment structure member shear mating member is mated with the aircraft engine second engine attachment structure member shear mounting mate. In a preferred assembly the yoke is assembled and attached to the airframe. The mounts are each installed loosely onto the ends of the yoke, and are allowed to slide outward as the engine is being brought in. The center bolts 58 are preferably toleranced so they are threaded into the barrel nuts slightly to retain the mounts movingly on the yoke ends during assembly. As the engine is moved horizontally inward, the tapered conical shear boss engages into the engine pad pilot bushing shear mate 66. Preferably when the mount is fully engaged, the four attachment bolts are inserted and torqued to complete the connection. Preferably lastly the mount to yoke attachment bolt fastener 58 is torqued down and locked. Preferably the yoke terminates into the tangential inboard side of each mount as an integral fitting to the mount, preferably with each mount attached to the yoke through a single bolt (less than 2 bolts per end). Preferably the single bolt fasteners 58 are threaded into barrel nuts which are captured within the yoke structure. Preferably the yoke is free of a clevis at each end.

Preferably providing a first engine attachment structure member engine mount with a shear mating member includes providing a first engine attachment structure member engine mount with a protruding boss shear mating member, which preferably protrudes from engine mount into a cavity void receiver in the aircraft engine, preferably protruding with a circular cross section, preferably a tapered boss with a terminated cone. In alternative the boss is cylindrical. Preferably the second engine mount shear mating member corresponds with the first.

Preferably providing a first engine attachment structure member engine mount with a shear mating member includes providing a first engine attachment structure member engine mount with a boss shear mating receiver. Preferably a protruding boss protruding from the aircraft engine into the mount cavity void receiver, preferably protruding with a circular cross section, preferably a tapered boss terminated cone. Alternatively preferred a cylindrical boss shape.

Preferably providing a first engine attachment structure member engine mount includes providing a first engine attachment structure member with an interior airframe structure member yoke first engine end receiver for receiving and containing the airframe structure member yoke first engine end.

Preferably providing a first engine attachment structure member engine mount includes providing a first engine attachment structure member with an interior airframe structure member yoke first engine end receiver for receiving and containing the airframe structure member yoke first engine end and providing a second engine attachment structure member engine mount includes providing a second engine attachment structure member with an interior airframe structure member yoke second engine end receiver for receiving and containing the airframe structure member yoke second engine end.

Preferably providing a providing a first engine attachment structure member engine mount includes providing a first engine attachment structure member with an exterior airframe structure member yoke first engine end protrusion for reception in the airframe structure member yoke first engine end, and preferably second engine attachment structure member engine mount includes providing a second engine attachment structure member with an exterior airframe structure member yoke first engine end protrusion for reception in the airframe structure member yoke first engine end.

Preferably providing a first engine attachment structure member engine mount includes providing a first engine attachment structure member with at least one resilient elastomeric isolator member.

Preferably providing a first engine attachment structure member engine mount includes providing a first engine attachment structure member with at least one resilient elastomeric isolator member and providing a second engine attachment structure member engine mount includes providing a second engine attachment structure member with at least one resilient elastomeric isolator member.

Preferably providing a first engine attachment structure member engine mount includes providing a first engine attachment structure member with at least one nonresilient nonextensible intervening material nonelastomeric member, the at least member least one nonresilient nonextensible intervening material nonelastomeric member disposed between the outer engine mount member and the yoke first engine end.

Preferably providing an airframe structure second engine end sliding interface member and a second engine attachment structure member sliding interface member, the second engine attachment structure member sliding interface member adjacent the airframe structure second engine end sliding interface member wherein the airframe structure second engine end sliding interface member is slidable a sliding distance relative to the second engine attachment structure member sliding interface member, preferably a wear-resistant bushing, preferably a bushing comprised of a polymer, preferably a fluoropolymer, preferably a wear resistant bushing comprised of polytetrafluoroethylene.

Preferably providing an airframe structure member yoke includes providing an airframe structure member with an aircraft attachment width dimension AAWD, a first engine end width dimension FEEWD, and a second engine end width dimension SEEWD, with AAWD>FEEWD and AAWD>SEEWD, preferably with the yoke tapering from the AAWD to the FEEWD and SEEWD, preferably with the yoke aircraft attachment providing a broad center with narrow first engine end and a narrow second engine end, the broad center narrowing down to the narrow first and second ends.

In an embodiment the invention includes a method of making an aircraft engine mounting system. The method preferably includes providing an airframe structure member yoke having a first engine end and a distal second engine end, with an aircraft attachment between the first engine end and the distal second engine end, the aircraft attachment for interfacing the airframe structure member yoke with the aircraft, the airframe structure member yoke having an airframe structure member length (YL) from the first engine end to the distal second engine end. The method preferably includes providing a first engine attachment structure member engine mount with a shear mating member. The method preferably includes providing a second engine attachment structure member engine mount with a shear mating member. The method preferably includes providing an aircraft engine, the aircraft engine having a first engine attachment structure member shear mounting mate at a mount location foundation, preferably with a boss receiver and bolt holes for bolts, for mating with the shear mating member of the first engine attachment structure member engine mount, the aircraft engine having a second engine attachment structure member shear mounting mate at a mount location foundation for mating with the shear mating member of the second engine attachment structure member engine mount, the first engine attachment structure member mounting mate spaced from the second engine attachment structure member mounting mate to provide a mounting mate spacing (MMS), wherein the first engine attachment structure member shear mating member mates with the aircraft engine first engine attachment structure member shear mounting mate and the second engine attachment structure member shear mating member mates with the aircraft engine second engine attachment structure member shear mounting mate with the airframe structure member length (YL) is captured between the first engine attachment structure member engine mount and the second engine attachment structure member engine mount.

Preferably the method includes movably attaching the first engine attachment structure member with the airframe structure member yoke first engine end and movably attaching the second engine attachment structure member with the airframe structure member yoke second engine end. Preferably the first engine attachment structure member shear mating member is mated with the aircraft engine first engine attachment structure member shear mounting mate and the second engine attachment structure member shear mating member is mated with the aircraft engine second engine attachment structure member shear mounting mate after movably attaching the first engine attachment structure member with the airframe structure member yoke first engine end and movably attaching the second engine attachment structure member with the airframe structure member yoke second engine end. Preferably including fastening the movably attached the first engine attachment structure member with the airframe structure member yoke first engine end (such as tightening the bolt to remove the slide/movability of the movably attached mount) after the first engine attachment structure member shear mating member is mated with the aircraft engine first engine attachment structure member shear mounting mate and the second engine attachment structure member shear mating member is mated with the aircraft engine second engine attachment structure member shear mounting mate. Preferably including fastening the movably attached the first engine attachment structure member with the airframe structure member yoke first engine end and fastening the movably attached the second engine attachment structure member with the airframe structure member yoke second engine end after the first engine attachment structure member shear mating member is mated with the aircraft engine first engine attachment structure member shear mounting mate and the second engine attachment structure member shear mating member is mated with the aircraft engine second engine attachment structure member shear mounting mate.

Preferably the method includes providing a first engine attachment structure member engine mount with a shear mating member includes providing a first engine attachment structure member engine mount with a protruding boss shear mating member, which preferably protrudes from the engine mount into the cavity void receiver in the aircraft engine, preferably protruding with a circular cross section, preferably a tapered boss terminated cone. In an alternative the boss is a cylindrical boss. Preferably the second engine mount shear mating member corresponds with the first.

Preferably the method includes providing a first engine attachment structure member engine mount with a shear mating member includes providing a first engine attachment structure member engine mount with a boss shear mating receiver, preferably with a protruding boss protruding from the aircraft engine into the mount cavity void receiver, preferably protruding with a circular cross section, preferably a tapered boss terminated cone, alternatively preferred a cylindrical boss.

Preferably the method includes providing a first engine attachment structure member engine mount including providing a first engine attachment structure member with an interior airframe structure member yoke first engine end receiver for receiving and containing the airframe structure member yoke first engine end.

Preferably the method includes providing a first engine attachment structure member with an interior airframe structure member yoke first engine end receiver for receiving and containing the airframe structure member yoke first engine end and providing a second engine attachment structure member engine mount includes providing a second engine attachment structure member with an interior airframe structure member yoke second engine end receiver for receiving and containing the airframe structure member yoke second engine end.

Preferably the method includes providing a first engine attachment structure member with an exterior airframe structure member yoke first engine end protrusion for reception in the airframe structure member yoke first engine end, and preferably second engine attachment structure member engine mount includes providing a second engine attachment structure member with an exterior airframe structure member yoke first engine end protrusion for reception in the airframe structure member yoke first engine end.

Preferably the method includes providing a first engine attachment structure member with at least one resilient elastomeric isolator member.

Preferably the method includes providing a first engine attachment structure member with at least one resilient elastomeric isolator member and providing a second engine attachment structure member engine mount includes providing a second engine attachment structure member with at least one resilient elastomeric isolator member.

Preferably the method includes providing a first engine attachment structure member with at least one nonresilient nonextensible intervening material nonelastomeric member, the at least member least one nonresilient nonextensible intervening material nonelastomeric member disposed between the outer engine mount member and the yoke first engine end.

Preferably the method includes providing an airframe structure second engine end sliding interface member and a second engine attachment structure member sliding interface member, the second engine attachment structure member sliding interface member adjacent the airframe structure second engine end sliding interface member wherein the airframe structure second engine end sliding interface member is slidable a sliding distance relative to the second engine attachment structure member sliding interface member, preferably a wear-resistant bushing, preferably a bushing comprised of a polymer, preferably a fluoropolymer, preferably a wear resistant bushing comprised of polytetrafluoroethylene.

Preferably the method includes providing an airframe structure member yoke with an aircraft attachment width dimension AAWD, a first engine end width dimension FEEWD, and a second engine end width dimension SEEWD, with AAWD>FEEWD and AAWD>SEEWD, preferably with the yoke tapering from the AAWD to the FEEWD and SEEWD, preferably with the yoke aircraft attachment providing a broad center with narrow first engine end and narrow second engine end, the broad center narrowing down to the narrow first and second ends.

In an embodiment the invention includes a method of making an aircraft engine mounting system. The method preferably includes providing an airframe structure member yoke having a first engine end and a distal second engine end, with an aircraft attachment between the first engine end and the distal second engine end, the aircraft attachment for interfacing the airframe structure member yoke with the aircraft, the airframe structure member yoke having an airframe structure member length (YL) from the first engine end to the distal second engine end. The method preferably includes providing a first engine attachment structure member engine mount with a shear mating member. The method preferably includes providing a second engine attachment structure member engine mount with a shear mating member. The method preferably includes providing an aircraft engine, the aircraft engine having a first engine attachment structure member shear mounting mate for mating with the shear mating member of the first engine attachment structure member engine mount, the aircraft engine having a second engine attachment structure member shear mounting mate for mating with the shear mating member of the second engine attachment structure member engine mount, the first engine attachment structure member mounting mate spaced from the second engine attachment structure member mounting mate to provide a mounting mate spacing (MMS), wherein the first engine attachment structure member shear mating member mates with the aircraft engine first engine attachment structure member shear mounting mate and the second engine attachment structure member shear mating member mates with the aircraft engine second engine attachment structure member shear mounting mate with the airframe structure member length (YL) is captured between the first engine attachment structure member engine mount and the second engine attachment structure member engine mount with an interlocking mount spacing (MS) with MS<YL.

Preferably the method includes providing a first engine attachment structure member engine mount for containing the airframe structure member yoke first engine end. Preferably the first engine attachment structure member has an interior airframe structure member yoke first engine end receiver for receiving and containing the airframe structure member yoke first engine end.

Preferably the method includes providing a second engine attachment structure member engine mount for containing the airframe structure member yoke second engine end, preferably a receiver for receiving and containing the airframe structure member yoke first engine end.

Preferably the method includes movably attaching the first engine attachment structure member with the airframe structure member yoke first engine end and movably attaching the second engine attachment structure member with the airframe structure member yoke second engine end. Preferably the first engine attachment structure member shear mating member is mated with the aircraft engine first engine attachment structure member shear mounting mate and the second engine attachment structure member shear mating member is mated with the aircraft engine second engine attachment structure member shear mounting mate after movably attaching the first engine attachment structure member with the airframe structure member yoke first engine end and movably attaching the second engine attachment structure member with the airframe structure member yoke second engine end. Preferably including fastening the movably attached the first engine attachment structure member with the airframe structure member yoke first engine end (such as with bolt tightening to remove the slide/movability of the movably attached mount) after the first engine attachment structure member shear mating member is mated with the aircraft engine first engine attachment structure member shear mounting mate and the second engine attachment structure member shear mating member is mated with the aircraft engine second engine attachment structure member shear mounting mate. Preferably including fastening the movably attached the first engine attachment structure member with the airframe structure member yoke first engine end and fastening the movably attached the second engine attachment structure member with the airframe structure member second engine end after the first engine attachment structure member shear mating member is mated with the aircraft engine first engine attachment structure member shear mounting mate and the second engine attachment structure member shear mating member is mated with the aircraft engine second engine attachment structure member shear mounting mate.

The method preferably includes providing a first engine attachment structure member engine mount with a shear mating member, preferably a protruding boss shear mating member, preferably protrudes from engine mount into cavity void receiver in the aircraft engine, preferably protruding with a circular cross section, preferably a tapered boss terminated cone.

Preferably the method includes providing a first engine attachment structure member with an interior airframe structure member yoke first engine end receiver for receiving and containing the airframe structure member yoke first engine end and providing a second engine attachment structure member engine mount includes providing a second engine attachment structure member with an interior airframe structure member yoke second engine end receiver for receiving and containing the airframe structure member yoke second engine end.

Preferably the method includes providing a first engine attachment structure member with an exterior airframe structure member yoke first engine end protrusion for reception in the airframe structure member yoke first engine end, and preferably the second engine attachment structure member engine mount includes providing a second engine attachment structure member with an exterior airframe structure member yoke first engine end protrusion for reception in the airframe structure member yoke first engine end.

Preferably the method includes providing a first engine attachment structure member engine mount with at least one resilient elastomeric isolator member.

Preferably the method includes providing a first engine attachment structure member engine mount with at least one resilient elastomeric isolator member and providing a second engine attachment structure member engine mount includes providing a second engine attachment structure member with at least one resilient elastomeric isolator member.

Preferably the method includes providing a first engine attachment structure member engine mount member with at least one nonresilient nonextensible intervening material nonelastomeric member, the at least member least one nonresilient nonextensible intervening material nonelastomeric member disposed between the outer engine mount member and the yoke first engine end.

Preferably the method includes providing an airframe structure second engine end sliding interface member and a second engine attachment structure member sliding interface member, the second engine attachment structure member sliding interface member adjacent the airframe structure second engine end sliding interface member wherein the airframe structure second engine end sliding interface member is slidable a sliding distance relative to the second engine attachment structure member sliding interface member, preferably a wear-resistant bushing, preferably a bushing comprised of a polymer, preferably a fluoropolymer, preferably a wear resistant bushing comprised of polytetrafluoroethylene.

Preferably the method includes providing an airframe structure member yoke member with an aircraft attachment width dimension AAWD, a first engine end width dimension FEEWD, and a second engine end width dimension SEEWD, with AAWD>FEEWD and AAWD>SEEWD, preferably with the yoke tapering from the AAWD to the FEEWD and SEEWD, preferably with the yoke aircraft attachment providing a broad center with narrow first engine end and a second engine end, broad center narrowing down to the narrow first and second ends.

In an embodiment the invention includes a method of making an aircraft engine mounting system for an aircraft. The method preferably includes providing an airframe structure member yoke having a first engine end and a distal second engine end, with an aircraft attachment between the first engine end and the distal second engine end, the aircraft attachment for interfacing the airframe structure member yoke with the aircraft, the airframe structure member yoke having an airframe structure member length (YL) from the first engine end to the distal second engine end. The method preferably includes providing a first engine attachment structure member engine mount, the first engine attachment structure member engine mount having an interior airframe structure member yoke first engine end receiver for receiving and containing the airframe structure member yoke first engine end.

The method preferably includes providing a second engine attachment structure member engine mount. The method preferably includes providing an aircraft engine, the aircraft engine having a first engine attachment structure member shear mounting mate for mating with a shear mating member of the first engine attachment structure member engine mount, the aircraft engine having a second engine attachment structure member shear mounting mate for mating with a shear mating member of the second engine attachment structure member engine mount, the first engine attachment structure member mounting mate spaced from the second engine attachment structure member mounting mate to provide a mounting mate spacing (MMS). The method preferably includes connecting the airframe structure member yoke to the aircraft engine with the first engine attachment structure member engine mount and the second engine attachment structure member engine mount wherein the first engine attachment structure member shear mating member mates with the aircraft engine first engine attachment structure member shear mounting mate and the second engine attachment structure member shear mating member mates with the aircraft engine second engine attachment structure member shear mounting mate with the airframe structure member length (YL) is captured between the first engine attachment structure member engine mount and the second engine attachment structure member engine mount. Preferably providing a second engine attachment structure member engine mount includes providing a second engine attachment structure member with an interior airframe structure member yoke second engine end receiver for receiving and containing the airframe structure member yoke second engine end. Preferably engine mount includes a wear-resistant bushing, preferably a bushing comprised of _a polymer, preferably a fluoropolymer, preferably a wear resistant bushing comprised of polytetrafluoroethylene.

In embodiments the invention includes an aircraft engine mounting system for mounting an aircraft engine to an aircraft 24 with a plurality of different first and second engine mounts 36, 40, preferably including changing between hard engine mounts and soft engine mounts over a period of time. The system preferably includes an interchangeable airframe structure yoke member 26 having first engine end 28 and distal second engine end 30, with aircraft attachment 34 between the first engine end and the distal second engine end. The interchangeable airframe structure member 26 preferably having the airframe structure member length YL from the first engine end 28 to the distal second engine end 30. The system preferably includes a first aircraft engine first engine attachment structure member, a first airframe structure member first engine end contained by the first aircraft engine first engine attachment structure member, with the first aircraft engine first engine attachment structure member having an outer engine mount member for grounding to a first aircraft engine of a first aircraft, a first aircraft engine second engine attachment structure member, a first airframe structure member distal second engine end contained by the first aircraft engine second engine attachment structure member, with the first aircraft engine second engine attachment structure member having an outer engine mount member for grounding to the first aircraft engine of the first aircraft, the first aircraft engine first engine attachment structure member and the first aircraft engine second engine attachment structure member for grounding to the first aircraft engine with a first aircraft engine mounts spacing MS between the first aircraft engine first engine attachment structure member and the first aircraft engine second engine attachment structure member interlocking the first airframe structure member length YL between the first aircraft engine first engine attachment structure member and the first aircraft engine second engine attachment structure member. The system preferably includes a secondary aircraft engine first engine attachment structure member (different from the first aircraft engine first engine attachment structure member), a second airframe structure member first engine end contained by the secondary aircraft engine first engine attachment structure member, with the secondary aircraft engine first engine attachment structure member having an outer engine mount member for grounding to the first aircraft engine, a secondary aircraft engine second engine attachment structure member (different from the first aircraft engine second engine attachment structure member), a second airframe structure member distal second engine end contained by the secondary aircraft engine second engine attachment structure member, with the secondary aircraft engine second engine attachment structure member having an outer engine mount member for grounding to the aircraft engine, the secondary aircraft engine first engine attachment structure member and the secondary aircraft engine second engine attachment structure member for grounding to the aircraft engine with a second aircraft engine mounts spacing MS between the secondary aircraft engine first engine attachment structure member and the secondary aircraft engine second engine attachment structure member interlocking the airframe structure member length YL between the secondary aircraft engine first engine attachment structure member and the secondary aircraft engine second engine attachment structure member. Preferably the first aircraft engine first engine attachment structure member and the first aircraft engine second engine attachment structure member are hard mounts and comprised of a plurality of nonresilient intervening members 56, preferably with the nonresilient intervening members 56 including a nonresilient bearing, preferably a moment minimizing bearing, preferably a spherical bearing at the engine attachment point. Preferably the secondary aircraft engine first engine attachment structure member and the secondary aircraft engine second engine attachment structure member are soft mounts and comprised of a plurality of resilient intervening isolating members 44. Preferably the aircraft structure yoke 26 is interchangeable between a variety of hard mounts and soft mounts 36, 40 which receive and contain the ends 28, 30 of the yoke 26, wherein the yoke with airframe structure member length YL is interchangeable between a variety of mounts, preferably chosen from the engine mount attachment structure member group comprised of soft resilient mount engine attachment structure members and hard nonresilient mount engine attachment structure members.

In preferred embodiments with fasteners 58 are at both ends of the airframe structure member, and the engine attachment structure members are hard mounts with intervening nonresilient members 56 and preferably free of resilient isolator members 44. In a preferred embodiment the hard mounts include a nonresilient bearing, preferably a moment minimizing bearing, preferably a spherical bearing at the engine attachment point. Preferably the moment minimizing nonresilient bearing eliminates the moment load input at the interface between the ends of the yoke and the engine attachment. Preferably the mount bearing minimizes the moment loading at the yoke ends. Preferably the system includes a sliding upper interface 60 and a bolted lower interface with a fastener 58, also incorporating spherical bearings at the engine brackets to remove moments. A conical end taper of the yoke is used to allow for locking using a tapered ID spherical bearing at the lower position. The sliding interface at the top is achieved by incorporating a bushing with a tapered ID and cylindrical OD on the yoke and having a spherical with a cylindrical ID slide on this bushing. This preferably provides a wear surface. Preferably with such configurations with the yoke ends and interfaces allows for an interchangeable mount system that is interchangeable and easily converted from a hard mount to an isolated soft mount system by replacing the fittings at the engine. No changes to the interchangeable aircraft structure yoke members 26 are required. With the spherical bearings at the end of the interchangeable aircraft structure yoke members 26 and the same attachment features for both soft mount elastomeric engine attachment structures and hard mount engine attachment structures fittings, the changes can be done and the load redistribution is minimal. In this way, the loads distributed to the airframe remain similar with either hard or soft mount systems. Preferably with this approach to a hard mount, it is not statically determinant for loading, with 7 constraints for the 6 degree of freedom engine that makes load determination dependant upon the yoke stiffness, primarily in the axial direction or engine thrust direction. The yoke stiffness is controlled for the hard mount system to be able to determine loads accurately and this also permits the same load calculations for soft mounts. In preferred embodiments an interchangeable aircraft structure yoke members 26 is provided for use with a variety of engine attachment structures, including both hard mounts and soft mounts, with the interchangeable yoke member allowing for the choose between different mount types, including soft mounts and hard mounts.

In embodiments the first engine attachment structure member is a nonresilient engine mount with the first engine attachment structure member substantially free of a resilient material between the airframe structure member and the aircraft engine, preferably a hard mount with rigid nonresilient nonextensible first engine attachment structure members between the airframe structure member and the aircraft engine.

In an embodiment the invention includes an aircraft engine mounting system for mounting an aircraft engine to an aircraft. The aircraft engine mounting system preferably includes a forward yoke having a first engine end and a distal second engine end, with a forward aircraft attachment between the first engine end and the distal second engine end, the forward aircraft attachment for attaching the forward yoke with the aircraft forward in the aircraft, the forward yoke having a yoke length YL from the first engine end to the distal second engine end. The aircraft engine mounting system preferably includes a first forward engine mount, the yoke first engine end contained in the first forward engine mount, with the first engine mount having an outer engine mount member grounded to the aircraft engine. The aircraft engine mounting system preferably includes a second forward engine mount, the yoke second engine end contained in the second forward engine mount, with the second forward engine mount having an outer engine mount member grounded to the aircraft engine. The aircraft engine mounting system preferably includes the first forward engine mount and the second forward engine mount grounded to the aircraft engine with a mounts spacing MS between the first engine mount and the second engine mount. The aircraft engine mounting system preferably includes a third aft engine mount, the third aft engine mount securing the aircraft engine to the aircraft, the third aft engine mount disposed aft of the first forward engine mount, the second forward engine mount, the forward yoke, and the forward aircraft attachment. The aircraft engine mounting system preferably includes the third aft engine mount with a link assembly, the link assembly grounded to the aircraft engine. Preferably the third aft engine mount includes an airframe structure housing member, the airframe structure housing member grounded with the aircraft. Preferably the third aft engine mount airframe structure housing member includes a crack stop between a primary load path with the link assembly and secondary load path with the link assembly. Preferably the yoke includes a first engine end yoke arm bolt, the first engine end yoke arm bolt extending from the first engine end through the airframe structure yoke member towards the airframe structure yoke member aircraft attachment, and a second engine end yoke arm bolt, the second engine end yoke arm bolt extending from the second engine end through the airframe structure yoke member towards the airframe structure yoke member aircraft attachment.

In an embodiment the invention includes an aircraft engine mounting system airframe structure yoke member for mounting a plurality of aircraft engine mounts between an aircraft and an engine, the airframe structure yoke member having a first engine end and a distal second engine end, with an aircraft attachment between the first engine end and the distal second engine end, the aircraft attachment for interfacing the airframe structure member with an aircraft, the airframe structure member having an airframe structure member length (YL) from the first engine end to the distal second engine end, the airframe structure yoke member first engine end for reception in a first engine attachment structure mount member, the airframe structure yoke member second engine end for reception in a second engine attachment structure mount member, with the airframe structure member length (YL) preferably interlocked between the aircraft engine first engine attachment structure mount member and the aircraft engine second engine attachment structure mount member. Preferably the aircraft engine mounting system airframe structure yoke member includes a first engine end yoke arm bolt, the first engine end yoke arm bolt extending from the first engine end through the airframe structure yoke member towards the airframe structure yoke member aircraft attachment. Preferably the aircraft engine mounting system airframe structure yoke member includes a second engine end yoke arm bolt, the second engine end yoke arm bolt extending from the second engine end through the airframe structure yoke member towards the airframe structure yoke member aircraft attachment. Preferably the yoke arm bolts clamp the yoke arm, preferably precompressing the nonelastomeric yoke arm. Preferably the yoke arm bolts preferably provide crack arresting in the yoke arm and inhibit the growth and propagation of cracks through the non-bolt material structure of the arm. Preferably the yoke arm bolts provide a fail safe load path through the yoke arm between the engine attachment structure mount and the airframe structure yoke member aircraft attachment. Preferably the first engine end yoke arm bolt receives an aircraft engine first engine attachment structure mount member fastener for fastening the airframe structure yoke member first engine end with the aircraft engine first engine attachment structure mount member. Preferably the second engine end yoke arm bolt receives an aircraft engine second engine attachment structure mount member fastener for fastening the airframe structure yoke member second engine end with the aircraft engine second engine attachment structure mount member.

FIG. 31-45 illustrate embodiments of the aircraft engine mounting system with the forward yoke and third aft engine mount for mounting the aircraft engine to the aircraft. The yoke includes the extending yoke arm bolts.

Figure 31:
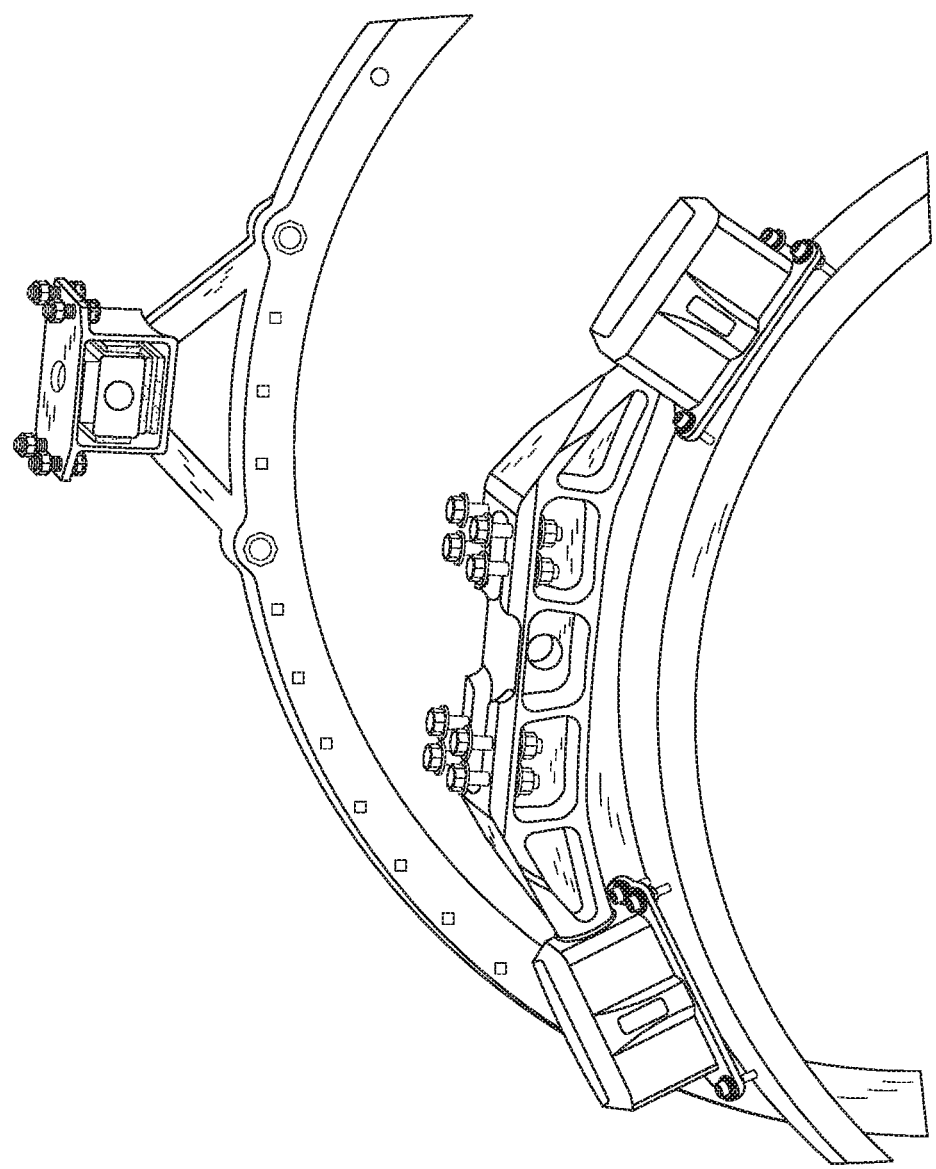
FIG. 31 illustrates the aft engine mount and forward yoke.

As shown in FIG. 31, mounting system preferably includes the two forward engine mounts with the forward yoke, and the aft mount. As shown in FIG. 31, the forward mount structure secures the engine forward in the aircraft and the aft mount secures the aft of the engine aft in the aircraft. The forward engine mounts attach to the engine at two spaced points and the forward yoke attaches to the airframe preferably at one location on the pylon. The aft mount preferably attaches to the airframe pylon at one point and the aft bypass ring of the engine at two spaced locations with its link assembly. The forward mount reacts loads in the vertical, lateral and thrust direction as well as providing roll and a limited pitch restraint. The aft mount reacts vertical and lateral loading and in combination with the forward mount, provides pitch and yaw restraint. In this system the mountings preferably provides 8 degrees of restraint.

The yoke is preferably a multiple part assembly of machined components that provides a fail-safe yoke assembly, using preferably only one primary metal component and includes fail-safe support yoke arm bolts extending through the two arms.

Figure 32:
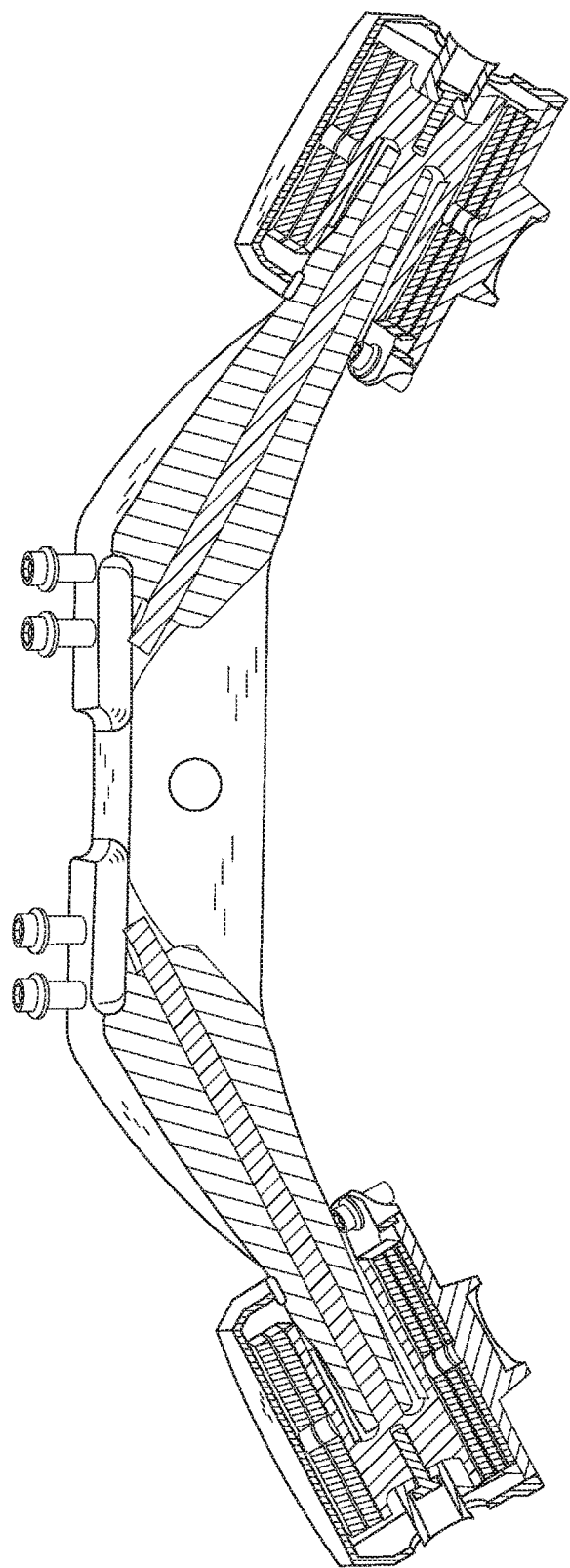
FIG. 32 illustrates the forward airframe structure yoke member with arm bolts and fastened engine mounts.

As illustrated in FIG. 32 forward engine mounts include the outer housing and inner elastomer packages that provide controlled stiffness in the radial axial and tangential direction. The inner members of the engine mounts receive the yoke ends in an interlocked system. Preferably a bolt fastener extends through the inner member securing the yoke to the engine mount, preferably with the fastener received in the end of the yoke arm bolt that extends out through the airframe structure yoke member arm towards the airframe structure yoke member aircraft attachment.

Figure 33:
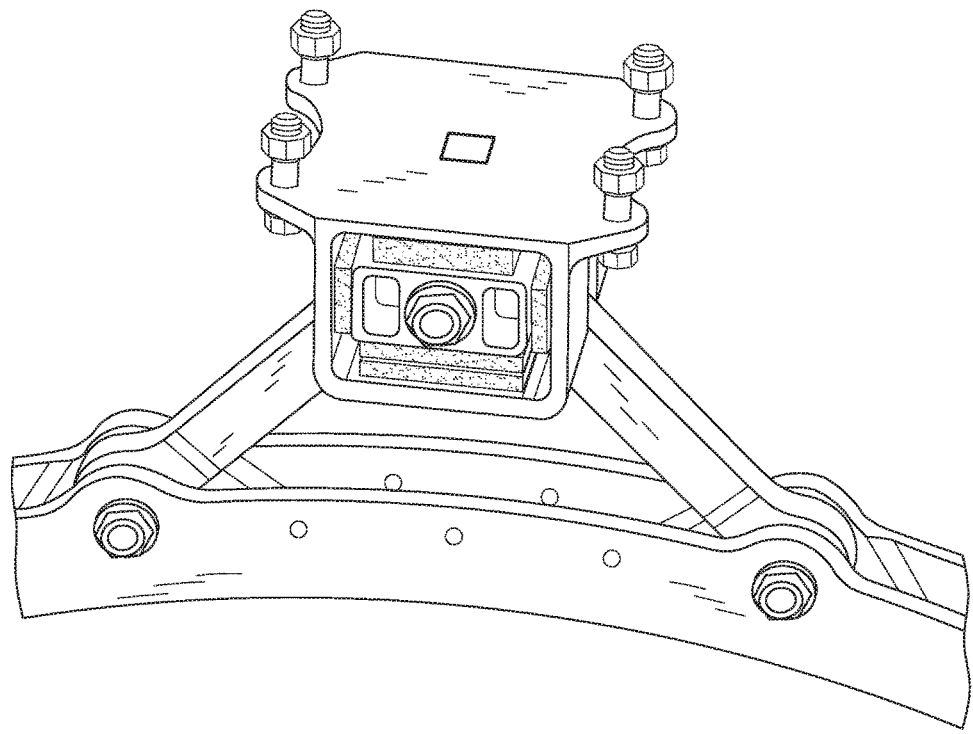
FIG. 33 illustrates the aft engine mount with a link assembly having two link arms grounded to the engine ring.
Figure 34:
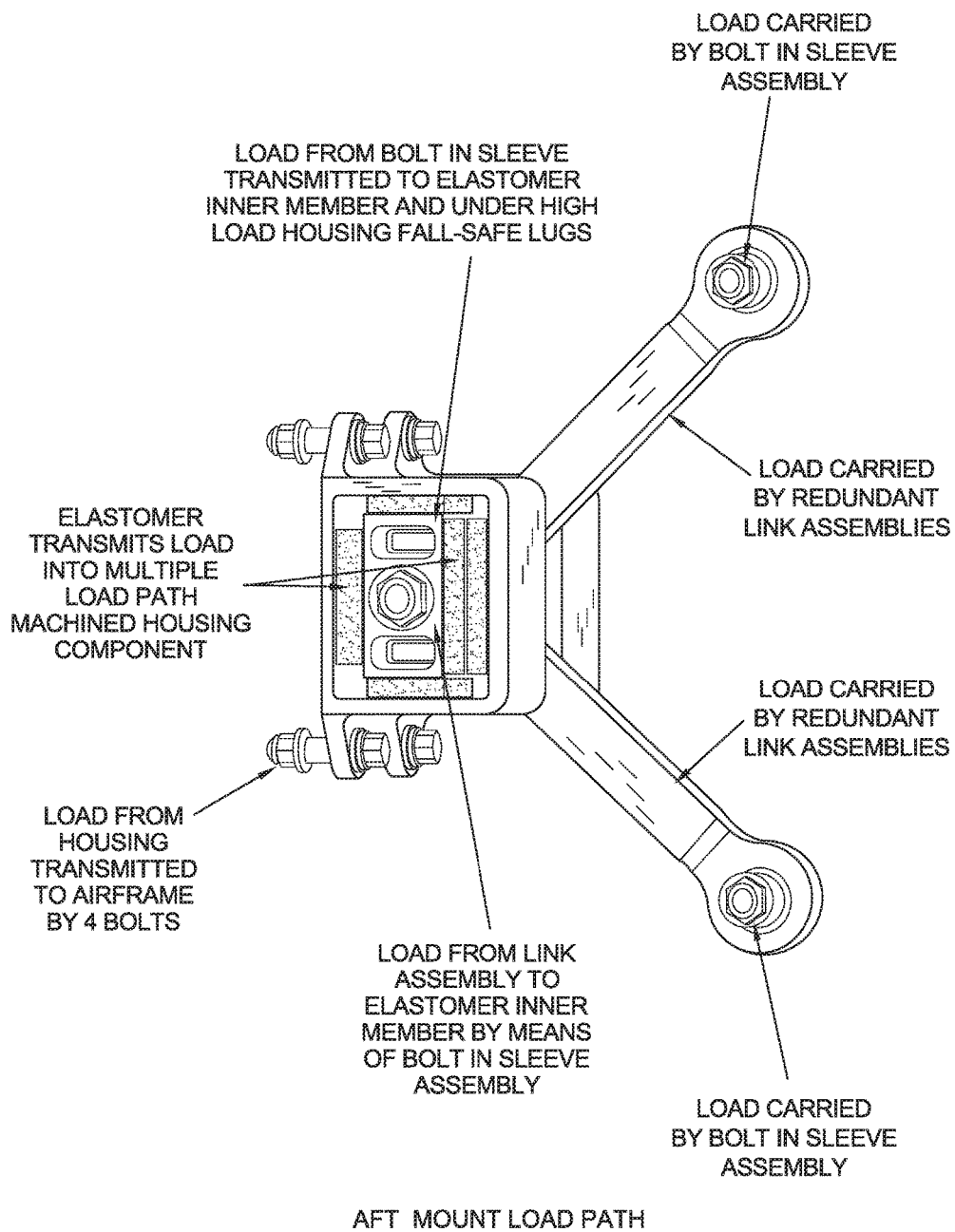
FIG. 34 illustrates the aft engine mount load path.

As illustrated in FIG. 33 the aft mount preferably includes a redundant load path housing containing the elastomer packages to which the link assembly is attached. The link assembly is preferably comprised of four links arranged such that the upper and lower link arms have redundant load paths. The upper and lower link arms are preferably adjustable in angle relative to each other. The spherical bearings at the link extremes preferably permit the accommodation of axial motion and tolerances without generating load. Preferably the link and isolator mount are joined by a bolt in sleeve joint providing a waiting fail-safe load path. The link assembly is preferably attached to the engine bypass duct ring with a waiting fail-safe bolt in sleeve arrangement similar to the isolator to link attachment.

Figure 35:
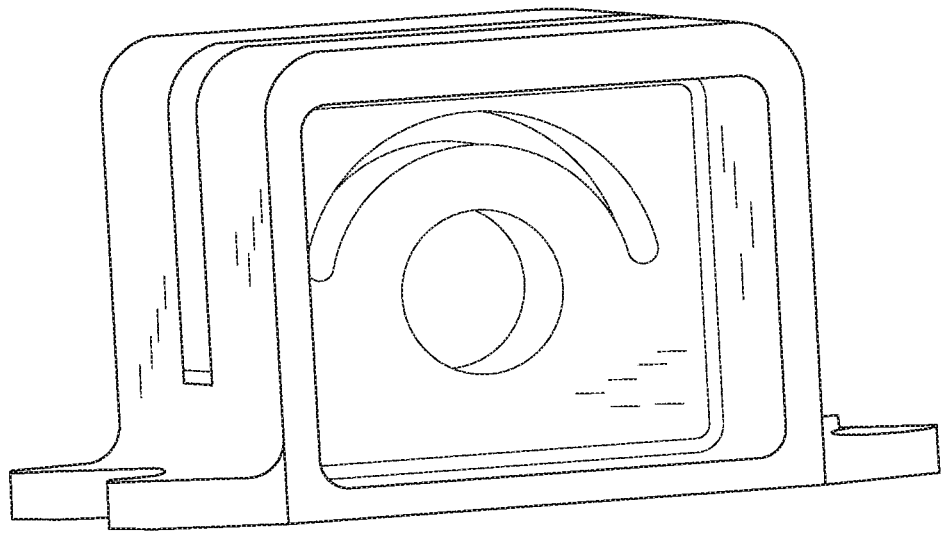
FIG. 35 illustrates a perspective view of the aft housing aft third engine mount airframe structure housing member.
Figure 37:
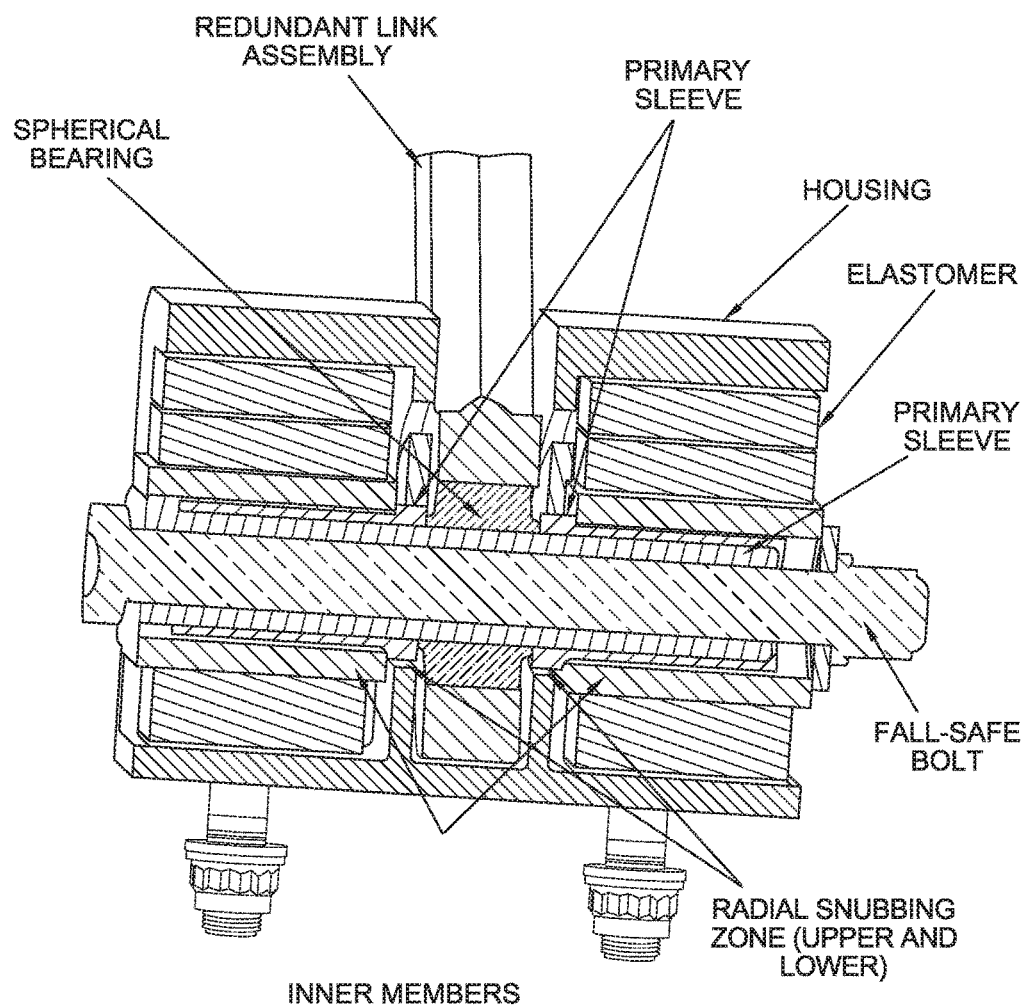
FIG. 37 illustrates a sectional view of the aft mount link to isolator with a failsafe bolt-in-sleeve.

The housing of the isolator mounts is a single machined metal component such as shown in FIG. 35. The housing is preferably bolted to the airframe through four bolts in a flange style attachment. The loading from the engine is placed on the housing preferably through two load paths. The first and primary loading path is through the elastomer packages. This loading is applied to the inside of the pockets within the housing. A secondary snubbing load path is provided in the inner lugs of the housing created in the web. The loading paths are shown in FIG. 36. The isolator mount and housing is fail-safe with redundant load paths and crack stops to ensure any single local failure cannot cause the loss of load carrying capability as shown in 36. Additionally, under normal loading all loads go through the elastomer. At high loading the snubbing feature will be engaged by the sleeve attaching the link assembly to the elastomer inner members. Higher loads will then be directly transmitted to the housing, bypassing the elastomer.

The mount elastomer assemblies include elastomer bonded to an aluminum inner member and outer plates are located within recesses in the housing. Layers of elastomer are located on the radial and tangential sides of the inner member and react loads in each of these directions.

Figure 38:
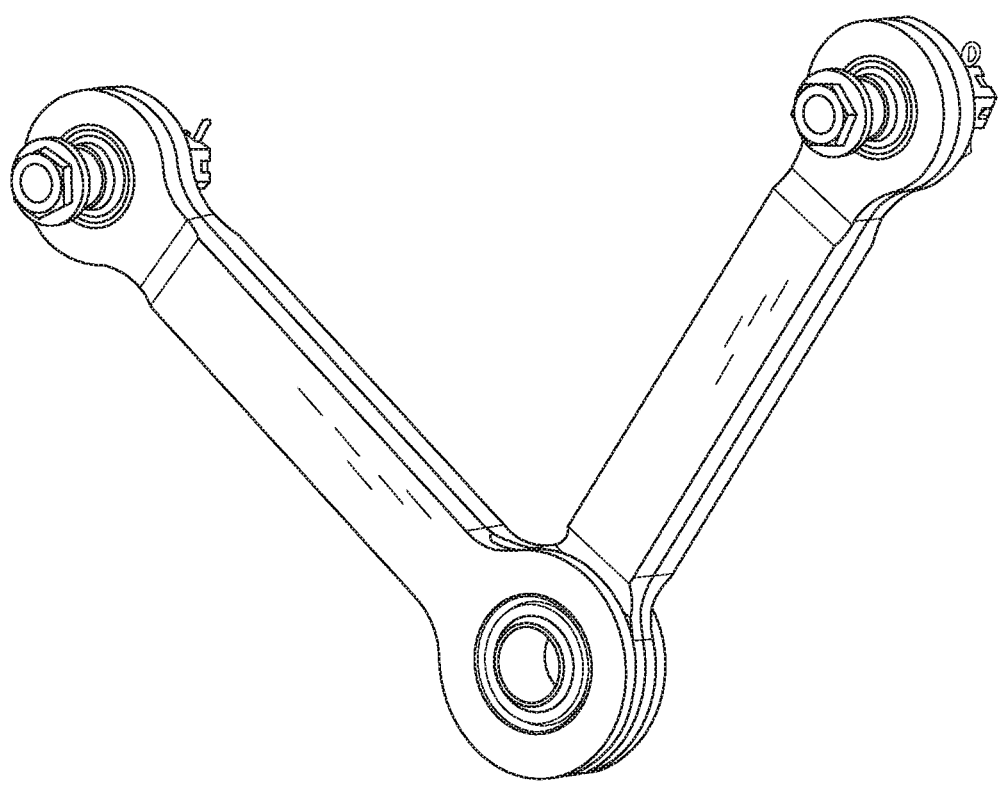
FIG. 38 illustrates an aft mount link assembly.
Figure 39:
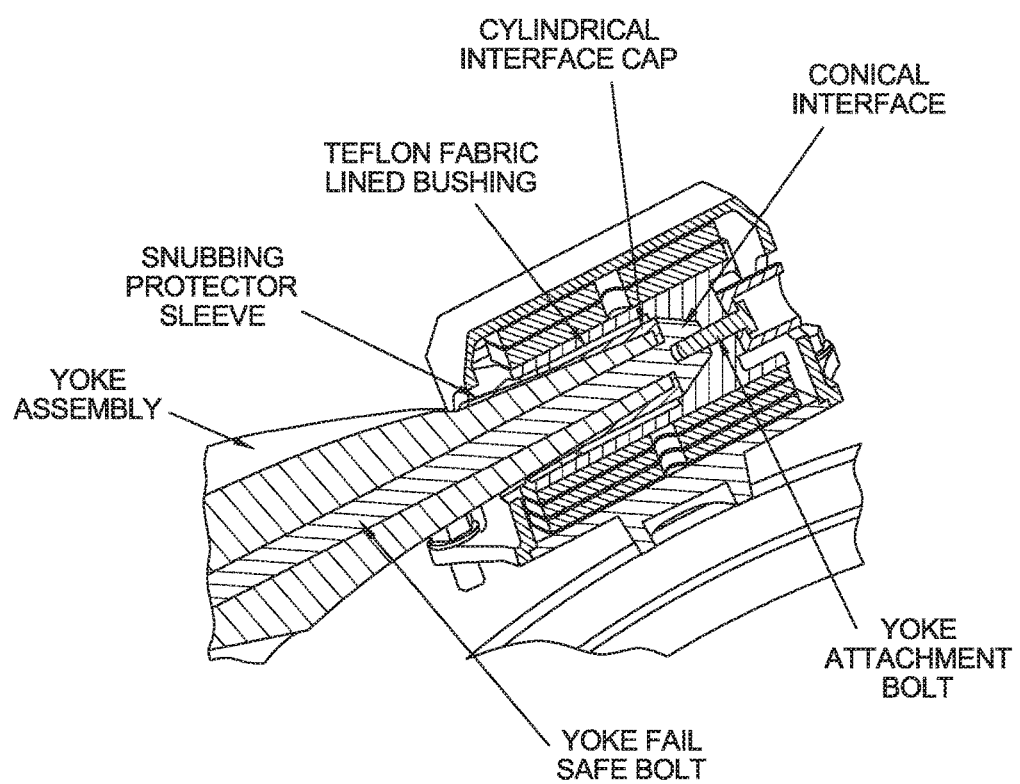
FIG. 39 illustrates the integral fitting airframe structure yoke member into the mount with the yoke arm bolt receiving yoke attachment bolt fastener.

The link assembly at the aft mount preferably includes four metal components and three lined spherical bearings such as illustrated in FIG. 38.

Figure 40:
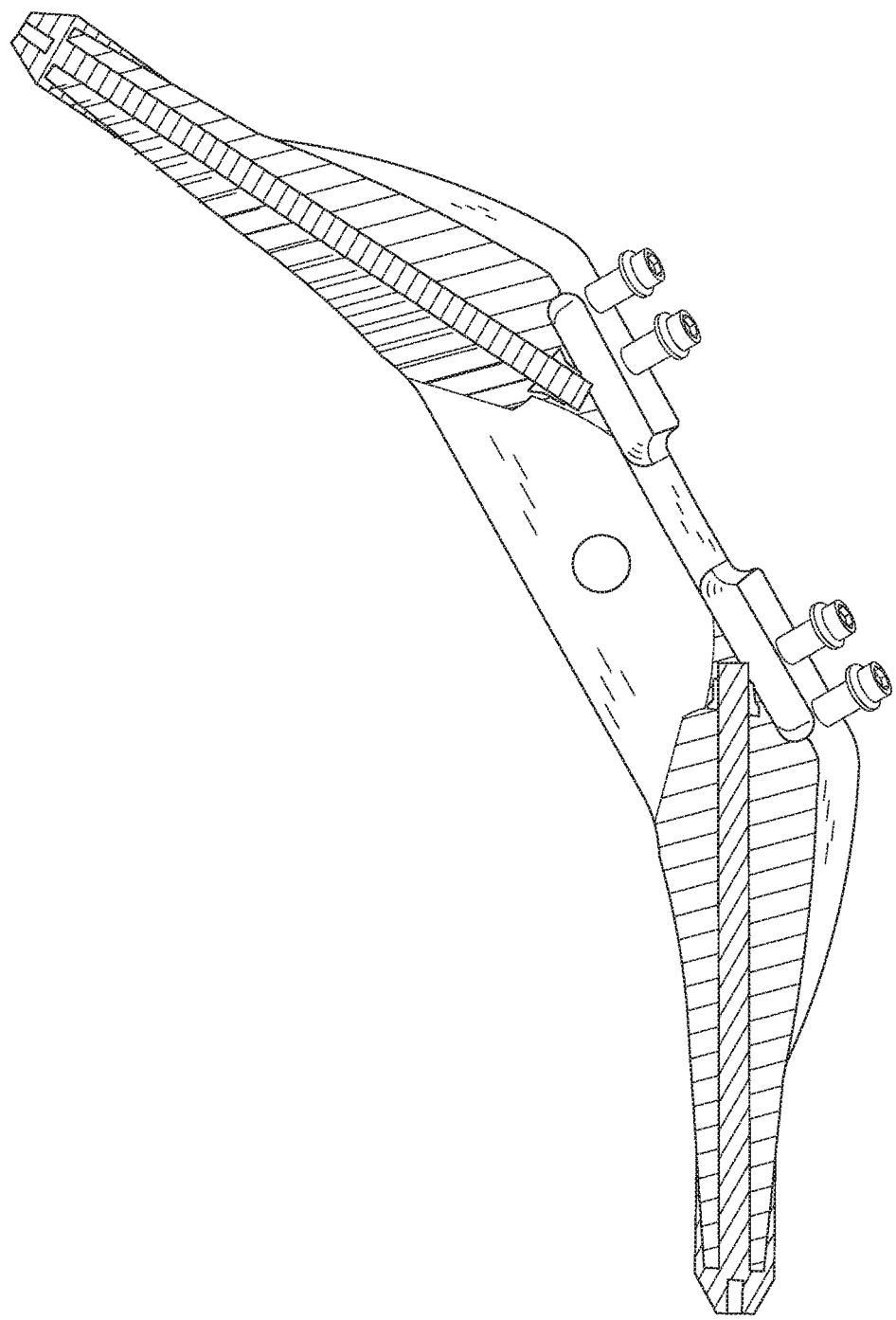
FIG. 40 illustrates a cross-section of the airframe structure yoke member showing engine end yoke arm bolts.
Figure 41:
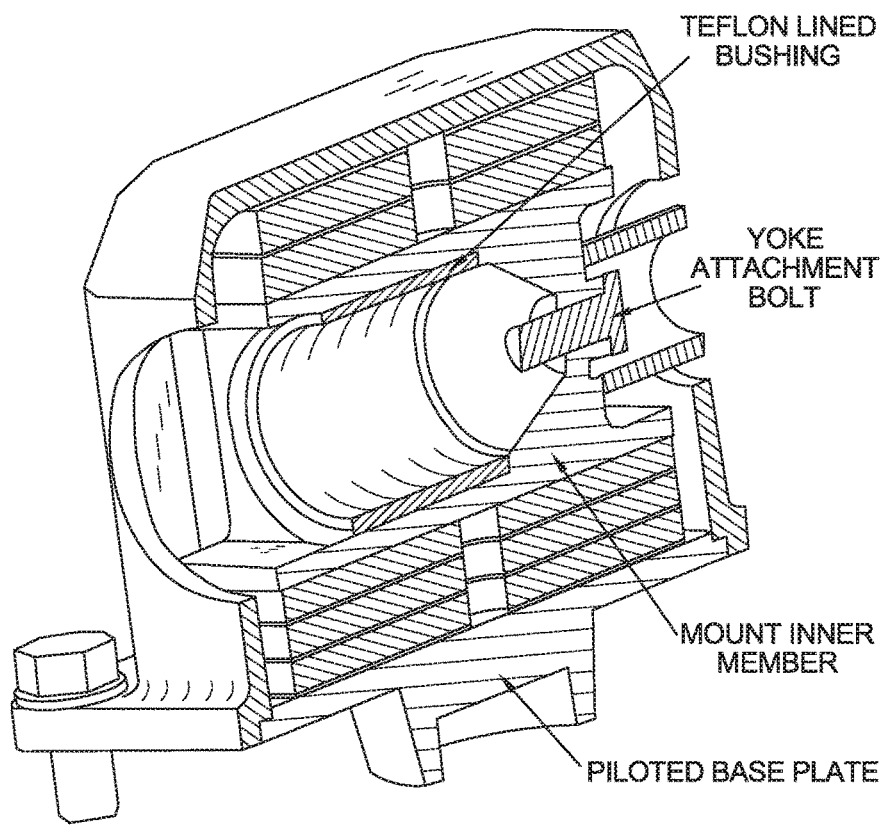
FIG. 41 illustrates an internal sectional view of a forward mount with the yoke attachment bolt fastener for reception in the yoke arm bolt end.
Figure 42:
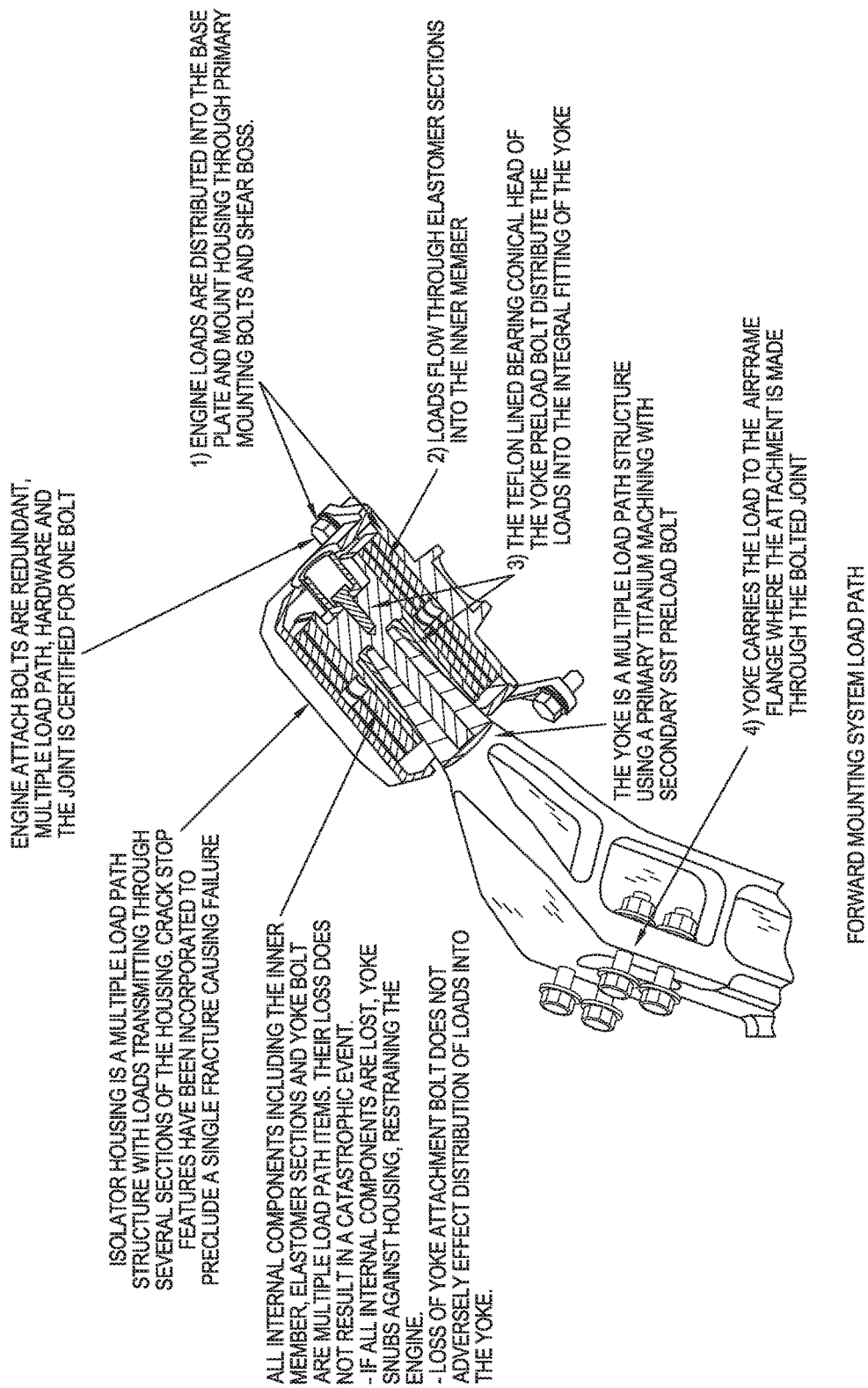
FIG. 42 illustrates the forward mounting system load path.

Through the upper and lower arms of the yoke long stainless steel pre-compression bolts are incorporated through the center of the beam as shown in FIG. 40. These yoke arm bolts are preferably pre tensioned at assembly to provide a compression stress in the yoke main beam. In the event of a crack propagating in the yoke these bolts provide an alternate load path providing a fail-safe feature in the yoke. A single crack extending inward in the main beams will not cause loss of the load carrying capability of the yoke.

Preferably the inner member is locked to the yoke with the conical pre-compression bolt head and a conical recess in the inner member being clamped by the isolator to yoke attachment bolt fastener. This interface when bolted provides a reaction torque well above the cocking stiffness of the mount avoiding rotation and fretting/wear concerns at the isolator to yoke joint. Preferably a Teflon-lined bushing is press fit into the inner member of the mount to provide a barrier to fretting and wear between the yoke and inner member due to high frequency vibration at the interface. If the attachment bolt fails, the loads will still be distributed into the yoke through the bearing.

Figure 43:
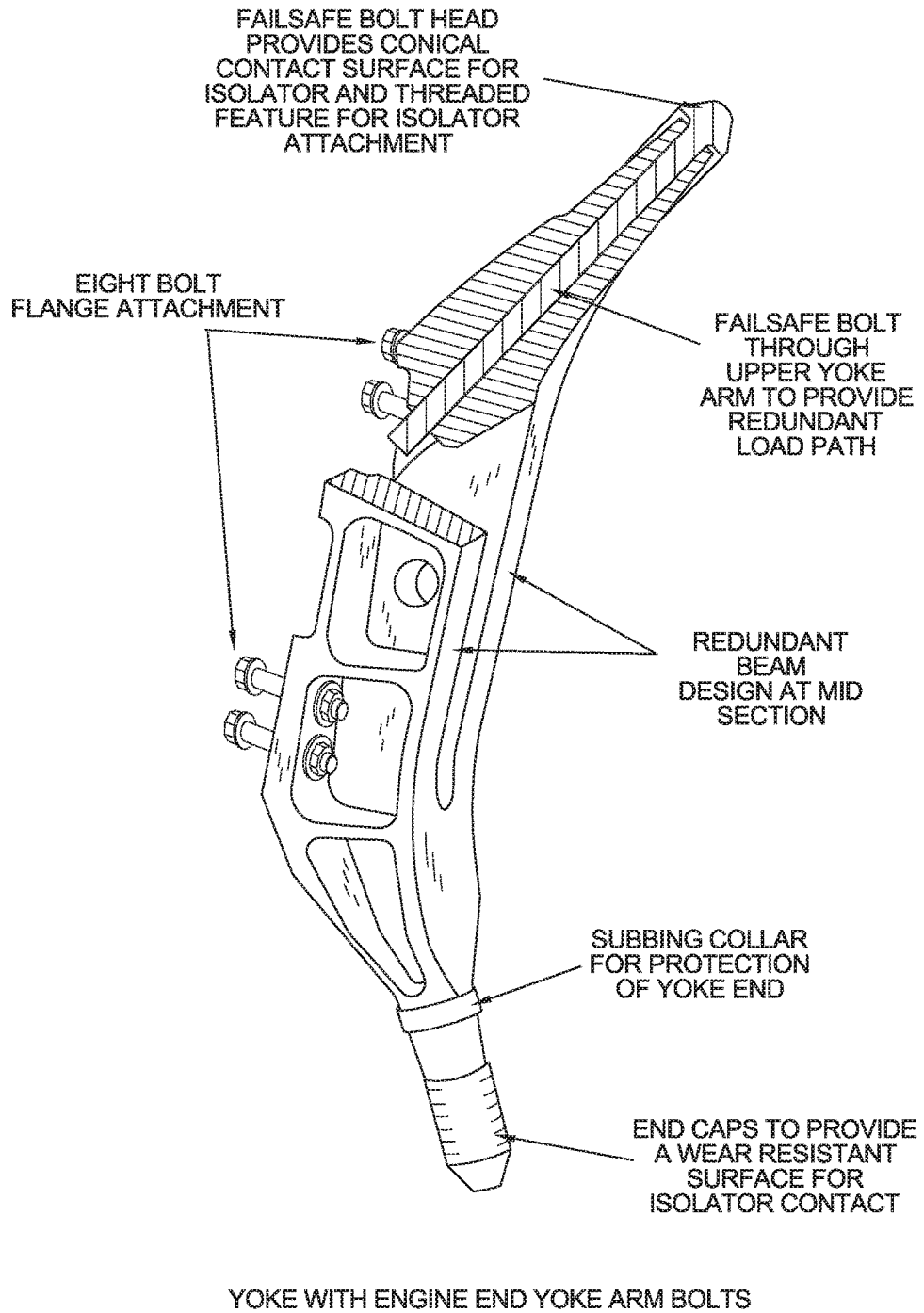
FIG. 43 illustrates the airframe structure yoke member with the engine end yoke arm bolts.

As illustrated in FIG. 43 the yoke is a multiple load path structure consisting of a single-piece webbed structure that is forged and machined from titanium alloy metal and two stainless steel precompression yoke arm bolts. Preferably the yoke main beam section through the center is split into two sections by a through cut to provide additional redundancy. Preferably the conical head on the precompression bolt provides a wear resistant interface with the isolator and is threaded to accept the isolator to yoke attachment bolt fastener. This bolt then clamps the isolator to the yoke.

Figure 44:
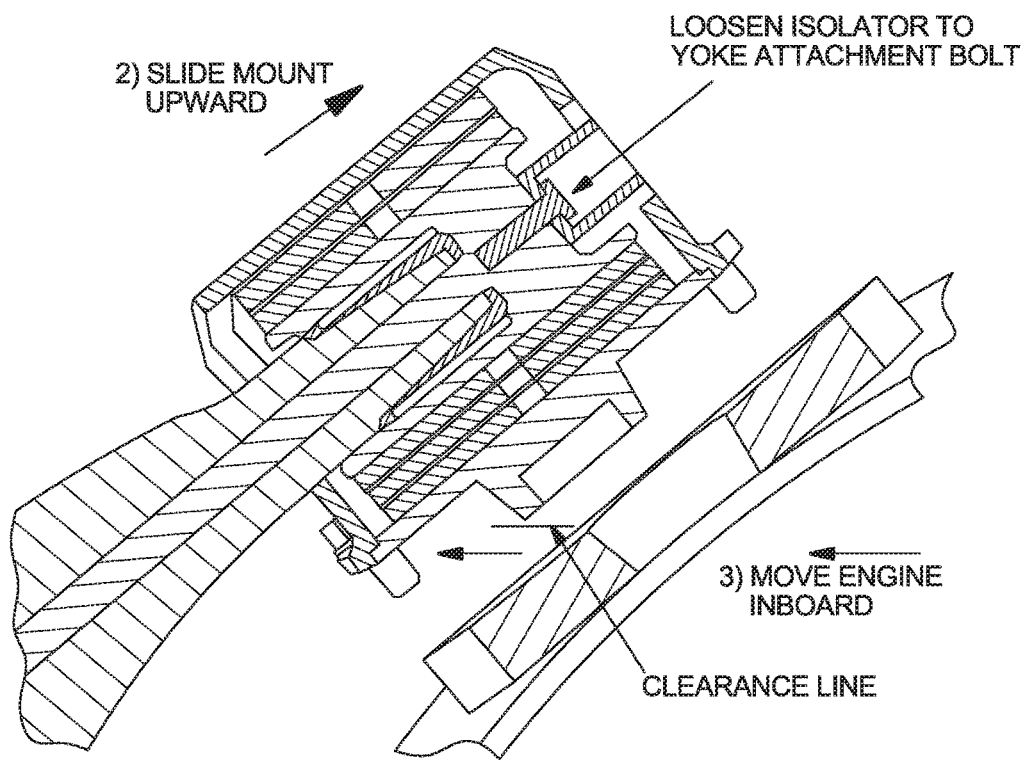
FIGS. 44 and 45 illustrate the installation method of the airframe structure yoke member.
Figure 45:
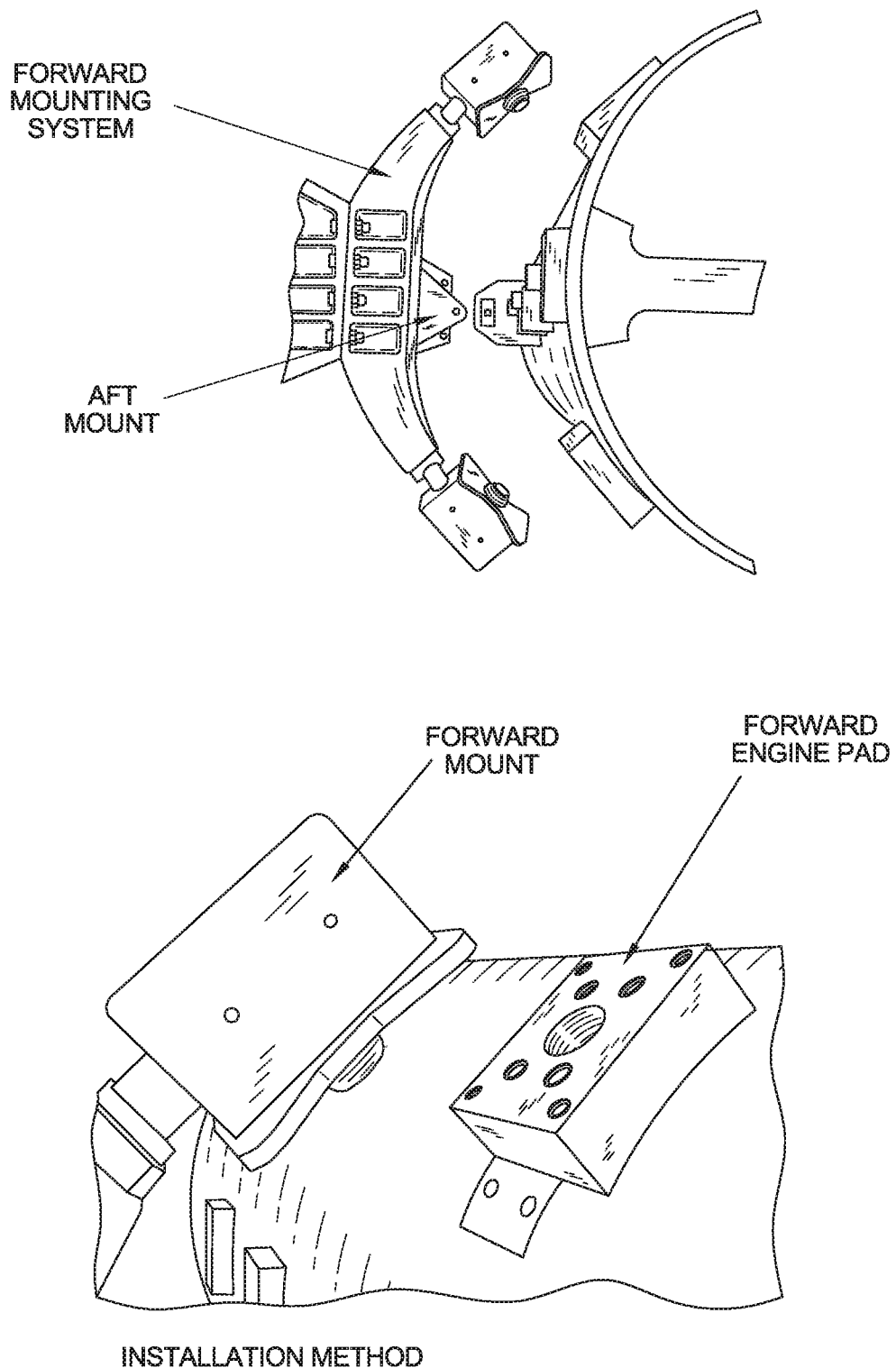

An assembly method is illustrated in FIG. 44. Preferably the yoke is assembled to the airframe. Preferably the mounts are each installed loosely onto the ends of the yoke. As shown in FIG. 44, the mounts are allowed to slide outward as the engine is being brought in. As the engine is moved horizontally inward, the low angle conical shear boss preferably engage into the engine pad pilot bushing and self-align the mount to the pad. When the mount is fully engaged, the four attachment bolts are inserted and torqued to complete the connection. Then the mount-to-yoke attachment bolt is torqued down and locked.

It will be apparent to those skilled in the art that various modifications and variations can be made to the invention without departing from the spirit and scope of the invention. Thus, it is intended that the invention cover the modifications and variations and combinations of this invention as described and shown. It is intended that the scope of differing terms or phrases in the claims may be fulfilled by the same or different structure(s) or step(s).

The invention claimed is:

1. An aircraft engine mount system (20) configured for mounting an aircraft engine (22) to an aircraft (24), the engine mounting system (20) comprising:
   a yoke member (26) including:
      an aircraft attachment (34);
      a first yoke end (28) having a cylindrical or cone shape;
      a second yoke end (30) having a cylindrical or cone shape;
      wherein the yoke member having a generally arched shape extending between the first yoke end (28) and second yoke end (30);
   a first engine mount (36) configured to accommodate the first yoke end;
   a second engine mount (40) configured to accommodate the second yoke end;
   wherein the first yoke end (28) and the second yoke end (30) are configured to be inserted in the first and second engine mounts (36, 40), respectively, and interlocked therein;
   wherein the first yoke end (28) is secured to and within the first engine mount (36) by a fastener (58) preventing relative sliding of the first yoke end with the first engine mount;
   wherein the second yoke end (30) is slidably free within the second engine mount (40);
   wherein the first and second engine mounts (36, 40) having the first and second yoke ends (28, 30) positioned therein are configured to be secured to the aircraft engine (22) by a plurality of attachment bolts;
   wherein the first engine mount (36) and the second engine mount (40) are grounded to the aircraft engine (22), the first engine mount (36) and the second engine mount (40) configured to interlock the yoke member (26) therebetween; and
   wherein the yoke member (26) has an aircraft attachment width, a first engine end width, and a second engine end width, with the aircraft attachment width being greater than the first engine end width and the aircraft attachment width being greater than the second engine end width.

2. The aircraft engine mount system (20) of claim 1 further comprising:
   a wear resistant cap (60) positioned about the first or second yoke end (28, 30);
   a wear resistant bushing (62) positioned within the first or second engine mount (38, 40); and
   wherein the wear resistant cap (60) is configured to slidably be inserted into and adjacent the wear resistant bushing (62).

3. The aircraft engine mount system (20) of claim 1 further comprising at least one resilient member (44) disposed within the first engine mount (36) and configured to absorb at least a portion of a load from the first yoke end (28).

4. The aircraft engine mount system (20) of claim 3 wherein the at least one resilient member (44) is an elastomer.

5. The aircraft engine mount system (20) of claim 1 wherein the first engine mount (36) is further comprised of at least one nonresilient member (56), the at least one nonresilient member (56) being disposed between the first engine mount (36) and the first yoke end (28).

6. The aircraft engine mount system (20) of claim 5 wherein the nonresilient member (56) is a spherical bearing.

7. The aircraft engine mount system (20) of claim 6 wherein the spherical bearing is configured to accommodate a tolerancing in the first engine mount (36).

8. The aircraft engine mount system (20) of claim 1 further comprising at least one resilient member (44) disposed within the second engine mount (40) and configured to absorb at least a portion of a load from the second yoke end (30).

9. The aircraft engine mount system (20) of claim 8 wherein the at least one resilient member (44) is an elastomer.

10. The aircraft engine mount system (20) of claim 1 wherein the second engine mount (40) is further comprised of at least one nonresilient member (56), the at least one nonresilient member (56) being disposed between the second engine mount (40) and the second yoke end (30).

11. The aircraft engine mount system (20) of claim 10 wherein the nonresilient member (56) is a spherical bearing.

12. The aircraft engine mount system (20) of claim 11 wherein the spherical bearing is configured to accommodate a tolerancing in the second engine mount (40).

13. The aircraft engine mount system (20) of claim 1 wherein the first engine mount (36) includes an engine boss (64).

14. The aircraft engine mount system (20) of claim 1 further comprising a plurality of aircraft engine mount systems (20) associated with a corresponding plurality of aircraft engines (22), wherein each of the aircraft engine mount systems (20) has at least one yoke member (26) associated therewith.

15. The aircraft engine mount system (20) of claim 14 wherein the yoke members (26) are interchangeable between the aircraft engine mount systems (20) and the corresponding plurality of aircraft engines (22).

16. The aircraft engine mount system (20) of claim 1 wherein the combination of the yoke member (26), the first engine mount (36) and the second engine mount (40) provide for a self-aligning aircraft engine mount system (20).

17. The aircraft engine mount system (20) of claim 1 wherein the yoke member (26) is configured to be nonseparable from the first engine mount (36) and the second engine mount (40) after being joined together with the aircraft engine (22) and the aircraft engine (22) is installed.

18. The aircraft engine mount system (20) of claim 1 wherein the first yoke end (28) and the second yoke end (30) are both conical taper ends.

19. The aircraft engine mount system (20) of claim 1 wherein the first yoke end (28) and the second yoke end (30) are both spherical taper ends.

20. The aircraft engine mount system (20) of claim 1 wherein the first engine mount (36) and the second engine mount (40) are at least hard mounts, the hard mount being free of any resilient members (44).

21. The aircraft engine mount system (20) of claim 1 wherein one of the first engine mount (36) and the second engine mount (40) is a hard mount and the other is a soft mount, the hard mount being free of at least a resilient member (44) and the soft mount including at least the resilient member (44).

22. The aircraft engine mount system (20) of claim 1 wherein the first engine mount (36) and the second engine mount (40) are soft mounts, the soft mount including at least a resilient member (44).

23. The aircraft engine mount system (20) of claim 1 wherein the aircraft attachment (34) is positioned between the first yoke end (28) and the second yoke end (30), the aircraft attachment (34) configured for attaching the yoke member (26) with the aircraft (24).

24. The aircraft engine mount system (20) of claim 23 further comprising a first yoke arm bolt associated with the first yoke end (28), the first yoke arm bolt configured to extend from the first yoke end (28) through the yoke member (26) towards the aircraft attachment (34).

25. An aircraft engine mounting system (20) for mounting an aircraft engine (22) to an aircraft (24), the aircraft engine mounting system (20) comprised of:
- a forward yoke member (26) including:
  - a forward aircraft attachment (34);
  - a first yoke end (28) having a cylindrical or cone shape;
  - a second yoke end (30) having a cylindrical or cone shape;
  - the forward yoke member (26) having a generally arched shape extending between the first and second yoke ends (28, 30);
- a first forward engine mount (36) configured to accommodate the first yoke end;
- a second forward engine mount (40) configured to accommodate the second yoke end;
- wherein the first yoke end (28) and the second yoke end (30) are configured to be inserted in the first and second engine mounts (36, 40), respectively, and interlocked therein;
- wherein the first yoke end (28) is secured to and within the first forward engine mount (36) by a fastener (58) preventing relative sliding of the first yoke end with the first engine mount;
- wherein the second yoke end (30) is slidably free within the second forward engine mount (40);
- wherein the first and second forward engine mounts (36, 40) having the first and second yoke ends (28, 30) positioned therein are configured to be secured to the aircraft engine (22); and
- an aft engine mount, the aft engine mount configured to secure the aircraft engine (22) to the aircraft (24), the aft engine mount disposed aft of the first and second forward engine mounts (36, 40), aft of the yoke member (26), and aft of the forward aircraft attachment (34).

26. The aircraft engine mounting system (20) of claim 25, wherein the aft engine mount includes a link assembly, the link assembly grounded to the aircraft engine (22).

27. The aircraft engine mounting system (20) of claim 26, wherein the aft engine mount includes an airframe structure housing member, the airframe structure housing member grounded with the aircraft (24).

28. The aircraft engine mounting system (20) of claim 27, wherein the airframe structure housing member includes a crack stop between a primary load path with the link assembly and secondary load path with the link assembly.

29. The aircraft engine mounting system of claim 25 wherein the yoke member (26) includes a first engine end yoke arm bolt, the first engine end yoke arm bolt extending from the first yoke end (28) through the yoke member (26) towards the aircraft attachment (34); and
- a second engine end yoke arm bolt, the second engine end yoke arm bolt extending from the second yoke end (30) through the yoke member (26) towards the aircraft attachment (34).

30. The aircraft engine mounting system (20) of claim 27, wherein the second yoke end (30) is fixed within the second forward engine mount (40).

* * * * *